United States Patent
Munemoto

(10) Patent No.: US 11,009,989 B2
(45) Date of Patent: May 18, 2021

(54) RECOGNIZING AND REJECTING UNINTENTIONAL TOUCH EVENTS ASSOCIATED WITH A TOUCH SENSITIVE DEVICE

(71) Applicant: Qeexo, Co., Mountain View, CA (US)

(72) Inventor: Taihei Munemoto, Pittsburgh, PA (US)

(73) Assignee: Qeexo, Co., Mountain View, CA (US)

( * ) Notice: Subject to any disclaimer, the term of this patent is extended or adjusted under 35 U.S.C. 154(b) by 0 days.

(21) Appl. No.: 16/107,994

(22) Filed: Aug. 21, 2018

(65) Prior Publication Data
US 2020/0064960 A1 Feb. 27, 2020

(51) Int. Cl.
*G06F 3/041* (2006.01)
*G06K 9/62* (2006.01)
*G06F 3/0346* (2013.01)
*G06F 3/0488* (2013.01)

(52) U.S. Cl.
CPC .......... *G06F 3/0416* (2013.01); *G06F 3/0346* (2013.01); *G06F 3/04883* (2013.01); *G06K 9/6267* (2013.01)

(58) Field of Classification Search
CPC .. G06F 3/0416; G06F 3/04883; G06F 3/0346; G06K 9/6267
See application file for complete search history.

(56) References Cited

U.S. PATENT DOCUMENTS

| | | |
|---|---|---|
| 2,008,028 A | 7/1935 | Mccortney et al. |
| 2,430,005 A | 11/1947 | Denneen et al. |
| 3,354,531 A | 11/1967 | Pryor |
| 4,561,105 A | 12/1985 | Crane et al. |

(Continued)

FOREIGN PATENT DOCUMENTS

| | | |
|---|---|---|
| CN | 1797305 A | 7/2006 |
| CN | 1928781 A | 3/2007 |

(Continued)

OTHER PUBLICATIONS

Non-Final Office Action received for U.S. Appl. No. 14/242,127 dated Jun. 2, 2015, 33 pages.

(Continued)

*Primary Examiner* — Mihir K Rayan
(74) *Attorney, Agent, or Firm* — Kwan & Olynick LLP

(57) ABSTRACT

Techniques enabling improved classification of touch events associated with a touch sensitive surface of a touch sensitive device and rejection of unintentional touch events associated with the touch sensitive surface are presented. A classification component can analyze touch screen data associated with a touch sensitive surface of a device and sensor data received from an accelerometer, gyroscope, and/or ultrasonic sensor. Based on a result(s) of the analyzing, the classification component can determine a contact classification for an object with respect to the touch sensitive surface, wherein the contact classifications can comprise a classification for a particular intended touch event and a classification for an unintentional touch event, with respect to the touch sensitive surface. In response to detecting an unintentional touch event, an operation management component can reject the unintentional touch event and/or place the display screen of the device in an off state.

25 Claims, 26 Drawing Sheets

(56) References Cited

U.S. PATENT DOCUMENTS

| | | | |
|---|---|---|---|
| 4,597,932 A | 7/1986 | Kurihara et al. |
| 4,686,332 A | 8/1987 | Greanias et al. |
| 5,483,261 A | 1/1996 | Yasutake |
| 5,544,265 A | 8/1996 | Bozinovic et al. |
| 5,596,656 A | 1/1997 | Goldberg |
| 5,615,285 A | 3/1997 | Beernink |
| 5,625,818 A | 4/1997 | Zarmer et al. |
| 5,666,438 A | 9/1997 | Beernink et al. |
| 5,867,163 A | 2/1999 | Kurtenbach |
| 5,933,514 A | 8/1999 | Ostrem et al. |
| 6,028,593 A | 2/2000 | Rosenberg et al. |
| 6,118,435 A | 9/2000 | Fujita et al. |
| 6,208,330 B1 | 3/2001 | Hasegawa et al. |
| 6,212,295 B1 | 4/2001 | Ostrem et al. |
| 6,222,465 B1 | 4/2001 | Kumar et al. |
| 6,246,395 B1 | 6/2001 | Goyins et al. |
| 6,252,563 B1 | 6/2001 | Tada et al. |
| 6,323,846 B1 | 11/2001 | Westerman et al. |
| 6,337,698 B1 | 1/2002 | Kelly, Jr. et al. |
| 6,492,979 B1* | 12/2002 | Kent .................... G06F 3/0446 345/173 |
| 6,504,530 B1 | 1/2003 | Wilson et al. |
| 6,643,663 B1 | 11/2003 | Dabney et al. |
| 6,707,451 B1 | 3/2004 | Nagaoka |
| 6,748,425 B1 | 6/2004 | Duffy et al. |
| 6,772,396 B1 | 8/2004 | Cronin et al. |
| 6,922,642 B2* | 7/2005 | Sullivan .................. G06F 3/043 702/150 |
| 6,933,930 B2 | 8/2005 | Devige et al. |
| 6,943,665 B2 | 9/2005 | Chornenky |
| 7,050,955 B1 | 5/2006 | Carmel et al. |
| 7,084,884 B1 | 8/2006 | Nelson et al. |
| 7,098,896 B2 | 8/2006 | Kushler et al. |
| 7,212,197 B1 | 5/2007 | Schkolne et al. |
| 7,411,581 B2* | 8/2008 | Hardie-Bick ......... G06F 3/0433 178/18.01 |
| 7,443,396 B2 | 10/2008 | Ilic |
| 7,581,194 B2 | 8/2009 | Iwema et al. |
| 7,982,724 B2 | 7/2011 | Hill |
| 8,086,971 B2 | 12/2011 | Radivojevic et al. |
| 8,144,126 B2 | 3/2012 | Wright |
| 8,154,524 B2 | 4/2012 | Wilson et al. |
| 8,154,529 B2 | 4/2012 | Sleeman et al. |
| 8,170,346 B2 | 5/2012 | Ludwig |
| 8,199,126 B1 | 6/2012 | Taubman |
| 8,253,744 B2 | 8/2012 | Macura et al. |
| 8,269,744 B2 | 9/2012 | Agari et al. |
| 8,327,029 B1 | 12/2012 | Purser |
| 8,441,790 B2 | 5/2013 | Pance et al. |
| 8,547,357 B2 | 10/2013 | Aoyagi |
| 8,624,878 B2 | 1/2014 | Sarwar et al. |
| 8,670,632 B2 | 3/2014 | Wilson |
| 8,674,943 B2 | 3/2014 | Westerman et al. |
| 8,743,091 B2 | 6/2014 | Bernstein |
| 8,760,395 B2 | 6/2014 | Kim et al. |
| 8,762,332 B2 | 6/2014 | Keebler et al. |
| 8,769,524 B2 | 7/2014 | Bhullar et al. |
| 9,013,452 B2 | 4/2015 | Harrison et al. |
| 9,019,244 B2 | 4/2015 | Harrison |
| 9,030,498 B2 | 5/2015 | Galor et al. |
| 9,052,772 B2 | 6/2015 | West |
| 9,060,007 B2 | 6/2015 | Keebler et al. |
| 9,182,882 B2 | 11/2015 | Fowler et al. |
| 9,329,688 B2 | 5/2016 | Harrison |
| 9,329,715 B2 | 5/2016 | Schwarz et al. |
| 9,377,863 B2 | 6/2016 | Bychkov et al. |
| 9,557,852 B2 | 1/2017 | Tsai et al. |
| 9,612,689 B2 | 4/2017 | Harrison et al. |
| 9,696,859 B1 | 7/2017 | Heller et al. |
| 9,864,453 B2 | 1/2018 | Munemoto et al. |
| 10,082,935 B2 | 9/2018 | Harrison et al. |
| 2002/0009227 A1 | 1/2002 | Goldberg et al. |
| 2002/0057837 A1 | 5/2002 | Wilkinson et al. |
| 2002/0070927 A1 | 6/2002 | Fujitsuka et al. |
| 2002/0126161 A1 | 9/2002 | Kuzunuki et al. |
| 2003/0048260 A1 | 3/2003 | Matusis |
| 2003/0110085 A1 | 6/2003 | Murren et al. |
| 2003/0132922 A1 | 7/2003 | Phillip |
| 2003/0217873 A1* | 11/2003 | Paradiso ............... G06F 3/0433 178/18.04 |
| 2004/0012573 A1 | 1/2004 | Morrison et al. |
| 2004/0021681 A1 | 2/2004 | Liao |
| 2004/0054711 A1 | 3/2004 | Multer |
| 2004/0141010 A1 | 7/2004 | Fitzmaurice et al. |
| 2004/0160421 A1 | 8/2004 | Sullivan |
| 2004/0199867 A1 | 10/2004 | Brandenborg |
| 2004/0225730 A1 | 11/2004 | Brown et al. |
| 2005/0083313 A1 | 4/2005 | Hardie-Bick |
| 2005/0131778 A1 | 6/2005 | Bennett et al. |
| 2005/0146512 A1 | 7/2005 | Hill et al. |
| 2005/0253817 A1* | 11/2005 | Rytivaara ........... G06F 3/04883 345/173 |
| 2005/0289461 A1 | 12/2005 | Amado et al. |
| 2006/0010400 A1 | 1/2006 | Dehlin et al. |
| 2006/0026535 A1 | 2/2006 | Hotelling et al. |
| 2006/0031746 A1 | 2/2006 | Toepfer et al. |
| 2006/0097991 A1* | 5/2006 | Hotelling .............. G06F 3/0412 345/173 |
| 2006/0109252 A1* | 5/2006 | Kolmykov-Zotov ........................ G06F 3/03545 345/173 |
| 2006/0152499 A1 | 7/2006 | Roberts |
| 2006/0173985 A1 | 8/2006 | Moore |
| 2006/0184617 A1 | 8/2006 | Nicholas et al. |
| 2006/0217126 A1 | 9/2006 | Sohm et al. |
| 2006/0230021 A1 | 10/2006 | Diab et al. |
| 2006/0288329 A1 | 12/2006 | Gandhi et al. |
| 2007/0008125 A1* | 1/2007 | Smith .................. B60R 25/1009 340/566 |
| 2007/0011205 A1 | 1/2007 | Majjasie et al. |
| 2007/0044010 A1 | 2/2007 | Sull et al. |
| 2007/0075965 A1 | 4/2007 | Huppi et al. |
| 2007/0085157 A1 | 4/2007 | Fadell et al. |
| 2007/0100959 A1 | 5/2007 | Eichstaedt et al. |
| 2007/0109279 A1 | 5/2007 | Sigona |
| 2007/0126716 A1 | 6/2007 | Haverty |
| 2007/0152976 A1* | 7/2007 | Townsend .............. G06F 3/016 345/173 |
| 2007/0168367 A1 | 7/2007 | Dickinson et al. |
| 2007/0186157 A1 | 8/2007 | Walker et al. |
| 2007/0192674 A1 | 8/2007 | Bodin et al. |
| 2007/0245020 A1 | 10/2007 | Ott, IV |
| 2007/0257767 A1 | 11/2007 | Beeson |
| 2007/0291297 A1 | 12/2007 | Harmon et al. |
| 2008/0005666 A1 | 1/2008 | Sefton et al. |
| 2008/0036743 A1 | 2/2008 | Westerman et al. |
| 2008/0042978 A1 | 2/2008 | Perez-Noguera |
| 2008/0082941 A1 | 4/2008 | Goldberg et al. |
| 2008/0103906 A1 | 5/2008 | Singh |
| 2008/0117168 A1 | 5/2008 | Liu et al. |
| 2008/0126388 A1 | 5/2008 | Naaman |
| 2008/0141132 A1 | 6/2008 | Tsai |
| 2008/0155118 A1 | 6/2008 | Glaser et al. |
| 2008/0158147 A1 | 7/2008 | Westerman et al. |
| 2008/0158168 A1 | 7/2008 | Westerman et al. |
| 2008/0158185 A1* | 7/2008 | Westerman ............... G06T 7/11 345/173 |
| 2008/0168403 A1 | 7/2008 | Westerman et al. |
| 2008/0170042 A1* | 7/2008 | Yoon ................. G06F 3/04186 345/173 |
| 2008/0180406 A1 | 7/2008 | Han et al. |
| 2008/0244468 A1 | 10/2008 | Nishihara et al. |
| 2008/0288347 A1 | 11/2008 | Sifry |
| 2008/0319932 A1 | 12/2008 | Yih et al. |
| 2009/0025987 A1 | 1/2009 | Perksi et al. |
| 2009/0073144 A1 | 3/2009 | Chen et al. |
| 2009/0095540 A1 | 4/2009 | Zachut et al. |
| 2009/0150373 A1 | 6/2009 | Davis et al. |
| 2009/0157206 A1 | 6/2009 | Weinberg et al. |
| 2009/0174679 A1 | 7/2009 | Westerman |
| 2009/0178011 A1 | 7/2009 | Ording et al. |
| 2009/0195517 A1* | 8/2009 | Duheille ................... G06F 3/043 345/177 |

(56) References Cited

U.S. PATENT DOCUMENTS

| | | |
|---|---|---|
| 2009/0231275 A1 | 9/2009 | Odgers |
| 2009/0232355 A1 | 9/2009 | Minear et al. |
| 2009/0254869 A1 | 10/2009 | Ludwig et al. |
| 2009/0259628 A1 | 10/2009 | Farrell et al. |
| 2009/0262637 A1 | 10/2009 | Badaye et al. |
| 2009/0315835 A1 | 12/2009 | De Goes et al. |
| 2009/0318192 A1 | 12/2009 | Leblanc et al. |
| 2010/0036967 A1 | 2/2010 | Caine et al. |
| 2010/0060602 A1 | 3/2010 | Agari et al. |
| 2010/0085216 A1* | 4/2010 | Ms .................. G06F 3/043 341/20 |
| 2010/0094633 A1 | 4/2010 | Kawamura et al. |
| 2010/0123666 A1 | 5/2010 | Wickholm et al. |
| 2010/0127997 A1 | 5/2010 | Park et al. |
| 2010/0194703 A1 | 8/2010 | Fedor et al. |
| 2010/0214267 A1 | 8/2010 | Radivojevic et al. |
| 2010/0225601 A1 | 9/2010 | Homma et al. |
| 2010/0251112 A1 | 9/2010 | Hinckley et al. |
| 2010/0265185 A1 | 10/2010 | Oksanen |
| 2010/0271322 A1 | 10/2010 | Kondoh et al. |
| 2010/0274622 A1 | 10/2010 | Kennedy et al. |
| 2010/0279738 A1 | 11/2010 | Kim et al. |
| 2010/0289754 A1 | 11/2010 | Sleeman et al. |
| 2010/0302184 A1 | 12/2010 | East et al. |
| 2010/0306649 A1 | 12/2010 | Russ et al. |
| 2010/0309158 A1 | 12/2010 | Iwayama et al. |
| 2010/0309933 A1 | 12/2010 | Stark et al. |
| 2010/0321312 A1* | 12/2010 | Han .................. G06F 1/1694 345/173 |
| 2011/0003550 A1 | 1/2011 | Klinghult et al. |
| 2011/0007000 A1 | 1/2011 | Lim |
| 2011/0018825 A1 | 1/2011 | Kondo et al. |
| 2011/0037734 A1* | 2/2011 | Pance .................. G06F 3/043 345/177 |
| 2011/0057670 A1 | 3/2011 | Jordan |
| 2011/0057885 A1 | 3/2011 | Lehtovirta |
| 2011/0074544 A1 | 3/2011 | D'Souza |
| 2011/0074701 A1 | 3/2011 | Dickinson et al. |
| 2011/0080349 A1 | 4/2011 | Holbein et al. |
| 2011/0133934 A1 | 6/2011 | Tan et al. |
| 2011/0134063 A1 | 6/2011 | Norieda |
| 2011/0134083 A1 | 6/2011 | Norieda |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0167391 A1 | 7/2011 | Momeyer et al. |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse et al. |
| 2011/0238613 A1 | 9/2011 | Shehory et al. |
| 2011/0246463 A1 | 10/2011 | Carson, Jr. et al. |
| 2011/0246503 A1 | 10/2011 | Bender et al. |
| 2011/0248927 A1 | 10/2011 | Michaelis et al. |
| 2011/0248948 A1 | 10/2011 | Griffin et al. |
| 2011/0261083 A1 | 10/2011 | Wilson |
| 2011/0298798 A1 | 12/2011 | Krah |
| 2011/0310040 A1 | 12/2011 | Ben-Shalom et al. |
| 2012/0001875 A1 | 1/2012 | Li et al. |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0023459 A1* | 1/2012 | Westerman .......... G06F 3/03547 715/863 |
| 2012/0051596 A1 | 3/2012 | Darnell et al. |
| 2012/0056846 A1 | 3/2012 | Zaliva |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski |
| 2012/0206330 A1 | 8/2012 | Cao et al. |
| 2012/0262407 A1 | 10/2012 | Hinckley et al. |
| 2012/0274583 A1 | 11/2012 | Haggerty |
| 2012/0280827 A1 | 11/2012 | Kashiwagi et al. |
| 2012/0280927 A1 | 11/2012 | Ludwig |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0022214 A1* | 1/2013 | Dickins .................. G06F 3/043 381/74 |
| 2013/0027404 A1 | 1/2013 | Sarnoff |
| 2013/0038554 A1 | 2/2013 | West |
| 2013/0091123 A1 | 4/2013 | Chen et al. |
| 2013/0100071 A1 | 4/2013 | Wright et al. |
| 2013/0176264 A1 | 7/2013 | Alameh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma et al. |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller et al. |
| 2013/0316813 A1 | 11/2013 | Derome et al. |
| 2013/0328813 A1 | 12/2013 | Kuo et al. |
| 2013/0335333 A1 | 12/2013 | Kukulski et al. |
| 2014/0007002 A1 | 1/2014 | Chang et al. |
| 2014/0009401 A1 | 1/2014 | Bajaj et al. |
| 2014/0022189 A1 | 1/2014 | Sheng et al. |
| 2014/0032880 A1 | 1/2014 | Ka |
| 2014/0037951 A1 | 2/2014 | Shigetomi et al. |
| 2014/0071095 A1 | 3/2014 | Godsill |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0208275 A1 | 7/2014 | Mongia et al. |
| 2014/0210788 A1 | 7/2014 | Harrsion et al. |
| 2014/0210791 A1 | 7/2014 | Hanauer et al. |
| 2014/0240271 A1 | 8/2014 | Land et al. |
| 2014/0240295 A1 | 8/2014 | Harrison |
| 2014/0253477 A1 | 9/2014 | Shim et al. |
| 2014/0267065 A1 | 9/2014 | Levesque |
| 2014/0267085 A1 | 9/2014 | Li et al. |
| 2014/0289659 A1 | 9/2014 | Harrison et al. |
| 2014/0300559 A1 | 10/2014 | Tanimoto et al. |
| 2014/0327626 A1 | 11/2014 | Harrison et al. |
| 2014/0331313 A1 | 11/2014 | Kim et al. |
| 2014/0368436 A1* | 12/2014 | Abzarian .............. G06F 3/0488 345/168 |
| 2015/0002405 A1 | 1/2015 | Kuan et al. |
| 2015/0035759 A1 | 2/2015 | Harrison et al. |
| 2015/0077378 A1 | 3/2015 | Duffield |
| 2015/0145820 A1 | 5/2015 | Huang et al. |
| 2015/0242009 A1 | 8/2015 | Xiao et al. |
| 2015/0253858 A1 | 9/2015 | Koukoumidis et al. |
| 2015/0293592 A1 | 10/2015 | Cheong et al. |
| 2016/0012348 A1* | 1/2016 | Johnson .................. G06N 5/027 706/12 |
| 2016/0018942 A1 | 1/2016 | Kang et al. |
| 2016/0062545 A1 | 3/2016 | Lai |
| 2016/0077615 A1 | 3/2016 | Schwarz et al. |
| 2016/0077650 A1 | 3/2016 | Durojaiye et al. |
| 2016/0077664 A1 | 3/2016 | Harrison et al. |

(56) References Cited

U.S. PATENT DOCUMENTS

| | | |
|---|---|---|
| 2016/0085324 A1 | 3/2016 | Schwarz et al. |
| 2016/0085333 A1 | 3/2016 | Christopher |
| 2016/0085372 A1 | 3/2016 | Munemoto et al. |
| 2016/0098185 A1 | 4/2016 | Xiao et al. |
| 2016/0117015 A1 | 4/2016 | Veneri et al. |
| 2016/0156837 A1 | 6/2016 | Rodzevski et al. |
| 2016/0171192 A1 | 6/2016 | Holz et al. |
| 2016/0224145 A1 | 8/2016 | Harrison et al. |
| 2016/0231865 A1 | 8/2016 | Harrison et al. |
| 2016/0299615 A1 | 10/2016 | Schwarz et al. |
| 2017/0024892 A1 | 1/2017 | Harrison et al. |
| 2017/0060279 A1 | 3/2017 | Harrison |
| 2017/0153705 A1 | 6/2017 | Kim et al. |

FOREIGN PATENT DOCUMENTS

| | | |
|---|---|---|
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |
| EP | 0 938 039 A2 | 8/1999 |
| EP | 1 659 481 A2 | 5/2006 |
| EP | 1 762 926 A2 | 3/2007 |
| EP | 2 136 358 A1 | 12/2009 |
| EP | 2 280 337 A2 | 2/2011 |
| GB | 2 344 894 A | 6/2000 |
| GB | 2 468 742 A | 9/2010 |
| JP | H09-69137 A | 3/1997 |
| JP | 2004-213312 A | 7/2004 |
| JP | 2005-018611 A | 1/2005 |
| JP | 2007-524970 A | 8/2007 |
| JP | 2009-543246 A | 12/2009 |
| JP | 2011-028555 A | 2/2011 |
| JP | 2013-519132 A | 5/2013 |
| JP | 2013-532495 A | 8/2013 |
| KR | 10-2002-0075283 A | 10/2002 |
| KR | 10-2011-0061227 A | 6/2011 |
| KR | 10-2012-0100351 A | 9/2012 |
| WO | 94/04992 A1 | 3/1994 |
| WO | 2006/070044 A1 | 7/2006 |
| WO | 2008/126347 A1 | 10/2008 |
| WO | 2009/071919 A1 | 6/2009 |
| WO | 2011/096694 A2 | 8/2011 |
| WO | 2012/064034 A1 | 5/2012 |
| WO | 2012166277 | 12/2012 |
| WO | 2013/059488 A1 | 4/2013 |
| WO | 2013/061998 A1 | 5/2013 |
| WO | 2014/037951 A1 | 3/2014 |
| WO | 2014/182435 A1 | 11/2014 |

OTHER PUBLICATIONS

Final Office Action received for U.S. Appl. No. 14/242,127 dated Sep. 18, 2015, 28 pages.
Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Asano et al., "Real-Time Sound Source Localization and Separation System and Its Application to Automatic Speech Recognition", Proceedings of Eurospeech, 2001; p. 1013-1016; 2001.
Benko et al., "Sphere: Multi-Touch Interactions on a Spherical Display", Proceedings of UIST, 2008; pp. 77-86.
Burges, Christopher J.C., "A Tutorial on Support Vector Machines for Pattern Recognition", Data Mining and Knowledge Discovery, 2, 1998 pp. 121-167.
Cao et al., "ShapeTouch: Leveraging Contact Shape on Interactive Surfaces", IEEE International Workshop on Horizontal Interactive Human Computer System (Tabletop), 2008, pp. 139-146.
Deyle et al., "Hambone: A Bio-Acoustic Gesture Interface", Proceedings of ISWC, 2007, pp. 1-8.
Dietz et al., DT Controls: Adding Identity to Physical Interfaces, ACM Symposium on User Interface Software & Technology (UIST), 2005, pp. 245-252.
Dietz et al., "DiamondTouch: A Multi-User Touch Technology" ACM Symposium on User Interface Software & Technology (UIST), 2001, pp. 219-226.
Gutwin et al., "Supporting Informal Collaboration in Shared-Workspace Groupware", Journal of Universal Computer Science, vol. 14, No, 9, 2008, pp. 1411-1434.
Hall et al., "The WEKA Data Mining Software: An Update", SIGKDD Explorations,vol. 11, No. 1, 2009, pp. 10-18.
Harrison et al., Skinput: Appropriating the Body as an Input Surface, Proceedings of CHI, Apr. 10-15, 2010, pp. 153-462.
Harrison et al., "Scratch Input: Creating Large, Inexpensive, Unpowered and Mobile Finger Input Surfaces", Proceedings of UIST, 2008, pp. 205-208.
Hartmann et al., "Augmenting Interactive Tables with Mice & Keyboards", Proceedings of UIST, 2009, pp. 149-152.
Hinckley et al., "Sensor Synaesthesia: Touch in Motion, and Motion in Touch", Proceedings of CHI, 2011, pp. 801-810.
Hinckley et al., "Pen+ Touch= New Tools", Proceedings of UIST, 2010, pp. 27-36.
Hinkley et al., "Manual Deskterity: An Exploration of Simultaneous Pen+ Touch Direct Input", Proceedings of CHI, 2010, pp. 2793-2802.
Holz et al., "The Generalized Perceived Input Point Model and How to Double Touch Accuracy by Extracting Fingerprints" Proceedings of CHI, 2010, pp. 581-590.
Kaltenbrunner., "reacTIVision: A Computer-Vision Framework for Table-Based Tangible Interaction", Proceedings ofTEI, 2007, pp. 69-74.
Matsushita et al., "HoloWall: Designing a Finger, Hand, Body, and Object Sensitive Wall", Proceedings of UIST, 1997, pp. 209-210.
"Mimio", http://www.mimio.com, retrieved Jul. 8, 2019, 8 pages.
Olwal et al., "SurfaceFusion: Unobtrusive Tracking of Everyday Objects in Tangible User Interfaces", Proceedings of GI, 2008, pp. 235-242.
Paradiso et al., "Tracking and Characterizing Knocks Atop Large Interactive Displays", Sensor Review, vol. 25, No.2, 2005, pp. 134-143.
Paradiso et al., "Sensor Systems for Interactive Surfaces", IBM Systems Journal, vol. 39 No. 3&4, 2000, pp. 892-914.
Patten, James, Mcmichael., "Sensetable: A Wireless Object Tracking Platform for Tangible User Interfaces", Proceedings of CHI, 2001, pp. 253-260.
Rekimoto et al., "Augmented Surfaces: A Spatially Continuous Work Space for Hybrid Computing Environments", Proceedings of CHI, 1999, pp. 378-385.
Rekimoto et al., "ToolStone: Effective use of the Physical Manipulation Vocabularies of Input Devices", Proceedings of UIST, 2000, pp. 109-117.
Rekimoto et al., "SmartSkin: An Infrastructure for Freehand Manipulation on Interactive Surfaces", Proceedings of CHI, 2002, pp. 113-120.
Vandoren et al., "DIP-IT: Digital Infrared Painting on an Interactive Table", Proceedings of CHI, 2008, pp. 2901-2906.
Wang et al., "Empirical Evaluation for Finger Input Properties in Multi-Touch Interaction", Proceedings of CHI, 2009, pp. 1063-1072.

(56) References Cited

OTHER PUBLICATIONS

International Search Report and Written Opinion received for International Patent Application No. PCT/US2012/060865 dated Mar. 29, 2013, 10 pages.
Non-Final Office Action received for U.S. Appl. No. 15/206,554 dated Sep. 21, 2016, 36 pages.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Chinese Office Action for Chinese Patent Application No. 201280062500.7 dated Apr. 17, 2017, 15 pages.
Japanese Office Action for Japanese Patent Application No. 2014-537253 dated May 16, 2017, 5 pages.
Seo et al.., "Audio Fingerprinting Based on Normalized Spectral Subband Centroids," Proc. ICASSP, {U.S.A.), 2005, vol. 3, p. 213-216. Retrieved on May 29, 2017, 4 pages.
Kunio, "Audio fingerprinting: Techniques and applications", Acoustical Science and Technology, The Acoustical Society of Japan, Feb. 1, 2010, vol. 66, No.2, p. 71-76. Retrieved on May 29, 2017, 6 pages.
European Search Report dated Jul. 24, 2015 for European Application No. 12842495.9, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Japanese Office Action for Japanese Patent Application No. 2017-049566 dated Jun. 5, 2018, 7 pages.
Non-Final Office Action received for U.S. Appl. No. 14/684,407 dated Jul. 8, 2016, 11 pages.
Final Office Action received for U.S. Appl. No. 14/684,407 dated Jan. 18, 2017, 20 pages.
Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated May 31, 2017, 21 pages.
Final Office Action received for U.S. Appl. No. 15/073,407, dated Dec. 20, 2016, 49 pages.
Non-Final Office Action received for U.S. Appl. No. 13/958,427, dated Nov. 10, 2016, 22 pages.
Final Office Action received for U.S. Appl. No. 14/219,919, dated Aug. 26, 2016, 24 pages.
Non-Final Office Action received for U.S. Appl. No. 14/191,329, dated Feb. 2, 2017, 20 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Non-Final Office Action received for U.S. Appl. No. 14/486,800, dated Dec. 1, 2016, 29 pages.
Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Non-Final Office Action received for U.S. Appl. No. 14/684,407, dated Sep. 14, 2018, 24 pages.
Final Office Action received for U.S. Appl. No. 14/834,434, dated May 1, 2017, 18 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan. 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
Non-Final Office Action received for U.S. Appl. No. 13/958,427, dated Mar. 13, 2015, 50 pages.
Final Office Action received for U.S. Appl. No. 13/958,427, dated Jun. 19, 2015, 17 pages.
Non-Final Office Action received for U.S. Appl. No. 13/887,711, dated Apr. 6, 2015, 36 pages.
Final Office Action received for U.S. Appl. No. 14/191,329, dated Aug. 7, 2015, 29 pages.
Non-Final Office Action received for U.S. Appl. No. 14/492,604, dated Oct. 1, 2015, 16 pages.
International Search Report and Written Opinion received for PCT Application No. PCT/US2014/049485 dated Nov. 17, 2014, 9 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
Non-Final Office Action received for U.S. Appl. No. 14/483,150 dated Dec. 18, 2015, 7 pages.
Non-Final Office Action—dated Oct. 2, 2015 U.S. Appl. No. 14/486,800, filed Sep. 15, 2014, 21 pages.
Non-Final Office Action received for U.S. Appl. No. 14/503,894, dated Dec. 30, 2015, 18 pages.
Non-Final Office Action—dated Jan. 29, 2016 U.S. Appl. No. 14/219,919, 11 pages.
Non-Final Office Action received dated Nov. 5, 2015 U.S. Appl. No. 13/887,711, 19 pages.
Final Office Action dated Feb. 24, 2016 U.S. Appl. No. 13/887,711, 23 pages.
International Search Report and Written Opinion for PCT/US2015/051355; dated Dec. 15, 2015, 9 pages.
International Search Report and Written Opinion for PCT/US2015/047428; dated Nov. 27, 2015, 6 pages.
International Search Report and Written Opinion for PCT/US2015/050570; dated Dec. 17, 2015, 8 pages.
International Search Report and Written Opinion for PCT/US2015/014581; dated May 14, 2015, 7 pages.
Non-Final Office Action—dated Oct. 7, 2015 U.S. Appl. No. 14/495,041, 14 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
U.S. Appl. No. 13/958,427, filed Aug. 2, 2013, titled: "Capture of Vibro-Acoustic Data Used to Determine Touch Types. "
U.S. Appl. No. 14/191,329, filed Feb. 26, 2014, titled: "Using Capacitive Images for Touch Type Classifications."
U.S. Appl. No. 13/887,711, filed May 6, 2013, titled: "Using Finger Touch Types to Interact with Electronic Devices."
Sarah, M. K. et al, "A Personal Touch- Recognizing Users Based on Touch Screen Behavior," PhoneSense'12, Nov. 6, 2012, Toronto, ON, Canada, Nov. 6, 2012, pp. 5.

(56) References Cited

OTHER PUBLICATIONS

Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.
"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Kherallah, Metal., "On-line handwritten digit recognition based on trajectory and velocity modeling," Pattern Recognition Letters, vol. 29, Issue 5, pp. 580-594, Apr. 1, 2008.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 19, 2017 in U.S. Appl. No. 14/869,998, 7 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl. No. 14/751,589, 27 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
Non-Final Office Action dated Jun. 26, 2018 in U.S. Appl. No. 14/486,800, 25 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages.
Chinese Office Action for Chinese Patent Application No. 201280062500.7, dated Apr. 27, 2018, 19 pages.
Chinese Office Action for Chinese Patent Application No. 201280062500.7, dated Oct. 10, 2018, 14 pages.
Office Action dated Mar. 30, 2018 for U.S. Appl. No. 15/886,562, 44 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 11 pages (including English translation).
Office Action dated Jan. 28, 2019 for U.S. Appl. No. 15/836,798, 30 pages.
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Chinese Office Action dated Apr. 21, 2017 for Chinese Patent Application No. 201480022056.5, 23 pages (with Translation).
Chinese Office Action dated Feb. 9, 2018 for Chinese Patent Application No. 201480022056.5, 19 pages (with Translation).
Non-Final Office Action received for U.S. Appl. No. 16/126,175 dated Nov. 1, 2018, 86 pages.
Third Chinese Office Action received for Chinese Patent Application No. 201480022056.5 dated Jul. 19, 2018, 6 pages (with English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Chinese First Office Action received for Chinese Patent Application No. 201510240372.6 dated Sep. 27, 2018, 18 pages.
Chinese Second Office Action received for Chinese Patent Application No. 201510240372.6 dated May 15, 2019, 16 pages.
Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 pages.
European Search Report received for European Patent Application No. 16839786.7, dated Feb. 12, 2019, 8 pages.

(56) References Cited

OTHER PUBLICATIONS

Communication pursuant to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 8 pages.
Communication pursuant to Rules 70(2) and 70a(2) EPC received for European Patent Application No. 16818725.0 dated Jan. 8, 2019, 1 page.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
European Search Report dated Apr. 8, 2019 for European Application No. 18195588.1, 7 pages.
Office Action dated Jul. 5, 2019 for U.S. Appl. No. 15/836,798, 95 pages.
U.S. Appl. No. 14/492,604, filed Sep. 22, 2014, titled: "Method and Apparatus for Improving Accuracy of Touch Screen Event Analysis by Use of Edge Classification.", 35 pages.
U.S. Appl. No. 14/495,041, filed Sep. 24, 2014, titled: "Method for Improving Accuracy of Touch Screen Event Analysis by Use of Spatiotemporal Touch Patterns.", 34 pages.
U.S. Appl. No. 14/483,150, filed Sep. 11, 2014, titled: "Method and Apparatus for Differentiating Touch Screen Users Based on Touch Event Analysis.", 38 pages.
U.S. Appl. No. 14/242,127, filed Apr. 1, 2014, titled: Method and Apparatus for Classifying Dtouch Events on a Touch Sensitive Surface, 36 pages.
U.S. Appl. No. 13/849,698, filed Mar. 23, 2013, titled: "Method and System for Activating Different Interactive Functions Using Different Types of Finger Contacts.", 52 pages.
U.S. Appl. No. 13/780,494, filed Feb. 28, 2013, titled: "Input Tools Having Viobro-Acoustically Distinct Regions and Computing Device for Use With the Same.", 34 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 7, 2018 in U.S. Appl. No. 14/219,919, 21 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.
Final Office Action dated Sep. 6, 2017 in U.S. Appl. No. 14/486,800, 17 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.
Cheng, B. et al, "SilentSense: Silent User Identification via Dynamics of Touch and Movement Behavioral Biometrics," Cryptography and Security (cs CR); Human-Computer Interaction, pp. 9, Aug. 31, 2013.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0, 12 pages.
English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason for Refusal dated Jul. 10, 2014 in Korean patent application No. 10-2014-0027979, 3 pages.
Final Office Action dated Jan. 5, 2018 in U.S. Appl. No. 14/503,894, 16 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Communication pursuant to Article 94(3) EPC dated Feb. 26, 2018 for European Patent Application No. 14785422.8, 7 pages.
Communication pursuant to Article 94(3) EPC dated Mar. 5, 2018 for European Patent Application No. 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 pages.
Extended European Search Report dated Aug. 25, 2017 in European Patent Application No. 157 48667.1, 10 pages.
Extended European Search Report dated Jul. 22, 2014 in European Patent Application No. 12755563.9, 5 pages.
Extended European Search Report dated Mar. 16, 2018 in European Patent Application No. 15842839.1, 7 pages.
Extended European Search Report dated Mar. 19, 2018 in European Patent Application No. 15840819.5, 9 pages.
Extended European Search Report dated Mar. 19, 2018 in European Patent Application No. 15843933.1, 8 pages.
Extended European Search Report dated Mar. 27, 2018 in European Patent Application No. 15843989.3, 8 pages.
Extended European Search Report dated May 14, 2018 in European Patent Application No. 15847469.2, 11 pages.
Weidong, S. et al., "SenGuard: Passive user identification on smartphones using multiple sensors," IEEE 7th International Conference on Wireless and Mobile Computing, Networking and Communications {WiMob), pp. 141-148, 2011.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.

(56) References Cited

OTHER PUBLICATIONS

Pedro, L et al., "Augmenting touch interaction through acoustic sensing", Proceedings of the ACM International Conference on Interactive Tabletops and Surfaces, pp. 53-56, Nov. 13-16, 2011.

Final Office Action received for U.S. Appl. No. 14/684,407 dated Jun. 10, 2019, 26 pages.

Non-Final Office Action received for U.S. Appl. No. 14/191,329 dated Jul. 16, 2019, 30 pages.

Chinese First Office Action received for Chinese Patent Application Serial No. 201580051873.8 dated Jun. 21, 2019, 15 pages (Including English Translation).

Final Office Action received for U.S. Appl. No. 13/887,711 dated Jul. 25, 2019, 24 pages.

Final Office Action received for U.S. Appl. No. 14/684,407 dated Sep. 20, 2019, 26 pages.

Final Office Action received for U.S. Appl. No. 14/495,041 dated Aug. 9, 2019, 26 pages.

Non-Final Office Action received for U.S. Appl. No. 14/834,434 dated Aug. 5, 2019, 19 pages.

Final Office Action received for U.S. Appl. No. 16/126,175 dated Aug. 2, 2019, 161 pages.

\* cited by examiner

RECOGNIZING AND REJECTING UNINTENTIONAL TOUCH EVENTS ASSOCIATED WITH A TOUCH SENSITIVE DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to touch surface technology, e.g., recognizing and rejecting unintentional touch events associated with a touch sensitive device.

BACKGROUND

Various electronic devices today typically can be operated by a user interacting with a touch screen or other type of touch sensitive surface. This feature is particularly a characteristic of the recent generation of smart phones. Typically, touch display screens can respond to finger contact to activate the touch display screen for further processes. Contact also can be made with the touch display screen using tools such as a stylus, other parts of the hand such as the palm and various parts of the finger.

The above-described description is merely intended to provide a contextual overview relating to touch sensitive devices, and is not intended to be exhaustive.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

Various electronic devices typically can be operated by a user interacting with a touch display screen or other type of touch sensitive surface of an electronic device. The touch sensitive surface of a touch display screen or other type of touch sensitive surface can comprise, for example, a capacitive, optical, or resistive touch sensitive surface. This touch-sensitive-surface feature particularly can be a characteristic of the recent generation of smart phones.

A touch display screen can respond to finger contact to activate the display to enable access to applications, functions, or features of the electronic device and/or to enable further processes to be performed. Contact also can be made with the touch display screen using tools, such as a stylus, or other parts of the hand, such as the palm and/or various parts of the finger. A touch display screen can sense user inputs, such as a finger(s) or a stylus, associated with a user that come in contact with and/or in proximity to the surface of the touch display screen. The touch display screen can encapsulate the intended actions of the user with respect to the touch display screen as touch events and can communicate such touch events to a system to respond appropriately (e.g., accordingly) to the touch events (e.g., to enable access to and perform operations in connection with the applications, functions, or features of the electronic device and/or to enable further processes associated with the electronic device to be performed). However, there can instances where unintentional touch events may be reported to the system.

In accordance with a non-limiting, example implementation, a method can comprise analyzing, by a system comprising a processor, characteristics of touch surface data associated with a touch sensitive surface that is associated with a device and accelerometer data associated with the device. The method also can comprise, based at least in part on at least one result of the analyzing, determining, by the system, a classification of a touch event for an object with respect to the touch sensitive surface, wherein the classification of the touch event is an unintentional touch event or an intentional touch event. The method further can include determining, by the system, whether to reject the touch event or process the touch event based at least in part on the classification, wherein it is determined that the touch event is to be rejected in response to the classification being determined to be the unintentional touch event, and wherein it is determined that the touch event is to be processed in response to the classification being determined to be the intentional touch event.

In accordance with another non-limiting, example implementation, a system can comprise a memory that stores executable components, and a processor, operatively coupled to the memory, that executes the executable components. The executable components can include a classification component configured to analyze touch surface information associated with a touch sensitive surface that is associated with a device and accelerometer information associated with the device and received from an accelerometer, wherein the classification component is further configured to determine a classification of a touch event for an object with respect to the touch sensitive surface, based at least in part on at least one result of the analysis, wherein the classification of the touch event is an unintentional touch event or an intentional touch event. The executable components also can comprise an operation management component configured to, based at least in part on the classification, reject the touch event in response to the classification being determined to be the unintentional touch event, or process the touch event in response to the classification being determined to be the intentional touch event.

In accordance with still another non-limiting, example implementation, a machine-readable medium can comprise executable instructions that, when executed by a processor, facilitate performance of operations. The operations can comprise analyzing features of touch surface data associated with a touch sensitive surface that is associated with a device and accelerometer data associated with the device. The operations also can include, based at least in part on at least one result of the analyzing, determining a classification of a touch event of an object with respect to the touch sensitive surface, wherein the classification of the touch event is an unintentional touch event or an intentional touch event. The operations further can comprise determining whether to reject the touch event or process the touch event based at least in part on the classification, wherein it is determined that the touch event is to be rejected in response to the classification being determined to be the unintentional touch event, and wherein it is determined that the touch event is to be processed in response to the classification being determined to be the intentional touch event.

The following description and the annexed drawings set forth certain illustrative aspects of the specification. These aspects are indicative, however, of but a few of the various ways in which the principles of the specification may be employed. Other advantages and enhanced features of the specification will become apparent from the following detailed description of the specification when considered in conjunction with the drawings.

BRIEF DESCRIPTION OF THE DRAWINGS

Numerous aspects, implementations, objects, and advantages of the disclosed subject matter will be apparent upon consideration of the following detailed description, taken in conjunction with the accompanying drawings, in which like reference characters can refer to like parts throughout, and in which.

DETAILED DESCRIPTION

Figure 1:
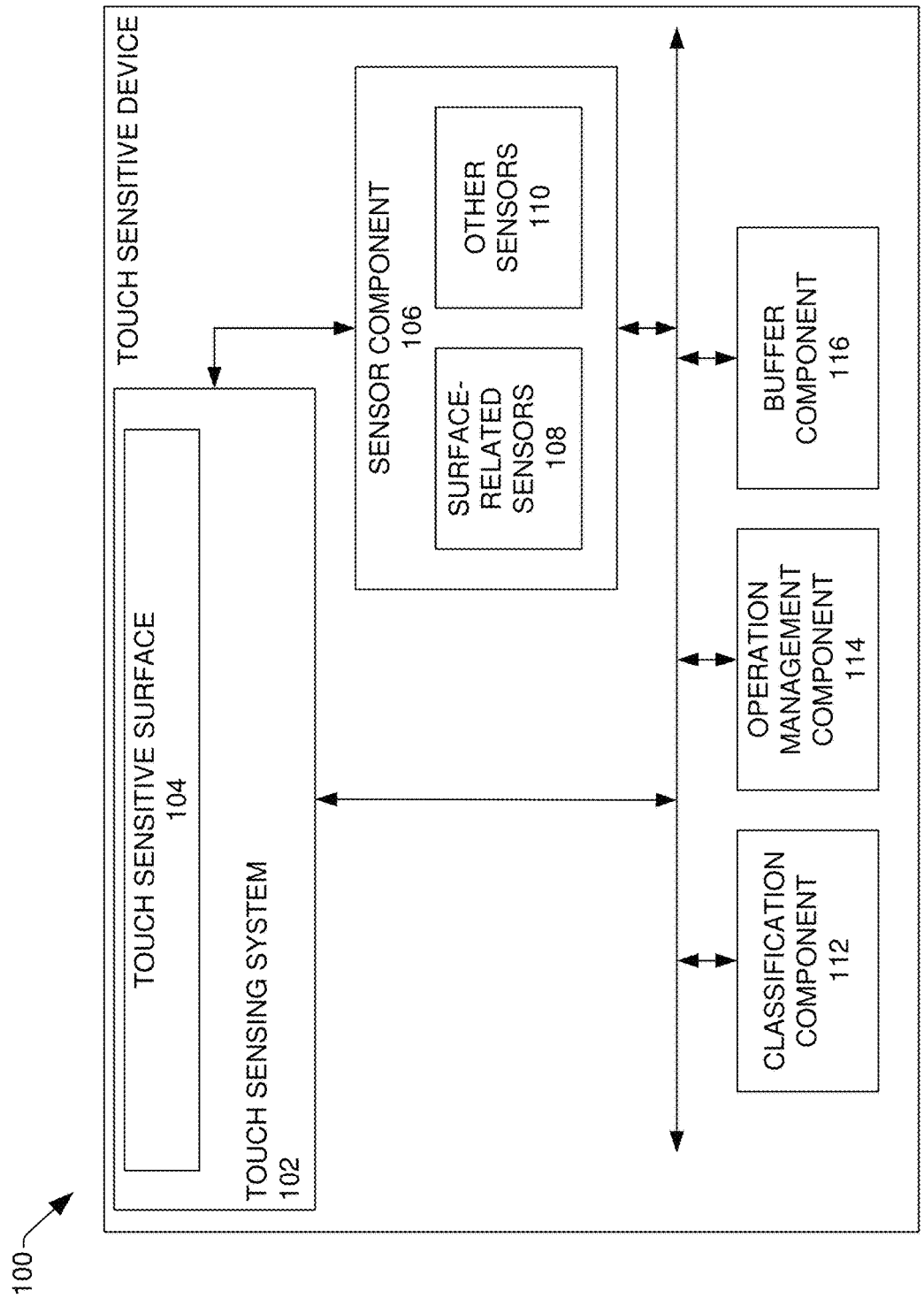
FIG. 1 illustrates a block diagram of an example touch sensitive device that can determine a classification of a touch event with regard to an object in contact or proximate contact with a touch sensitive surface of the touch sensitive device, in accordance with various aspects and embodiments of the disclosed subject matter.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure might be practiced without these specific details, or with other methods, components, materials, etc. In other instances, well-known structures and devices are shown in block diagram form to facilitate describing one or more aspects.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The figures in the following description relate to preferred embodiments by way of illustration only. The figures are not necessarily to scale. It should be noted that from the following discussion, alternative embodiments of the structures and methods disclosed herein will be readily recognized as viable alternatives that may be employed without departing from the principles of what is claimed.

Various electronic devices today typically can be operated by a user interacting with a touch screen. This feature is particularly a characteristic of the recent generation of smart phones, electronic pads or tablets, and certain computers. Typically, a touch display screen can comprise a touch sensitive surface that can respond to finger contact to activate and/or utilize the touch display screen for further processes. Contact also can be made with the touch display screen using tools, such as a stylus, or other parts of the hand, such as the palm and/or various parts of the finger.

There can be instances where a user of an electronic device can unintentionally and undesirably touch the touch the display screen to activate the touch display screen and/or cause unintentional and undesirable operations to be performed by the electronic device based on the unintentional and undesirable touching of the touch display screen. For example, the user can be gripping the electronic device in the user's hand, and one or more fingers of the user can be wrapped around the electronic device such that the one or more fingers can unintentionally come in contact with or sufficient proximity to the touch display screen, or the palm or other body part of the user can unintentionally come in contact with or sufficient proximity to the touch display screen, to unintentionally activate the touch display screen and/or cause an unintentional operation(s) to be performed by the electronic device, in response to the unintentional touch event by the one or more fingers, palm, or other body part with the touch display screen.

The disclosed subject matter can employ techniques that can enable improved classification of touch events associated with a touch sensitive surface of a touch sensitive device and rejection of unintentional touch events associated with the touch sensitive surface are presented. Sensors, such as a sensor array of a touch display screen (e.g., a touch sensitive surface of a touch display screen), an accelerometer, a gyroscope, an ultrasonic sensor, and/or another type of sensor, of a device (e.g., electronic device) can sense various conditions associated with the device, wherein the conditions can comprise touching of the touch display screen of the device, impact or pressure on the touch display screen, movement of the device, and/or another condition(s) associated with the device.

A classification component can monitor and receive sensor data (e.g., data streams from the sensors), such as touch screen data, associated with the touch display screen (e.g., the touch sensitive surface of or associated with the display screen), and/or other sensor data from the accelerometer, gyroscope, ultrasonic sensor, and/or another type(s) of sensor, and/or metadata associated with the device. The classification component can analyze the touch screen data associated with a touch sensitive surface of a device, the other sensor data received from the accelerometer, gyroscope, ultrasonic sensor, and/or other sensor, and/or the metadata. In some embodiments, as part of the analysis of the touch screen data, other sensor data, and/or metadata (e.g., raw sensor data and/or metadata), the classification component can extract characteristic information (e.g., information regarding or indicating features or structures) from the touch screen data, the other sensor data, and/or the metadata, based at least in part on (e.g., using) desired algorithms (e.g., learning algorithms relating to identifying characteristics or features relating to touch events with respect to the touch display screen), wherein the classification component can utilize the characteristic information to discriminate or distinguish between different types of contact or proximate contact (e.g., unintentional contact or intentional contact) with the touch display screen. In addition to the manual training of the classification component, during operation of the classification component, which can comprise a classification engine, the classification component can utilize the learning algorithms to continue to train the classification component, including mining (e.g., automatically mining) desirable (e.g., useful) characteristics from the raw data streams obtained from the various sensors.

Based on a result(s) of the analyzing, the classification component can determine a contact classification for an object (e.g., finger, palm, other body part) with respect to the touch sensitive surface of the touch display screen. The contact classifications can comprise, for example, a classification for a particular intended touch event (e.g., intended touching of a button or control on the touch display screen) and a classification for an unintentional touch event (e.g., unintended touching of the touch sensitive surface by the object), with respect to the touch sensitive surface.

In response to detecting an unintentional touch event, an operation management component can reject the unintentional touch event, place (e.g., switch or maintain) the touch display screen of the device in an off state, and/or otherwise prevent an operation being performed on the device due to the unintentional touch event. In response to detecting an intentional touch event, the operation management component can place (e.g., switch or maintain) the touch display screen in an on state and/or enable (e.g., allow) a touch sensitive function of the touch sensitive surface of the touch display screen and/or the operation(s) associated with the intentional touch event to be performed by the device (e.g., by the touch display screen, application associated with the device, . . . ).

These and other aspects and embodiments of the disclosed subject matter are described with regard to the figures.

FIG. 1 illustrates a block diagram of an example touch sensitive device 100 that can determine a classification of a touch event with regard to an object in contact or proximate contact with a touch sensitive surface of the touch sensitive device, in accordance with various aspects and embodiments of the disclosed subject matter. The touch sensitive device 100 can be or can comprise, for example, a mobile phone (e.g., a cellular phone and/or smart phone), a computer, a display table, a personal digital assistant (PDA), an electronic tablet or notebook (e.g., a touch sensitive graphic tablet or notebook), a web pad, electronic bodywear (e.g., a smart watch or other electronic bodywear that comprises a touch sensitive surface), an electronic gaming device, an electronic workstation, a television, an Internet protocol (IP) television, a set-top box, a device (e.g., touch sensitive device) in or integrated with a vehicle, a touch pad, a track pad, or other type of device.

The touch sensitive device 100 can comprise a touch sensing system 102 that can comprise or be associated with a touch sensitive surface 104 that can sense when an object(s) (e.g., finger(s) of a user, palm of the user, other body part of the user, or stylus) has been brought into contact with the touch sensitive surface 104 or is in proximity to (e.g., is hovering over and/or in proximity to) the touch sensitive surface 104. The touch sensitive surface 104 can have a size and shape that can be coextensive with or can correspond to, or at least can be substantially coextensive with or can substantially correspond to, the size and shape of a presentation area of a display screen of the touch sensitive device 100.

The touch sensitive device 100 also can comprise a sensor component 106 that can comprise a set of sensors, wherein respective sensors of the set of sensors can sense respective conditions (e.g., contact or hover conditions, pressure conditions, motion conditions associated with the device 100, . . . ) of or associated with the touch sensitive device 100. The set of sensors of the sensor component 106 can comprise surface-related sensors 108 that can be part of or associated with the touch sensing system 102 and the touch sensitive surface 104. The surface-related sensors 108 can be configured to sense when an object(s) is in contact with the touch sensitive surface 104 or is in proximity to (e.g., is hovering over and/or in proximity to) the touch sensitive surface 104 and generate sensor data, such as touch surface data (e.g., touch surface or touch screen data), relating to contact with or proximity to the touch sensitive surface 104 by the object(s), as more fully described herein. The sensor data can be employed to facilitate determining a classification (e.g., touch event classification) relating to a contact or an association (e.g., hover) of an object(s) with respect to the touch sensitive surface 104 and/or a contact state of the object(s) in relation to the touch sensitive surface 104, as more fully described herein.

The set of sensors of the sensor component 106 also can include other sensors 110 that can be configured to sense various conditions of or associated with the device 100. For example, the other sensors can sense or detect motion and/or orientation of the device 100 or an object in contact with or in proximity to the device 100, a distance of an object from the device 100 (e.g., a distance of an object from the touch sensitive surface 104), and/or other conditions of or associated with the device 100. The other sensors 110 can comprise, for example, an accelerometer, a gyroscope, an ultrasonic sensor, an inertial measurement unit (IMU), and/or another desired type of sensor. The other sensor data can be employed to facilitate determining a classification (e.g., a touch event classification) relating to a contact or an association (e.g., hover) of an object(s) with respect to the touch sensitive surface 104 and/or a contact state of the object(s) in relation to the touch sensitive surface 104, as more fully described herein.

In some embodiments, the touch sensitive device 100 can comprise a classification component 112 that can monitor and receive sensor data (e.g., data streams from the sensors of the sensor component 106), such as touch surface data, associated with the touch sensitive surface 104 (e.g., touch sensitive surface of or associated with a display screen, a track pad, . . . ) obtained from the surface-related sensors 108, other sensor data obtained from the other sensors 110, and/or metadata associated with the device 100. The classification component 112 can monitor the sensor data and the other sensor data to facilitate detecting touch events relating to touching of an object with, or sufficiently close proximity of an object to (e.g., hovering of an object over), the touch sensitive surface 104 of the device 100. The classification component 112 can analyze touch surface data associated with the touch sensitive surface 104, the other sensor data, and/or the metadata, and can generate analysis results based at least in part on the analysis of such data.

In some embodiments, as part of the analysis of the touch surface data (e.g., touch screen data), the other sensor data, and/or the metadata (e.g., raw sensor data and/or metadata), the classification component 112 can extract characteristic information (e.g., information regarding or indicating characteristics, features, and/or structures relating to the touch event(s)) from the touch surface data, the other sensor data, and/or the metadata. For instance, the classification component 112 can utilize desired algorithms (e.g., learning algorithms relating to identifying characteristics or features relating to touch events with respect to the touch display screen) to facilitate identifying and extracting the characteristic information from the touch surface data, the other sensor data, and/or the metadata. The classification component 112 can utilize the characteristic information to discriminate or distinguish between different types of contact or proximate contact (e.g., unintentional touch event or contact, or intentional touch event or contact) of an object (e.g., a finger(s) of the user, a palm of the user, another body part of the user, a stylus, or another type of object) with the touch sensitive surface 104.

In certain embodiments, as part of the analysis of the sensor data, the classification component 112 can utilize pattern analysis, including pattern recognition analysis, techniques, tools, and algorithms, to identify or determine patterns relating to the touch event(s) (e.g., patterns of contact or association (e.g., hovering) relating to the touch event(s)) for an object(s) with respect to (e.g., on) the touch sensitive surface 104, in accordance with the defined classification criteria, as more fully described herein. For instance, as part of the pattern analysis, the classification component 112 can compare a pattern(s) relating to a touch event(s) to known patterns for touch events, such as known patterns for various types of intentional touch events and known patterns for various types of unintentional touch events, to facilitate determining, based at least in part on the results of such pattern analysis (e.g., comparing of patterns), whether a touch event(s) is an intentional touch event or an unintentional touch event and/or the particular type of touch event(s) (e.g., intentional finger touch, unintentional finger touch, or unintentional palm touch, . . . ).

In some embodiments, in addition to the manual training of the classification component 112 (e.g., a classification engine(s) of the classification component 112), during operation of the classification component 112, which can comprise one or more classification engines, the classification component 112 can utilize the learning algorithms to continue to train (e.g., automatically or dynamically train) the one or more classification engines of the classification component 112, including mining (e.g., automatically mining) desirable (e.g., useful) characteristics from the raw sensor data streams obtained from the various sensors and from analyzing the raw sensor data streams, as more fully described herein.

The classification component 112 also can facilitate distinguishing between an intentional touch event and an unintentional touch event of an object on the touch sensitive surface 104 based at least in part on an amount (e.g., level) of impact or force of the object on the touch sensitive surface 104, as determined by the classification component 112 from an analysis of accelerometer data, touch surface data, and/or other sensor data. For instance, certain levels of impact or force of an object on the touch sensitive surface 104 can be indicative of an intentional touch event, whereas other levels of impact or force of an object on the touch sensitive surface 104 can be indicative of an unintentional touch event.

In certain embodiments, the classification component 112 can compare the amount of impact or force of a touch event obtained from an analysis of accelerometer data (or other sensor data) to respective statistical distributions of impact or force levels that are respectively indicative of intentional touch events and unintentional touch events to facilitate determining whether the touch event is intentional or unintentional. For example, the classification component 112 can compare the amount of impact or force of a touch event to a first statistical distribution of impact or force levels that is indicative of intentional touch events and a second statistical distribution of impact or force levels that is different from the first statistical distribution and is indicative of unintentional touch events. The classification component 112 can determine whether the touch event is intentional or unintentional based at least in part on the results obtained from comparing the amount of impact or force of the touch event to the first and second statistical distributions of impact or force levels.

Based at least in part on the results of the analysis of the sensor data (e.g., touch surface data, accelerometer data, and/or other sensor data) and/or metadata, the classification component 112 can determine whether there has been a touch event (e.g., a touch down event) detected, and, if a touch event is detected, can determine whether the touch event is an intentional touch event or an unintentional touch event, in accordance with the defined classification criteria. As part of determining whether the touch event an intentional touch event or an unintentional touch event, the classification component 112 also can determine the type of touching (e.g., contact) associated with the touch event, for example, determining that a particular touching is a finger of the user, multiple fingers of the user, a palm of the user, a stylus, or other type of object. For example, based at least in part on the particular characteristics determined or identified from the analysis of the sensor data and/or the results obtained from a pattern analysis on the sensor data, the classification component 112 can determine whether the touch event is an intentional touch event or an unintentional touch event, and can determine or identify whether the particular touching of the touch event is a finger of the user, multiple fingers of the user, a palm of the user, a stylus, or other type of object. For instance, the classification component 112 can distinguish between an intentional finger touch on a button or control on the touch sensitive surface 104 (e.g., to press the button or control) and an unintentional touching of the touch sensitive surface by a palm or finger of the user due to the user gripping the device 100 in the user's hand and inadvertently touching the touch sensitive surface 104.

There can be instances where a user is holding the device 100 in the user's hand (e.g., gripping the device 100 in the user's hand), wherein more than one part of the user's hand (e.g., one or more fingers and/or palm) is in contact with respective portions of the touch sensitive surface 104 at the same time or substantially close to the same time, wherein the user did not intend to touch the touch sensitive surface 104 to activate or use the touch sensitive surface 104. There can be other instances where the user is holding the device 100 in the user's hand (e.g., gripping the device 100 in the user's hand), wherein one or more parts of the user's hand (e.g., one or more fingers and/or palm) is in contact with respective portions of the touch sensitive surface 104, and one or more parts of the user's other hand also is in contact with other respective portions of the touch sensitive surface 104, and wherein the user intended for certain touches (e.g., one or more finger touches of one hand) on the touch sensitive surface 104 to activate or use the touch sensitive surface 104, but did not intend to for certain other touches (e.g., one or more finger touches and/or palm touch of the other hand) to activate or use the touch sensitive surface 104. For example, the user can be gripping the device 100 in the user's left hand with part of the user's fingers or palm on the left hand touching (e.g., inadvertently touching) the touch sensitive surface 104, while at the same time the user intentionally pushes a button on the touch sensitive surface 104 with a finger on the user's right hand. There also can be other instances where the user is intentionally touching the touch sensitive surface 104 using multiple fingers (e.g., multiple finger touches or gestures) to utilize certain functions (e.g., multiple-gesture functions) of the device 100, with or without the user inadvertently touching the touch sensitive surface 104 with another finger(s) or palm of the user.

In some embodiments, the classification component 112 can detect, identify, determine, and/or classify multiple touch events of objects with respect to (e.g., on or in proximity to) the touch sensitive surface 104, wherein the multiple touch events occur simultaneously or at least substantially simultaneously, and/or the respective time periods of the respective touch events can at least partially overlap each other. For instance, based at least in part on the results of sensor data, the classification component 112 can identify two (or more) touch events of objects with respect to the touch sensitive surface 104, and, depending in part on the analysis results, can classify both (or all) touch events as intentional touch events, both (or all) touch events as unintentional touch events, or one touch event as intentional and another touch event as unintentional.

For example, a user can be holding (e.g., gripping) the device 100 in the user's hand, wherein multiple parts of the user's hand (e.g., one or more fingers and/or palm) are inadvertently in contact with the touch sensitive surface 104 at the same or substantially the same time. The sensors (e.g., surface-related sensors 108 and/or other sensors 110) of the sensor component 106 can detect such contact by the user's hand and can generate sensor data relating (e.g., corresponding) thereto. The classification component 112 can analyze the sensor data. Based at least in part on the results of the analysis of the sensor data, the classification component 112 can determine that there are multiple touch events relating to multiple parts (e.g., finger(s) and/or palm) of the user's hand being in contact with the touch sensitive surface 104 at the same time or substantially the same time, and further can determine that each of the touch events of those multiple touch events are unintentional touch events, in accordance with the defined classification criteria.

As another example, a user can be holding the device 100 in the user's left hand, wherein a part of the user's left hand (e.g., a thumb or a palm) is inadvertently in contact with the touch sensitive surface 104, while at the same or substantially the same time, the user is using a finger on the user's right hand to press a button on the touch sensitive surface 104. The sensors (e.g., 108 and/or 110) can detect the respective touch events (e.g., thumb or palm of left hand, and finger of right hand) by the user and can generate sensor data relating (e.g., corresponding) thereto. The classification component 112 can analyze the sensor data. Based at least in part on the results of the analysis of the sensor data, the classification component 112 can determine that there are multiple touch events (e.g., thumb or palm of left hand, and finger of right hand) by the user on the touch sensitive surface 104 that are occurring at the same time or substantially the same time, and further can determine that the touch event associated with the thumb or palm of the left hand is an unintentional touch event and the other touch event associated with the finger of the right hand is an intentional touch event, in accordance with the defined classification criteria.

As still another example, a user can be holding the device 100 in the user's left hand without any part of the left hand being in contact with the touch sensitive surface 104, and can be using two fingers of the right hand at the same time or substantially the same time to touch the touch sensitive surface 104 to perform a multiple-gesture to perform a multiple-gesture function of the device 100. The sensors (e.g., 108 and/or 110) can detect such multiple touch events by the user's two fingers of the right hand and can generate sensor data relating (e.g., corresponding) thereto. The classification component 112 can analyze such sensor data. Based at least in part on the results of the analysis of the sensor data, the classification component 112 can determine that there are multiple touch events relating to two fingers of the user's hand being in contact with the touch sensitive surface 104 at the same time or substantially the same time, and further can determine that both of the touch events are intentional touch events, in accordance with the defined classification criteria.

In accordance with various embodiments, the classification component 112 can comprise one or more classification engines that can analyze sensor data and determine classifications of touch events, such as described herein. For example, the classification component 112 can comprise a first classification engine that can analyze one or more types of sensor data (e.g., touch surface data, accelerometer data, and/or other sensor data) relating to the touch event (or another touch event) and determine a first classification of the touch event based at least in part on the results of analyzing such sensor data; a second classification engine that can analyze one or more other types of sensor data (e.g., gyroscope data, vibro-acoustic data, and/or other sensor data) relating to a touch event and determine a second classification of the touch event (or a classification of another touch event) based at least in part on the results of analyzing such sensor data; and/or a third classification engine that can analyze one or more other types of sensor data (e.g., ultrasonic data and/or other sensor data) relating to the touch event (or another touch event) and determine a third classification of the touch event (or a classification of the other touch event) based at least in part on the results of analyzing such sensor data. One of the classification engines of the classification component 112 can receive the respective classifications of a touch event from respective classification engines, can analyze the respective classifications, and can determine the classification of the touch event based at least in part on the result of the respective classifications, in accordance with the defined classification criteria. The use of multiple classification engines to classify touch events can enhance (e.g., improve) the accuracy of classifying touch events of objects in contact or association with the touch sensitive surface 104. In certain embodiments, the respective classification engines can operate in parallel (e.g., simultaneously) to process (e.g., analyze) respective types of sensor data to determine respective classifications of a touch event.

It is to be appreciated and understood that, in accordance with various embodiments, the disclosed subject matter can deploy classification engines, as desired, to facilitate improving the accuracy of classifications of touch events relating to objects with respect to the touch sensitive surface 104 and/or to facilitate improving the speed of performing the classifications of touch events relating to objects with respect to the touch sensitive surface 104. In some embodiments, more than one classification engine can be utilized to analyze the same type of data (e.g., accelerometer data) from a same sensor (e.g., accelerometer). In other embodiments, a first number (e.g., five) types of sensor data from a first number of sensors can be processed by a second number (e.g., three) of classification engines to facilitate classifying touch events relating to objects with respect to the touch sensitive surface 104, wherein respective sensor data from the respective sensors can be distributed among respective classification engines, as desired, for processing.

The touch sensitive device 100 also can comprise an operation management component 114 that can be associated with (e.g., communicatively connected to) the classification component 112, the touch sensing system 102, the sensor component 106, a display screen (not shown in FIG. 1) of the touch sensitive device 100, and/or other components of the touch sensitive device 100. As more fully described herein, the operation management component 114 can control functions associated with the touch sensitive surface 104 and/or other components of the device 100 based at least in part on (e.g., in response to) the classification(s) of a touch event(s) of the object(s) with respect to the touch sensitive device 100, wherein the functions can comprise, for example, enabling a touch sensitive function of the touch sensitive surface 104 (e.g., of a display screen) and/or another function of the touch sensitive device 100, disabling the touch sensitive function of the touch sensitive surface 104 (e.g., of the display screen) and/or another function of the touch sensitive device 100, switching (e.g., transitioning) the display screen (e.g., touch display screen) of the touch sensitive device 100 on (e.g., to an on state), and/or switching the display screen off (e.g., to an off state).

For example, in response to a determination that the touch event associated with the touch sensitive surface 104 is an unintentional touch event, the operation management component 114 can disable a touch sensitive function of the touch sensitive surface 104 to reject the unintentional touch event such that the unintentional touching of the touch sensitive surface 104 is not able to engage or select a touch sensitive function of the touch sensitive surface 104 (e.g., prevents selection of a button or control associated with the touch sensitive surface 104 as presented on the display screen) and/or can control operation of the display screen (e.g., touch display screen) to have the display screen transition to or remain in an off state (e.g., a dark display screen). As another example, in response to a determination that the touch event associated with the touch sensitive surface 104 is an intentional touch event, the operation management component 114 can enable a touch sensitive function(s) of the touch sensitive surface 104 to allow the finger(s) of the user to engage or select the touch sensitive function(s) of the touch sensitive surface 104 (e.g., enables selection of a button or control associated with the touch sensitive surface 104 as presented on the display screen) and/or can control operation of the display screen to have the display screen transition to or remain in an on state (e.g., a lit display screen).

As still another example, in response to a determination that a first touch event associated with the touch sensitive surface 104 is an unintentional touch event and a second touch event associated with the touch sensitive surface 104 is an intentional touch event (e.g., for simultaneous or substantially simultaneous touch events), the operation management component 114 can reject the first touch event as an unintentional touch event, and can allow and process the second touch event an intentional touch event, by respectively controlling operations of the touch sensitive surface 104, display screen, and/or other components of the touch sensitive device 100, as described herein. For example, the operation management component 114 can control operations of the touch sensitive device 100 to prevent certain operations associated with the unintentional touch event from being performed by the touch sensitive device 100 and allowing and facilitating performance of other operations associated with the intentional touch event by the touch sensitive device 100.

Figure 2:
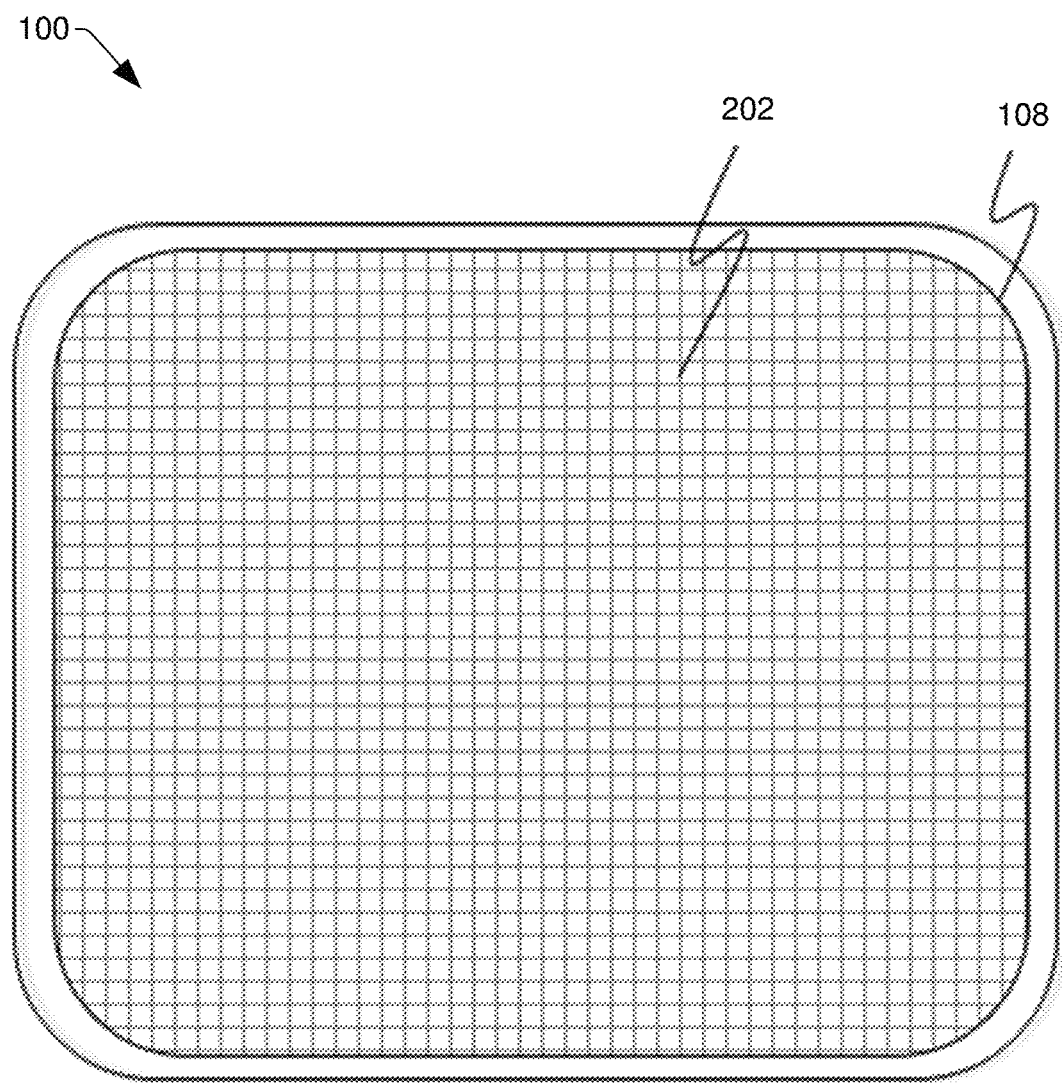
FIG. 2 depicts a diagram of a top view of the example touch sensitive device, including the touch sensitive surface, in accordance with various aspects and embodiments of the disclosed subject matter.

With further regard to the touch sensitive surface 104, referring to FIG. 2 (along with FIG. 1), FIG. 2 depicts a diagram of a top view of the example touch sensitive device 100, including the touch sensitive surface 104, in accordance with various aspects and embodiments of the disclosed subject matter. The touch sensitive surface 104 can comprise or be associated with the surface-related sensors 108. In some embodiments, the surface-related sensors 108 can be distributed in various locations associated with the touch sensitive surface 104 to form a sensor array 202, wherein respective surface-related sensors 108 can be associated with respective portions of the touch sensitive surface 104. For example, the surface-related sensors 108 can be distributed to in various locations associated with the touch sensitive surface 104 to form a grid (e.g., an x, y grid). It is to be appreciated and understood that such a grid formation is merely one example formation that can be employed for distributing the surface-related sensors 108 of the sensor array 202 at various locations associated with the touch sensitive surface 104, and, in accordance with other embodiments of the disclosed subject matter, the surface-related sensors 108 can be distributed in other formations (e.g., uniform or non-uniform formations) with respect to the touch sensitive surface 104.

When an object(s) is brought into contact with, or is in sufficiently close proximity to, a location(s) on the touch sensitive surface 104, one or more surface-related sensors 108 of the sensor array 202 that are associated with that location on the touch sensitive surface 104 can sense such contact of the object(s) with the that location(s) on the touch sensitive surface 104 or sense such proximity of the object(s) to that location(s) on the touch sensitive surface 104. In response to the one or more surface-related sensors 108 sensing or detecting the object(s) in contact with or in proximity to that location(s) on the touch sensitive surface 104, the one or more surface-related sensors 108 can generate signals (e.g., sensor data) and can communicate the signals to the classification component 112 for analysis and evaluation (e.g., to facilitate determining which of the surface-related sensors 108 is in contact with the object(s) or in proximity to the object(s)).

In some implementations, the touch sensing system 102 or the classification component 112 can sweep the surface-related sensors 108 of the sensor array 202 or can otherwise poll the surface-related sensors 108 of the sensor array 202 to facilitate obtaining respective sensor data (e.g., respective touch surface data) from respective surface-related sensors 108 of the sensor array 202, to facilitate enabling the classification component 112 to determine which portion(s) of the touch sensitive surface 104 is in contact with or in proximity to the object(s) at a given time (e.g., a given moment or period of time). For example, the touch sensing system 102 or the classification component 112 can sweep the surface-related sensors 108 of the sensor array 202 or can otherwise poll the surface-related sensors 108 of the sensor array 202 every $\frac{1}{30}^{th}$ of a second, every $\frac{1}{60}^{th}$ of a second, every $\frac{1}{100}^{th}$ of a second, or at another desired rate or periodicity. The classification component 112 (or touch sensing system 102) can process and/or organize (e.g., arrange) the sensor data obtained from the surface-related sensors 108 of the sensor array 202 to generate frame data in the form of x, y dimensional data that can represent (e.g., correspond to) respective touch events (e.g., touch screen contacts or associations) associated with respective surface-related sensors 108 at the given time, wherein respective frame data associated with the respective surface-related sensors 108 can be or can comprise the respective sensor data of the respective surface-related sensors 108 or the respective frame data can be determined based at least in part on the respective sensor data.

Figure 3:
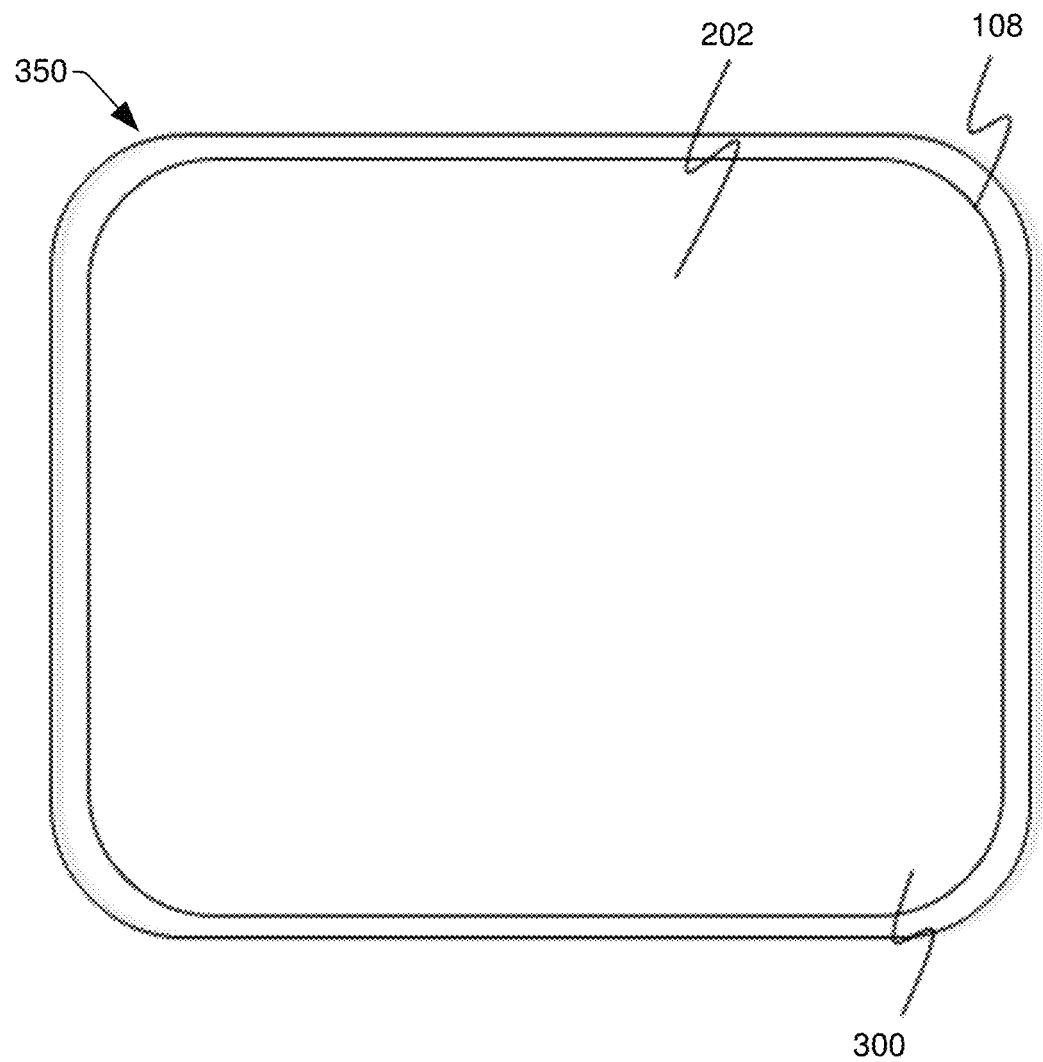
FIG. 3 presents a diagram of an example frame image as part of a visual representation of a top view of an example touch sensitive device, the frame image comprising or representing frame data associated with the touch sensitive surface, in accordance with various aspects and embodiments of the disclosed subject matter.

Frame data can be conceptually understood as providing an image or frame image that can have higher-density portions representing areas of the touch sensitive surface 104 that are in contact with (or in proximity to) an object(s) and other lower-density portions representing areas of the touch sensitive surface 104 that are not in contact with (or in proximity to) an object(s). Turning briefly to FIG. 3 (along with FIGS. 1 and 2), FIG. 3 presents a diagram of an example frame image 300 as part of a visual representation 350 of a top view of an example touch sensitive device 100, the frame image 300 comprising or representing frame data associated with the touch sensitive surface 104, in accordance with various aspects and embodiments of the disclosed subject matter. With respect to the example frame image 300, the surface-related sensors 108 of the sensor array 202 have not detected an object in contact with or in proximity to the surface-related sensors 108 and have correspondingly generated signals (e.g., sensor data) indicating that no object has been detected in contact with or in proximity to the surface-related sensors 108. In this example frame image 300, as no objects are detected in contact with or in proximity to the touch sensitive surface 104, the frame image 300 can have the appearance illustrated in FIG. 3 with no higher-density portions (e.g., no darker colored regions) being shown in the frame image 300.

However, when objects are brought into contact with or in proximity to the touch sensitive surface 104, a portion of the surface-related sensors 108 of the sensor array 202 that are located in the portion(s) of the touch sensitive surface 104 that is in contact with or proximity to the objects can detect such objects, and can generate sensor data representing such detection in response. The portion of the surface-related sensors 108 can communicate the sensor data to report that the objects are in contact with or proximity to the portion(s) of the touch sensitive surface 104 associated with the portion of the surface-related sensors 108, and a contrast pattern can emerge in a frame image representative of such a state of contact.

With regard to FIGS. 4-20, the classification component 112 can receive the sensor data (e.g., touch surface data) from the certain surface-related sensors 108. The touch sensitive surface 104 can comprise or be associated with a sensor array 202 that can include the surface-related sensors 108, which can comprise certain surface-related sensors 108, such as capacitive sensors, that can sense capacitance levels associated with the touch sensitive surface 104. The certain surface-related sensors 108 (and/or other sensors 110) can sense no contact, relative states of intensity of contact with the touch sensitive surface 104, and/or relative proximity of an object (e.g., finger(s) of the user) to the touch sensitive surface 104 without touching the touch sensitive surface. For instance, in some implementations, the sensor array 202 of surface-related sensors 108 can be capable of detecting or determining a level of intensity of contact of an object with the touch sensitive surface 104, wherein the level of intensity of contact can relate to, for example an amount of pressure applied by an object on the touch sensitive surface 104, an intensity of a resistance experienced at the point of contact of the object with the touch sensitive surface 104, an intensity of a capacitance experienced at the point of contact of the object with the touch sensitive surface 104, and/or another type(s) of intensity relating to contact of an object with one or more surface-related sensors 108 of the sensor array 202. As a result of the sensing, the certain surface-related sensors 108 (and/or other sensors 110) can generate sensor data, such as capacitance data (e.g., mutual capacitance data), that can correspond to the respective amounts of capacitance associated with respective portions of the touch sensitive surface 104 and can indicate respective levels of contact (e.g., no contact or respective states of intensity of contact) of an object (e.g., finger(s) of the user) with the touch sensitive surface 104 or respective proximity of the object, or portion thereof, to the touch sensitive surface 104.

In some embodiments, the touch sensitive device 100 also can comprise other sensors 110 of the sensor component 106, wherein the other sensors can include, for example, an accelerometer, a gyroscope, an ultrasound component, an IMU, and/or another type of sensor. The classification component 112 can receive other sensor data, such as, for example, accelerometer data from the accelerometer, gyroscope data from the gyroscope, ultrasound data from the ultrasound component, IMU data from the IMU, and/or other types of sensor data from one or more other types of sensors.

Based at least in part on the results of analyzing the respective sensor data (e.g., mutual capacitance data) from respective surface-related sensors of the certain surface-related sensors 108 and/or the other sensor data, the classification component 112 can generate a frame image comprising one or more grayscale colored regions that can present grayscale information (e.g., corresponding to respective higher-density portions of the frame image) illustrating respective intensities of contact of an object(s) (e.g., finger(s), palm, stylus, . . . ) of or associated with the user with the respective portions of the touch sensitive surface 104 and/or respective proximities of respective portions of the object(s) to the touch sensitive surface 104.

The classification component 112 can determine or identify that the type of touch(es) with respect to the touch sensitive surface 104 and can further determine that whether the touch(es) is an intentional touch event or an unintentional touch event, based at least in part on the results of analyzing the sensor data and/or other sensor data (e.g., raw sensor data and/or other raw sensor data) and/or analyzing the frame image generated from the sensor data and/or the other sensor data. Based at least in part on the classification of the touch(es) being an intentional touch event or the classification of the touch(es) being an unintentional event, and/or the type of touch(es) on the touch sensitive surface 104, accordingly, the operation management component 114 can control the operation of the touch sensitive device 100 to perform an operation (e.g., selection of a button, control, or application, . . . ) that can correspond to the touching of the touch sensitive surface 104, in response to determining that a touch event is an intentional touch event, or to reject the touch(es) and not perform a particular operation and/or disable the touch sensitive surface 104 and/or turn off the touch sensitive surface 104 or associated display screen of the device 100, in response to determining that a particular touch event is an unintentional touch event.

Figure 4:
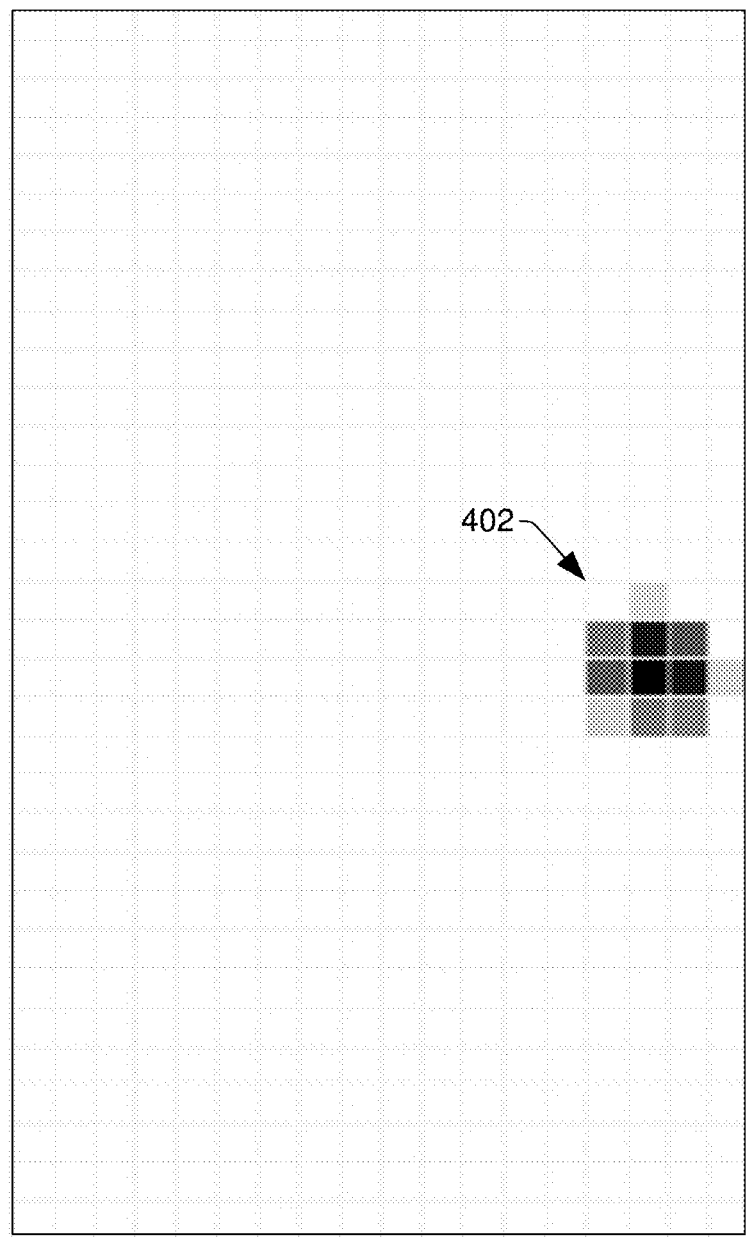
FIG. 4 presents a diagram of an example frame image that can be generated based at least in part on sensor data when certain surface-related sensors of the sensor array detect contact of a finger of the user with a portion of the touch sensitive surface, in accordance with various aspects and embodiments of the disclosed subject matter.

Referring briefly to FIG. 4 (along with FIGS. 1 and 2), FIG. 4 presents a diagram of an example frame image 400 that can be generated based at least in part on sensor data (e.g., capacitance data, such as mutual capacitance data) when certain surface-related sensors 108 (e.g., capacitive sensors) of the sensor array 202 detect contact (e.g., relative intensities of contact) of a finger of the user with a portion (e.g., a center-right portion) of the touch sensitive surface 104, in accordance with various aspects and embodiments of the disclosed subject matter. The frame image 400 can represent a frame associated with the touch sensitive surface 104 at a time during which a finger of the user is in contact with a portion (e.g., a center-right portion) of the touch sensitive surface 104. The respective certain surface-related sensors 108 (and/or other sensors 110) can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data (e.g., capacitance data) based at least in part on the respective sensing of the respective sensors 108.

The classification component 112 can receive the sensor data from the certain surface-related sensors 108. The classification component 112 also can receive other sensor data, such as, for example, accelerometer data, gyroscope data, ultrasound data, IMU data, an/or other types of sensor data from one or more other sensors 110 of the sensor component 106. Based at least in part on the results of analyzing the respective sensor data from respective surface-related sensors 108 and/or the other sensor data from the other sensors 110, the classification component 112 can generate the frame image 400 comprising the grayscale colored region 402 that can present grayscale information (e.g., corresponding to respective higher-density portions of the frame image 400) illustrating respective intensities of contact of respective portions of the finger of the user with the respective portions of the touch sensitive surface 104 and/or respective proximities of respective portions of the finger of the user to the touch sensitive surface 104. For instance, as depicted in the frame image 400, the grayscale colored region 402 can indicate that an object, which correspond to (e.g., be in the shape of) a finger (e.g., a tip, knuckle, or other portion of the finger), is in contact with the portion (e.g., a center-right portion) of the touch sensitive surface 104 that can correspond to the location of the grayscale colored region 402 depicted in the frame image 400. The classification component 112 can determine or identify that the touch event is a finger touch of the user on the portion of the touch sensitive surface 104 and can further determine that such finger touch is an intentional touch event, based at least in part on the results of analyzing the sensor data and/or other sensor data (e.g., raw sensor data and/or other raw sensor data) and/or analyzing the frame image 400 generated from the sensor data and/or the other sensor data.

Based at least in part on the classification of the touch being an intentional touch event and being a finger touch of the portion (e.g., a center-right portion) of the touch sensitive surface 104 that can correspond to the location of the grayscale colored region 402, the operation management component 114 can control the operation of the touch sensitive device 100 to perform an operation (e.g., selection of a button, control, or application, . . . ) that can correspond to the touching of the touch sensitive surface 104.

Figure 5:
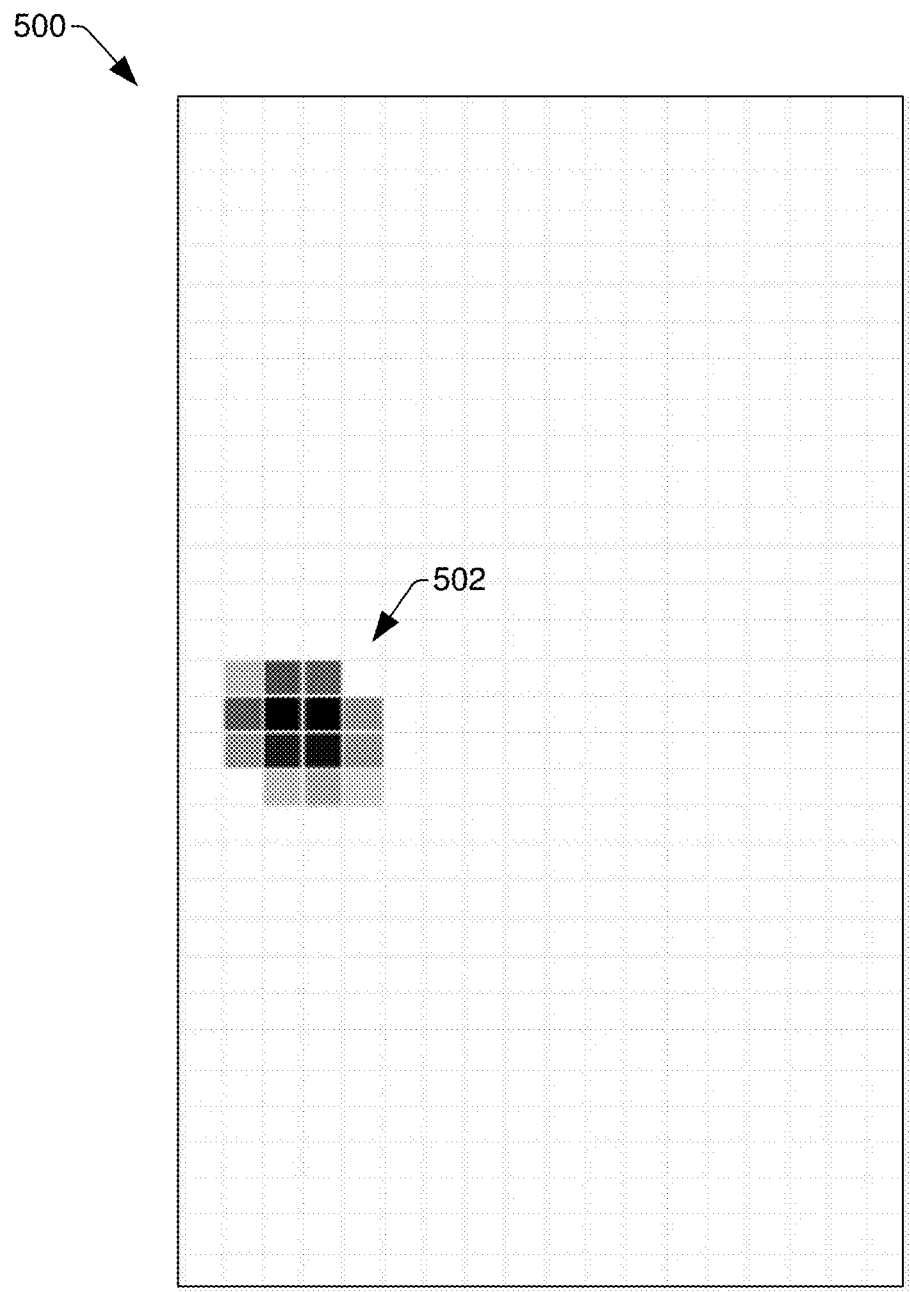
FIG. 5 illustrates a diagram of an example frame image that can be generated based at least in part on sensor data when certain surface-related sensors of the sensor array detect contact of a finger of the user with another portion of the touch sensitive surface, in accordance with various aspects and embodiments of the disclosed subject matter.

Turning briefly to FIG. 5 (along with FIGS. 1 and 2), FIG. 5 illustrates a diagram of an example frame image 500 that can be generated based at least in part on sensor data (e.g., capacitance data, such as mutual capacitance data) when certain surface-related sensors 108 (e.g., capacitive sensors) of the sensor array 202 detect contact (e.g., relative intensities of contact) of a finger of the user with another portion (e.g., a center-left portion) of the touch sensitive surface 104, in accordance with various aspects and embodiments of the disclosed subject matter. The frame image 500 can represent a frame associated with the touch sensitive surface 104 at a time during which a finger of the user is in contact with a particular portion (e.g., a center-left portion) of the touch sensitive surface 104. The surface-related sensors 108 can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data (e.g., capacitance data) based at least in part on the respective sensing of the respective sensors 108. The sensor data (e.g., capacitance data) can correspond to the respective touch-related levels (e.g., respective amounts of capacitance) associated with respective portions of the touch sensitive surface 104 and can indicate respective levels of contact (e.g., no contact or respective states of intensity of contact) of an object (e.g., finger(s) of the user) with the touch sensitive surface 104 or respective proximity of the object, or portion thereof, to the touch sensitive surface 104.

The classification component 112 can receive the sensor data from the certain surface-related sensors 108. The classification component 112 also can receive other sensor data (e.g., accelerometer data, gyroscope data, ultrasound data, and/or IMU data) from other sensors 110 of the sensor component 106. Based at least in part on the results of analyzing the respective sensor data from respective surface-related sensors of the certain surface-related sensors 108 and/or the other sensor data from the other sensors 110, the classification component 112 can generate the frame image 500 comprising the grayscale colored region 502 that can present grayscale information (e.g., corresponding to respective higher-density portions of the frame image 500) illustrating respective intensities of contact of respective portions of the finger of the user with the respective portions of the touch sensitive surface 104 and/or respective proximities of respective portions of the finger of the user to the touch sensitive surface 104. For instance, the grayscale colored region 502 can indicate that an object, which correspond to (e.g., be in the shape of) a finger (e.g., a tip, knuckle, or other portion of the finger), is in contact with the portion (e.g., a center-left portion) of the touch sensitive surface 104 that can correspond to the location of the grayscale colored region 502 depicted in the frame image 500. The classification component 112 can determine or identify that the touch event is a finger touch of the user on such portion of the touch sensitive surface 104 and can further determine that such finger touch is an intentional touch event, based at least in part on the results of analyzing the sensor data and/or other sensor data (e.g., raw sensor data and/or other raw sensor data) and/or analyzing the frame image 500 generated from the sensor data and/or the other sensor data.

Based at least in part on the classification of the touch being an intentional touch event and being a finger touch of the portion (e.g., a center-left portion) of the touch sensitive surface 104 that can correspond to the location of the grayscale colored region 502, the operation management component 114 can control the operation of the touch sensitive device 100 to perform an operation (e.g., selection of a button, control, or application, . . . ) that can correspond to such touching of the touch sensitive surface 104.

Figure 6:
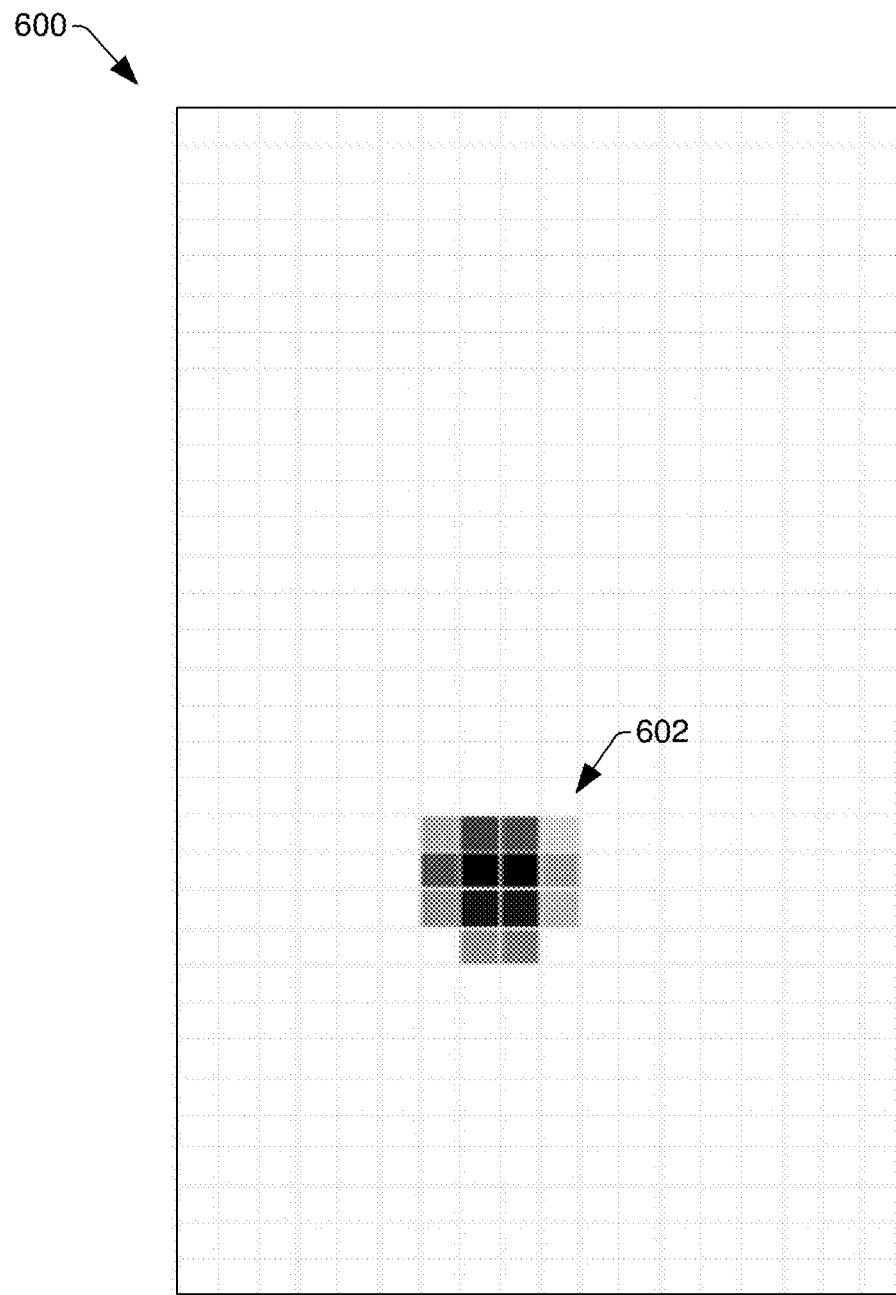
FIG. 6 illustrates a diagram of an example frame image that can be generated based at least in part on sensor data when certain surface-related sensors of the sensor array detect contact of a finger of the user with a certain portion of the touch sensitive surface, in accordance with various aspects and embodiments of the disclosed subject matter.

Referring briefly to FIG. 6 (along with FIGS. 1 and 2), FIG. 6 illustrates a diagram of an example frame image 600 that can be generated based at least in part on sensor data when certain surface-related sensors 108 of the sensor array 202 detect contact (e.g., relative intensities of contact) of a finger of the user with a certain portion (e.g., center portion) of the touch sensitive surface 104, in accordance with various aspects and embodiments of the disclosed subject matter. The frame image 600 can represent a frame associated with the touch sensitive surface 104 at a time during which a finger of the user is in contact with a particular portion (e.g., center portion) of the touch sensitive surface 104. The respective certain surface-related sensors 108 (and/or other sensors 110) can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data (e.g., capacitance data) based at least in part on the respective sensing of the respective sensors 108.

The classification component 112 can receive the sensor data from the certain surface-related sensors 108. The classification component 112 also can receive other sensor data (e.g., accelerometer data, gyroscope data, ultrasound data, and/or IMU data) from other sensors 110 of the sensor component 106. Based at least in part on the results of analyzing the respective sensor data from respective surface-related sensors of the certain surface-related sensors 108 and/or the other sensor data from the other sensors 110, the classification component 112 can generate the frame image 600 comprising the grayscale colored region 602 that can present grayscale information (e.g., corresponding to respective higher-density portions of the frame image 600) depicting respective intensities of contact of respective portions of the finger of the user with the respective portions of the touch sensitive surface 104 and/or respective proximities of respective portions of the finger of the user to the touch sensitive surface 104. For example, the grayscale colored region 602 can indicate that an object, which correspond to (e.g., be in the shape of) a finger (e.g., a tip, knuckle, or other portion of the finger), is in contact with the portion (e.g., a center or approximately center portion) of the touch sensitive surface 104 that can correspond to the location of the grayscale colored region 602 depicted in the frame image 600. The classification component 112 can determine or identify that the touch event is a finger touch of the user on such portion (e.g., center portion) of the touch sensitive surface 104 and can further determine that such finger touch is an intentional touch event, based at least in part on the results of analyzing the sensor data and/or other sensor data (e.g., raw sensor data and/or other raw sensor data) and/or analyzing the frame image 600 generated from the sensor data and/or the other sensor data.

Based at least in part on the classification of the touch being an intentional touch event and being a finger touch of the portion (e.g., center or approximately center portion) of the touch sensitive surface 104 that can correspond to the location of the grayscale colored region 602, the operation management component 114 can control the operation of the touch sensitive device 100 to perform an operation (e.g., selection of a button, control, or application, . . . ) that can correspond to such touching of the touch sensitive surface 104.

Figure 7:
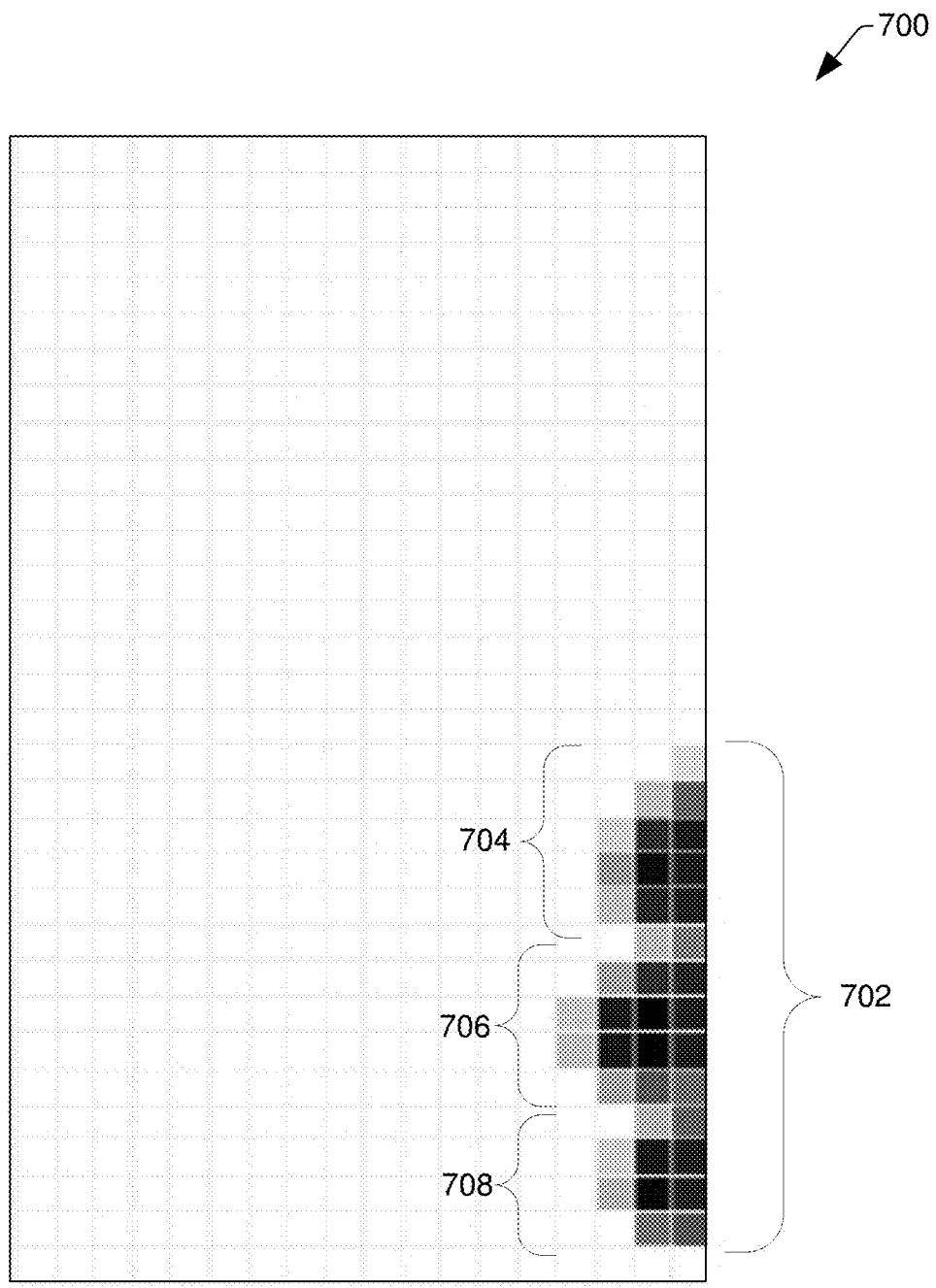
FIG. 7 depicts a diagram of an example frame image that can be generated based at least in part on sensor data when certain surface-related sensors of the sensor array detect contact of fingers of a user with a certain portion of the touch sensitive surface due to a grip of the user on the device, in accordance with various aspects and embodiments of the disclosed subject matter.

With regard to FIG. 7 (along with FIGS. 1 and 2), FIG. 7 depicts a diagram of an example frame image 700 that can be generated based at least in part on sensor data when certain surface-related sensors 108 of the sensor array 202 detect contact (e.g., relative intensities of contact) of fingers of a user with a certain portion of the touch sensitive surface 104 due to a grip of the user on the device 100, in accordance with various aspects and embodiments of the disclosed subject matter. In this example, the touch event(s) can relate to an instance where the user is gripping the device 100 such that three of the user's fingers are wrapped around the casing of the device 100 and are partly touching or in sufficiently close proximity to the bottom-right portion of the touch sensitive surface 104.

The frame image 700 can represent a frame associated with (e.g., corresponding to or representing) the touch sensitive surface 104 at a time during which fingers of the user are in contact with a particular portion (e.g., a bottom right portion) of the touch sensitive surface 104. The respective certain surface-related sensors 108 (and/or other sensors 110) can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data (e.g., capacitance data) based at least in part on the respective sensing of the respective sensors 108.

The classification component 112 can receive the sensor data from the certain surface-related sensors 108. The classification component 112 also can receive other sensor data (e.g., accelerometer data, gyroscope data, ultrasound data, and/or IMU data) from other sensors 110 of the sensor component 106. Based at least in part on the results of analyzing the respective sensor data from respective surface-related sensors of the certain surface-related sensors 108 and/or the other sensor data from the other sensors 110, the classification component 112 can generate the frame image 700 comprising the grayscale colored region 702 that can present grayscale information (e.g., corresponding to respective higher-density portions of the frame image 700) depicting respective intensities of contact of respective portions of the respective fingers of the user with the respective portions of the touch sensitive surface 104 and/or respective proximities of respective portions of the respective fingers of the user to the touch sensitive surface 104. For instance, the grayscale colored region 702 can indicate that an object(s), which can correspond to (e.g., be in the shape of) three fingers (e.g., end portions of the fingers), is (are) in contact with the portion (e.g., bottom right portion) of the touch sensitive surface 104 that can correspond to the location of the grayscale colored region 702 depicted in the frame image 700. From the frame image 700, it can be observed that, for the grayscale colored region 702, there is a first grayscale colored portion 704 that can depict a first finger of the user touching the touch sensitive surface 104, a second grayscale colored portion 706 that can depict a second finger of the user touching the touch sensitive surface 104, and a third grayscale colored portion 708 that can depict a third finger of the user touching the touch sensitive surface 104.

The classification component 112 can determine or identify that there are three respective touch events by three fingers of the user on such portion (e.g., bottom right portion) of the touch sensitive surface 104 and can further determine that the three finger touches are all unintentional touch events, based at least in part on the results of analyzing the sensor data and/or other sensor data (e.g., raw sensor data and/or other raw sensor data) and/or analyzing the frame image 700 generated from the sensor data and/or the other sensor data. For instance, based on the analysis results, which can indicate the respective locations of the respective fingers touches, the respective touch intensity levels of the respective finger touches, the classification component 112 can determine that the three touch events are indicative of unintentional touch events due to unintentional touching of the touch sensitive surface 104 by the three fingers as a result of the user gripping the device 100 in the user's hand.

Based at least in part on the classification of the touches by the three fingers of the user being unintentional touch events, the operation management component 114 can control the operation of the touch sensitive device 100 to reject the touches by the three fingers of the user. For instance, if one or more of the user's three fingers is touching a button or control on the touch display screen of the touch sensitive surface 104, the operation management component 114 can control operation of the touch display screen and other components of the device 100 to prevent an operation associated with the button or control from being performed. Additionally or alternatively, the operation management component 114 can prevent the touch display screen from activating or turning on, if the touch display screen is currently in an inactive state or off state, or can switch the touch display screen to an inactive state or off state, if the touch display screen is currently in the active state or on state.

Figure 8:
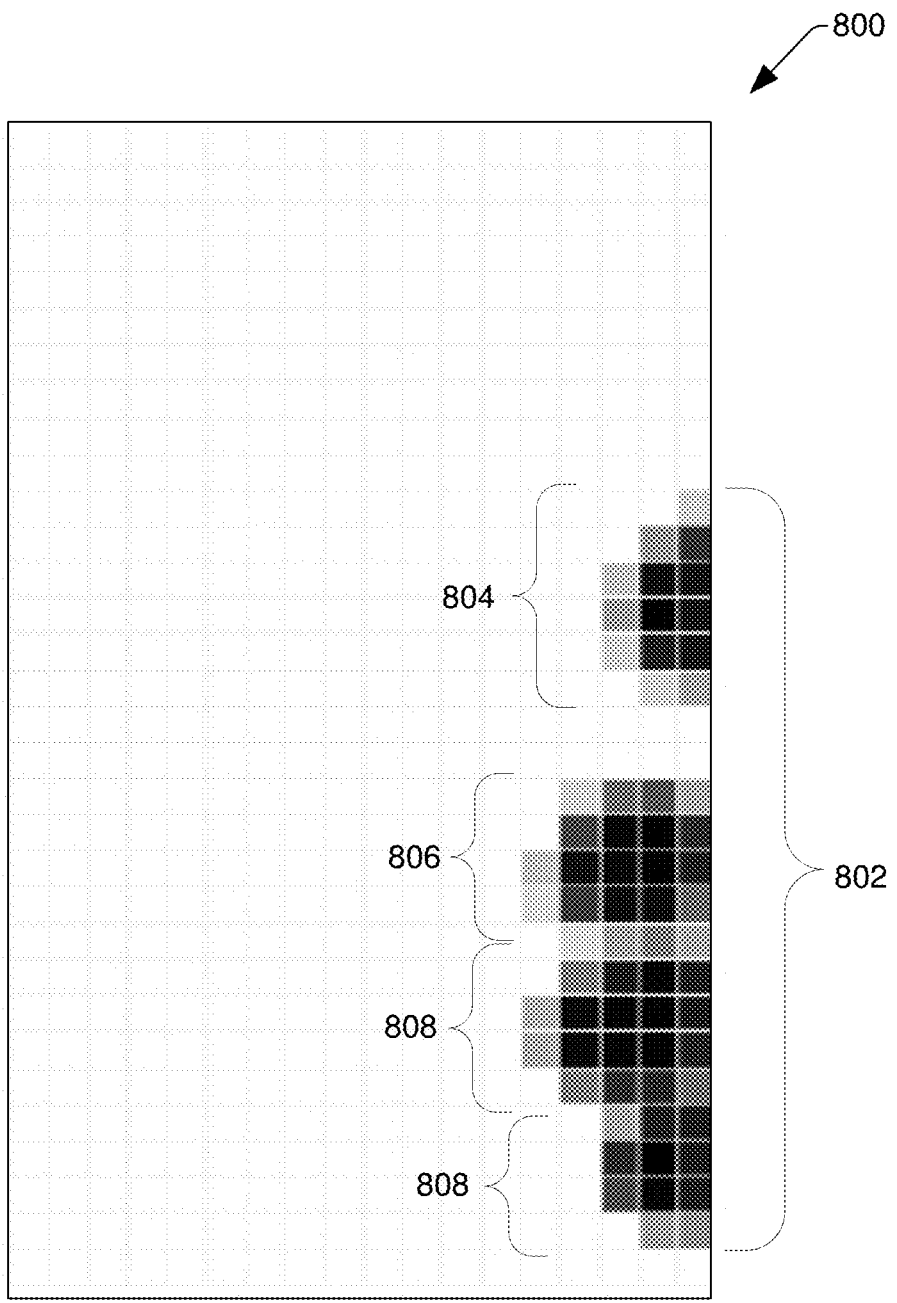
FIG. 8 depicts a diagram of an example frame image that can be generated based at least in part on sensor data when certain surface-related sensors of the sensor array detect contact of four fingers of a user with a certain portion of the touch sensitive surface due to a grip of the user on the device, in accordance with various aspects and embodiments of the disclosed subject matter.

Turning to FIG. 8 (along with FIGS. 1 and 2), FIG. 8 depicts a diagram of an example frame image 800 that can be generated based at least in part on sensor data when certain surface-related sensors 108 of the sensor array 202 detect contact (e.g., relative intensities of contact) of four fingers of a user with a certain (e.g., right side) portion of the touch sensitive surface 104 due to a grip of the user on the device 100, in accordance with various aspects and embodiments of the disclosed subject matter. In this example, the touch event(s) can relate to an instance where the user is gripping the device 100 such that four of the user's fingers are wrapped around the casing of the device 100 and are partly touching or in sufficiently close proximity to the right-side portion of the touch sensitive surface 104.

The frame image 800 can represent a frame associated with (e.g., corresponding to or representing) the touch sensitive surface 104 at a time during which four fingers of the user are in contact with a particular portion (e.g., a right side portion) of the touch sensitive surface 104. The respective certain surface-related sensors 108 (and/or other sensors 110) can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data based at least in part on the respective sensing of the respective sensors 108.

The classification component 112 can receive the sensor data from the certain surface-related sensors 108. The classification component 112 also can receive other sensor data (e.g., accelerometer data, gyroscope data, ultrasound data, and/or IMU data) from other sensors 110 of the sensor component 106. Based at least in part on the results of analyzing the respective sensor data from respective surface-related sensors of the certain surface-related sensors 108 and/or the other sensor data from the other sensors 110, the classification component 112 can generate the frame image 800 comprising the grayscale colored region 802 that can present grayscale information (e.g., corresponding to respective higher-density portions of the frame image 800) depicting respective intensities of contact of respective portions of the respective fingers of the user with the respective portions of the touch sensitive surface 104 and/or respective proximities of respective portions of the respective fingers of the user to the touch sensitive surface 104. For instance, the grayscale colored region 802 can indicate that an object(s), which correspond to (e.g., be in the shape of) four fingers (e.g., end portions of the fingers), is (are) in contact with the portion (e.g., right side portion) of the touch sensitive surface 104 that can correspond to the location of the grayscale colored region 802 depicted in the frame image 800. From the frame image 800, it can be seen that, for the grayscale colored region 802, there is a first grayscale colored portion 804 that can depict a first finger of the user touching the touch sensitive surface 104, a second grayscale colored portion 806 that can depict a second finger of the user touching the touch sensitive surface 104, a third grayscale colored portion 808 that can depict a third finger of the user touching the touch sensitive surface 104, and a fourth grayscale colored portion 810 that can depict a fourth finger of the user touching the touch sensitive surface 104.

The classification component 112 can determine or identify that there are four respective touch events by four fingers of the user on such portion (e.g., right side portion) of the touch sensitive surface 104 and can further determine that the four finger touches are all unintentional touch events, based at least in part on the results of analyzing the sensor data and/or other sensor data (e.g., raw sensor data and/or other raw sensor data) and/or analyzing the frame image 800 generated from the sensor data and/or the other sensor data. For instance, based on the analysis results, which can indicate the respective locations of the respective fingers touches and/or the respective touch intensity levels of the respective finger touches, the classification component 112 can determine that the four touch events are indicative of unintentional touch events due to unintentional touching of the touch sensitive surface 104 by the four fingers as a result of the user gripping the device 100 in the user's hand.

Based at least in part on the classification of the touches by the four fingers of the user being unintentional touch events, the operation management component 114 can control the operation of the touch sensitive device 100 to reject the touches by the four fingers of the user. For instance, if one or more of the user's four fingers is touching a button or control on the touch display screen of the touch sensitive surface 104, the operation management component 114 can control operation of the touch display screen and other components of the device 100 to prevent an operation associated with the button or control from being performed. Additionally or alternatively, the operation management component 114 can prevent the touch display screen from activating or turning on, if the touch display screen is currently in an inactive state or off state, or can switch the touch display screen to an inactive state or off state, if the touch display screen is currently in the active state or on state.

Figure 9:
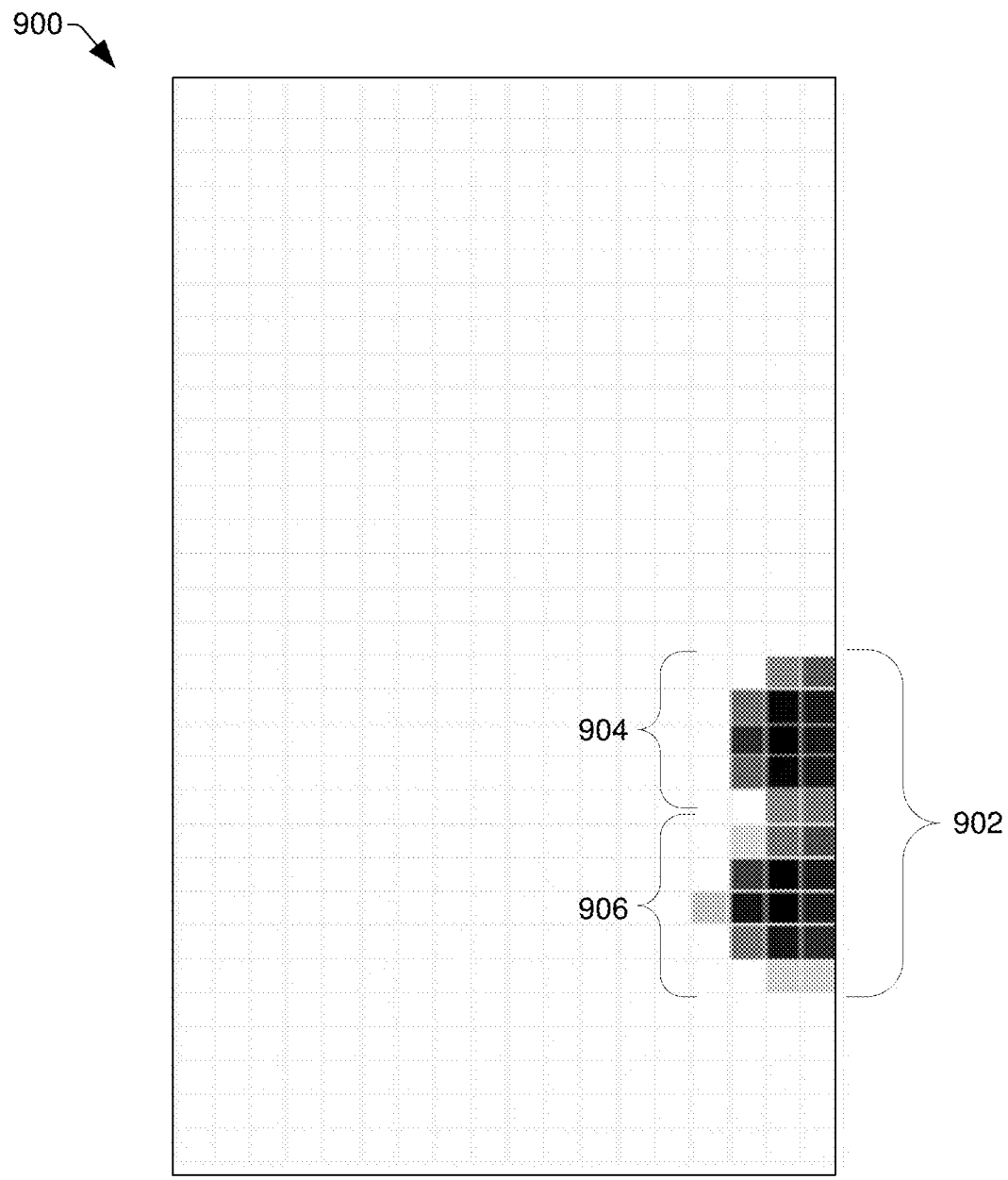
FIG. 9 presents a diagram of an example frame image that can be generated based at least in part on sensor data when certain surface-related sensors of the sensor array detect contact of two fingers of a user with a certain portion of the touch sensitive surface due to a grip of the user on the device, in accordance with various aspects and embodiments of the disclosed subject matter.

Referring to FIG. 9 (along with FIGS. 1 and 2), FIG. 9 presents a diagram of an example frame image 900 that can be generated based at least in part on sensor data when certain surface-related sensors 108 of the sensor array 202 detect contact (e.g., relative intensities of contact) of two fingers of a user with a certain (e.g., lower right side) portion of the touch sensitive surface 104 due to a grip of the user on the device 100, in accordance with various aspects and embodiments of the disclosed subject matter. In this example, the touch event(s) can relate to an instance where the user is gripping the device 100 such that two of the user's fingers are wrapped around the casing of the device 100 and are partly touching or in sufficiently close proximity to the lower right-side portion of the touch sensitive surface 104.

The frame image 900 can represent a frame associated with the touch sensitive surface 104 at a time during which two fingers of the user are in contact with a particular portion (e.g., a lower right side portion) of the touch sensitive surface 104. The respective certain surface-related sensors 108 (and/or other sensors 110) can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data based at least in part on the respective sensing of the respective sensors 108.

The classification component 112 can receive the sensor data from the certain surface-related sensors 108. The classification component 112 also can receive other sensor data (e.g., accelerometer data, gyroscope data, ultrasound data, and/or IMU data) from other sensors 110 of the sensor component 106. Based at least in part on the results of analyzing the respective sensor data from respective surface-related sensors of the certain surface-related sensors 108 and/or the other sensor data from the other sensors 110, the classification component 112 can generate the frame image 900 comprising the grayscale colored region 902 that can present grayscale information (e.g., corresponding to respective higher-density portions of the frame image 900) depicting respective intensities of contact of respective portions of the respective fingers of the user with the respective portions of the touch sensitive surface 104 and/or respective proximities of respective portions of the respective fingers of the user to the touch sensitive surface 104. For instance, the grayscale colored region 902 can indicate that an object(s), which correspond to (e.g., be in the shape of) two fingers (e.g., end portions of the fingers), is (are) in contact with the portion (e.g., lower right side portion) of the touch sensitive surface 104 that can correspond to the location of the grayscale colored region 902 depicted in the frame image 900. From the frame image 900, it can be observed that, for the grayscale colored region 902, there is a first grayscale colored portion 904 that can depict a first finger of the user touching the touch sensitive surface 104, and a second grayscale colored portion 906 that can depict a second finger of the user touching the touch sensitive surface 104.

The classification component 112 can determine or identify that there are two respective touch events by two fingers of the user on such portion (e.g., lower right side portion) of the touch sensitive surface 104 and can further determine that the two finger touches are both unintentional touch events, based at least in part on the results of analyzing the sensor data and/or other sensor data (e.g., raw sensor data and/or other raw sensor data) and/or analyzing the frame image 900 generated from the sensor data and/or the other sensor data. For instance, based on the analysis results, which can indicate the respective locations of the respective fingers touches and/or the respective touch intensity levels of the respective finger touches, the classification component 112 can determine that the two touch events are indicative of unintentional touch events due to unintentional touching of the touch sensitive surface 104 by the two fingers of the user as a result of the user gripping the device 100 in the user's hand.

Based at least in part on the classification of the touches by the two fingers of the user being unintentional touch events, the operation management component 114 can control the operation of the touch sensitive device 100 to reject the touches by the two fingers of the user. For example, if one or more of the user's two fingers is touching a button or control on the touch display screen of the touch sensitive surface 104, the operation management component 114 can control operation of the touch display screen and other components of the device 100 to prevent an operation associated with the button or control from being performed. Additionally or alternatively, the operation management component 114 can prevent the touch display screen from activating or turning on, if the touch display screen is currently in an inactive state or off state, or can switch the touch display screen to an inactive state or off state, if the touch display screen is currently in the active state or on state.

Figure 10:
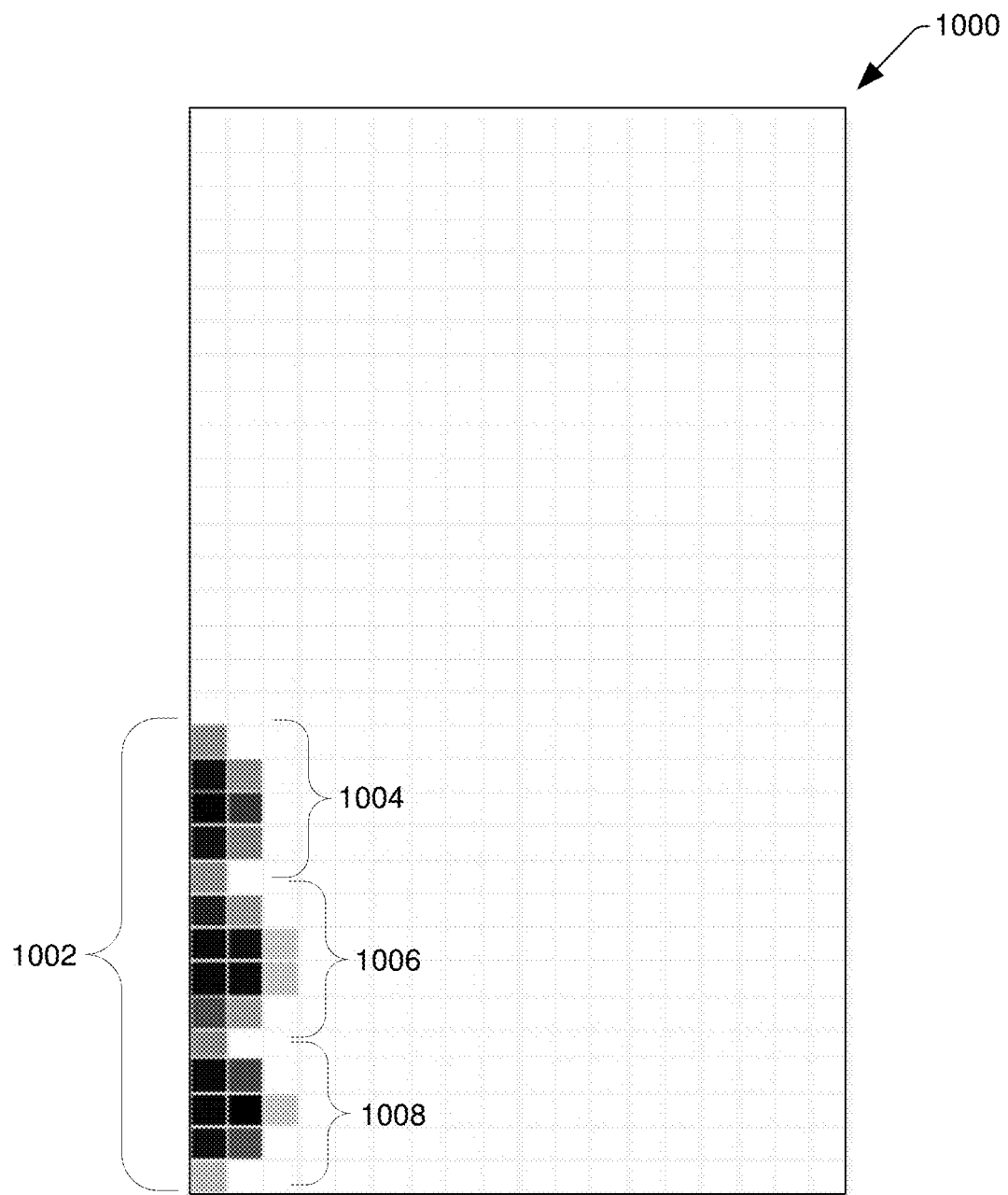
FIG. 10 depicts a diagram of an example frame image that can be generated based at least in part on sensor data when certain surface-related sensors of the sensor array detect contact of three fingers of a user with a certain portion of the touch sensitive surface due to a grip of the user on the device, in accordance with various aspects and embodiments of the disclosed subject matter.

Turning briefly to FIG. 10 (along with FIGS. 1 and 2), FIG. 10 depicts a diagram of an example frame image 1000 that can be generated based at least in part on sensor data when certain surface-related sensors 108 of the sensor array 202 detect contact (e.g., relative intensities of contact) of three fingers of a user with a certain (e.g., lower left side) portion of the touch sensitive surface 104 due to a grip of the user on the device 100, in accordance with various aspects and embodiments of the disclosed subject matter. In this example, the touch event(s) can relate to an instance where the user is gripping the device 100 such that three of the user's fingers are wrapped around the casing of the device 100 and are partly touching or in sufficiently close proximity to the lower left-side portion of the touch sensitive surface 104.

The analysis of sensor data by the classification component 112, in connection with the touch events depicted in the frame image 1000 of FIG. 10, the classification of the touch events for the three fingers touching the lower left side portion of the touch sensitive surface 104 (e.g., as illustrated by the grayscale colored region 1002), and the controlling of the operation of the device 100 by the operation management component 114 can be similar to that described herein with regard to the frame image 700 of FIG. 7, except that, in the frame image 1000, the three fingers are depicted as touching the lower left side portion of the touch sensitive surface 104, and, in the frame image 700, the three fingers are depicted as touching the bottom-right portion of the touch sensitive surface 104. As can be observed in the frame image 1000, with respect to the grayscale colored region 1002, there can be a first grayscale colored portion 1004 that can depict a first finger of the user touching the touch sensitive surface 104, a second grayscale colored portion 1006 that can depict a second finger of the user touching the touch sensitive surface 104, and a third grayscale colored portion 1008 that can depict a third finger of the user touching the touch sensitive surface 104.

Figure 11:
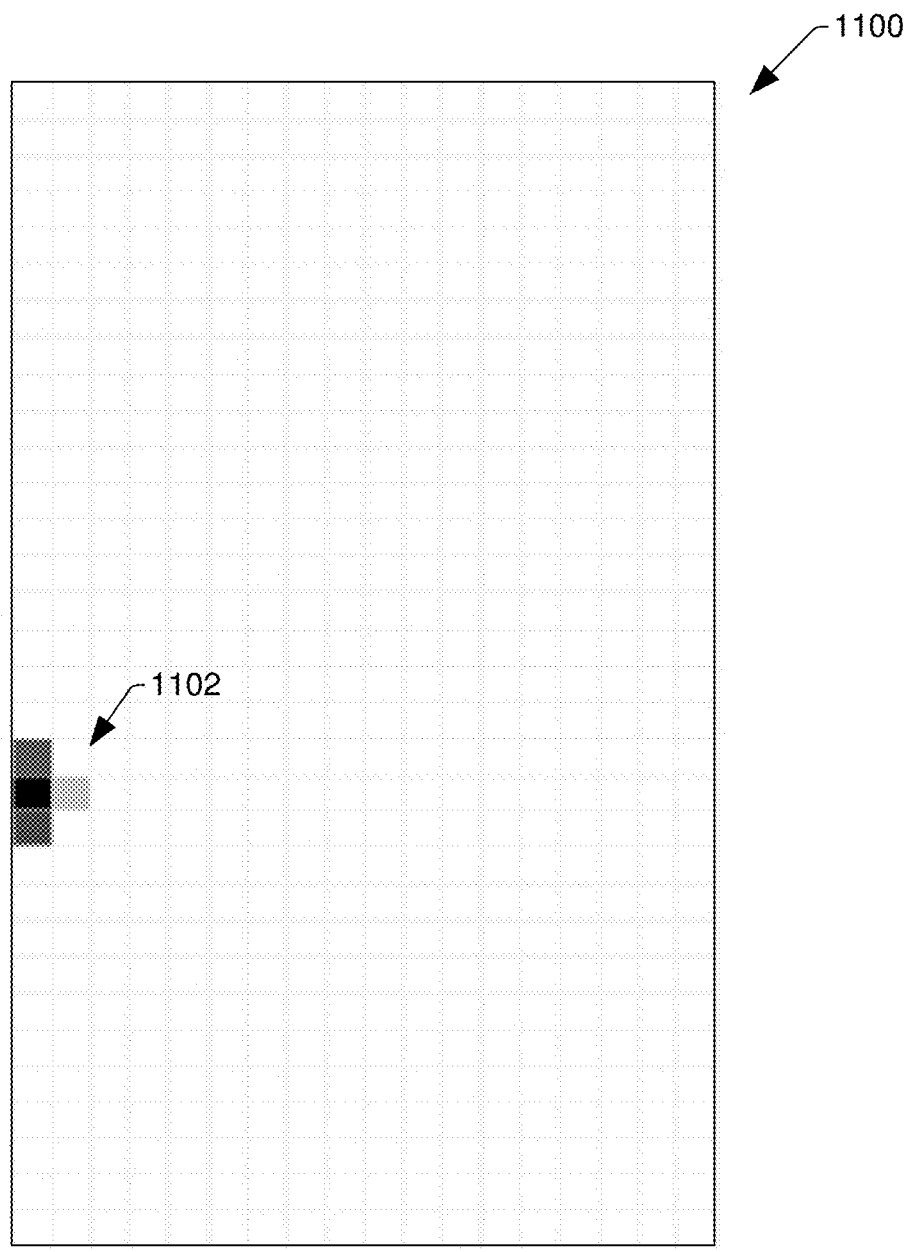
FIG. 11 illustrates a diagram of an example frame image that can be generated based at least in part on sensor data when certain surface-related sensors of the sensor array detect contact of one finger of a user with a particular portion of the touch sensitive surface due to a grip of the user on the device, in accordance with various aspects and embodiments of the disclosed subject matter.

Referring briefly to FIG. 11 (along with FIGS. 1 and 2), FIG. 11 illustrates a diagram of an example frame image 1100 that can be generated based at least in part on sensor data when certain surface-related sensors 108 of the sensor array 202 detect contact (e.g., relative intensities of contact) of one finger of a user with a particular (e.g., left side) portion of the touch sensitive surface 104 due to a grip of the user on the device 100, in accordance with various aspects and embodiments of the disclosed subject matter. In this example, the touch event(s) can relate to an instance where the user is gripping the device 100 such that one of the user's fingers is wrapped around the casing of the device 100 and is partly touching or is in sufficiently close proximity to the left-side portion of the touch sensitive surface 104.

The analysis of sensor data by the classification component 112, in connection with the touch event depicted in the frame image 1100 of FIG. 11, the classification of the touch event for the one finger touching the left side portion of the touch sensitive surface 104 (e.g., as illustrated by the grayscale colored region 1102), and the controlling of the operation of the device 100 by the operation management component 114 can be similar to that described herein with regard to the frame image 900 of FIG. 9, except that, in the frame image 1100, there is one finger that is touching the left side portion of the touch sensitive surface 104, and, in the frame image 900, there are two fingers that are touching the lower right side portion of the touch sensitive surface 104.

Figure 12:
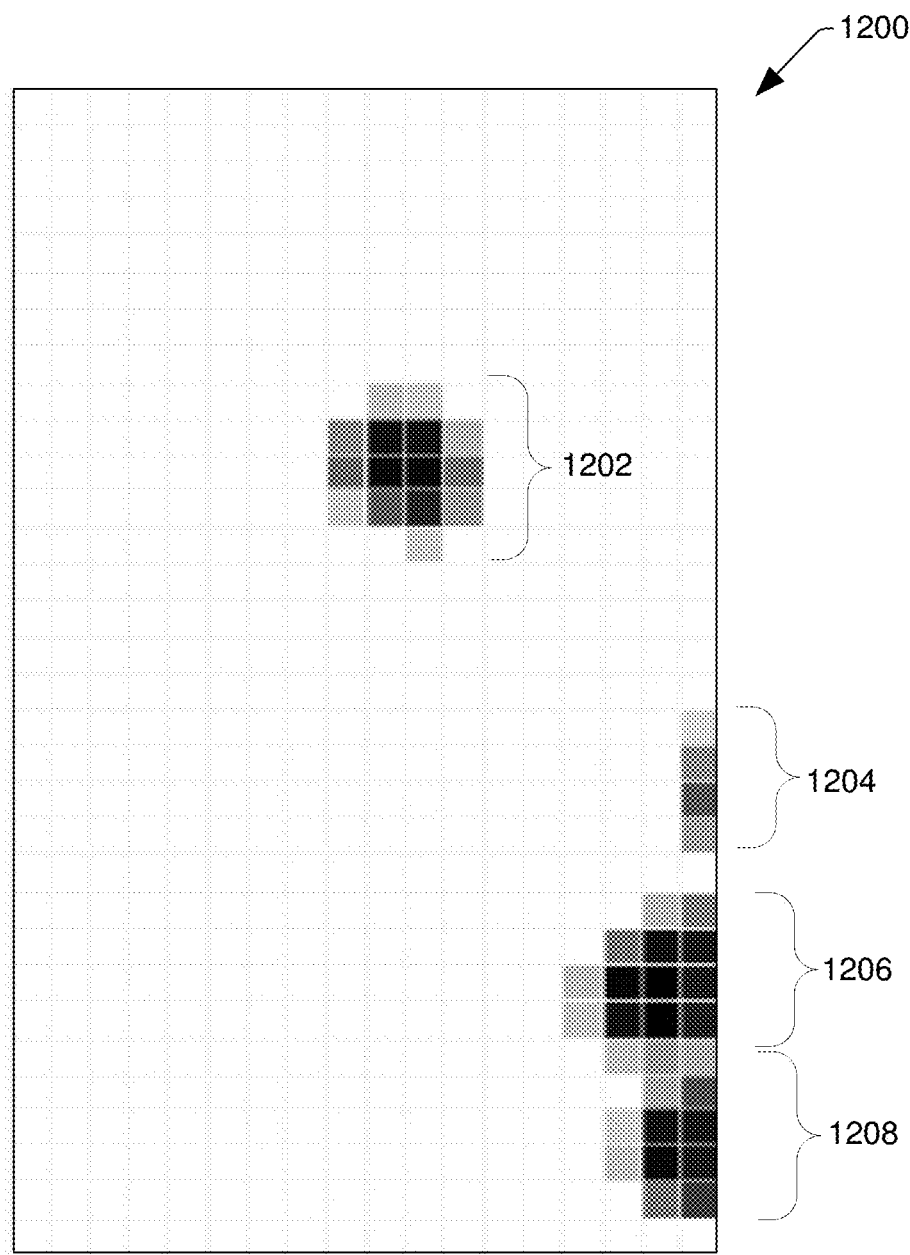
FIG. 12 depicts a diagram of an example frame image that can be generated based at least in part on sensor data when certain surface-related sensors of the sensor array detect contact of fingers of a user with respective portions of the touch sensitive surface due to a grip of the user on the device and a desired touching of the touch sensitive surface using a finger, in accordance with various aspects and embodiments of the disclosed subject matter.

With regard to FIG. 12 (along with FIGS. 1 and 2), FIG. 12 depicts a diagram of an example frame image 1200 that can be generated based at least in part on sensor data when certain surface-related sensors 108 of the sensor array 202 detect contact (e.g., relative intensities of contact) of fingers of a user with respective portions of the touch sensitive surface 104 due to a grip of the user on the device 100 and a desired touching of the touch sensitive surface 104 using a finger, in accordance with various aspects and embodiments of the disclosed subject matter. In this example, with regard to the frame image 1200, the touch events can relate to an instance where the user is gripping the device 100 such that three of the user's fingers are wrapped around the casing of the device 100 and are partly touching or in sufficiently close proximity to the bottom right portion of the touch sensitive surface 104, and another finger of the user is touching the touch sensitive surface 104 in another region of the touch sensitive surface 104. The respective surface-related sensors 108 (and/or other sensors) can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data based at least in part on the respective sensing of the respective sensors 108.

The classification component 112 can receive the sensor data from the surface-related sensors 108. The classification component 112 also can receive other sensor data (e.g., accelerometer data, gyroscope data, ultrasound data, and/or IMU data) from other sensors 110 (e.g., accelerometer, gyroscope, ultrasound, and/or IMU). Based at least in part on the results of analyzing the respective sensor data from respective surface-related sensors 108 and/or the other sensor data from the other sensors 110, the classification component 112 can generate the frame image 1200 comprising grayscale colored region 1202, grayscale colored region 1204, grayscale colored region 1206, and grayscale colored region 1208 that can respectively present grayscale information (e.g., corresponding to respective higher-density portions of the frame image 1200) illustrating respective intensities of contact of respective portions of the respective fingers of the user with the respective portions of the touch sensitive surface 104 and/or respective proximities of respective portions of the respective fingers of the user to the touch sensitive surface 104. For instance, the grayscale colored region 1202 can indicate that an object, which correspond to (e.g., be in the shape of) a finger (e.g., a tip, knuckle, or other portion of the finger), is in contact with the portion (e.g., a center portion) of the touch sensitive surface 104 that can correspond to the location of the grayscale colored region 1202 depicted in the frame image 1200. The grayscale colored regions 1204, 1206, and 1208 can indicate that respective objects, which correspond to (e.g., be in the shape of) respective other fingers (e.g., a tip, knuckle, or other portion of the other fingers), are in contact with respective portions on the right side of the touch sensitive surface 104 that can correspond to the location of the grayscale colored regions 1204, 1206, and 1208 depicted in the frame image 1200.

With regard to the grayscale colored region 1202, the classification component 112 can determine or identify that this touch event is a finger touch of the user on a center portion of the touch sensitive surface 104 and can further determine that such finger touch is an intentional touch event, based at least in part on the results of analyzing the sensor data and/or other sensor data (e.g., raw sensor data and/or other raw sensor data) and/or analyzing the frame image 1200 generated from the sensor data and/or the other sensor data. With regard to the other grayscale colored regions 1204, 1206, and 1208, the classification component 112 can determine or identify that these other grayscale colored regions 1204, 1206, and 1208 represent three respective touch events by three of the fingers of the user on such portion (e.g., bottom right side portion) of the touch sensitive surface 104 and can further determine that these three finger touches are all unintentional touch events, based at least in part on the results of analyzing the sensor data and/or other sensor data (e.g., raw sensor data and/or other raw sensor data) and/or analyzing the frame image 1200 generated from the sensor data and/or the other sensor data. For instance, based on the analysis results, which can indicate the respective locations of the respective fingers touches, the respective touch intensity levels of the respective finger touches, the classification component 112 can determine that these three touch events are indicative of unintentional touch events due to unintentional touching of the touch sensitive surface 104 by these three fingers as a result of the user gripping the device 100 in the user's hand.

With regard to the grayscale colored region 1202, based at least in part on the classification of the touch associated with the grayscale colored region 1202 as an intentional touch event and being a finger touch of the portion (e.g., a center portion) of the touch sensitive surface 104 that can correspond to the location of the grayscale colored region 1202, the operation management component 114 can control the operation of the touch sensitive device 100 to perform an operation (e.g., selection of a button, control, or application, . . . ) that can correspond to such touching of the touch sensitive surface 104.

With regard to the other grayscale colored regions 1204, 1206, and 1208, based at least in part on the classification of these touches by three of the other fingers of the user as unintentional touch events, the operation management component 114 can control the operation of the touch sensitive device 100 to reject such touches by three of the other fingers of the user. For instance, if one or more of the user's three fingers is touching a button or control on the touch display screen of the touch sensitive surface 104, the operation management component 114 can control operation of the touch display screen and other components of the device 100 to prevent an operation associated with the button or control from being performed. Additionally or alternatively, the operation management component 114 can prevent the portion of the touch display screen associated with (e.g., corresponding to) grayscale colored regions 1204, 1206, and 1208 from activating or turning on, if the touch display screen is currently in an inactive state or off state, or can switch such portion of the touch display screen to an inactive state or off state, if the touch display screen is currently in the active state or on state.

Figure 13:
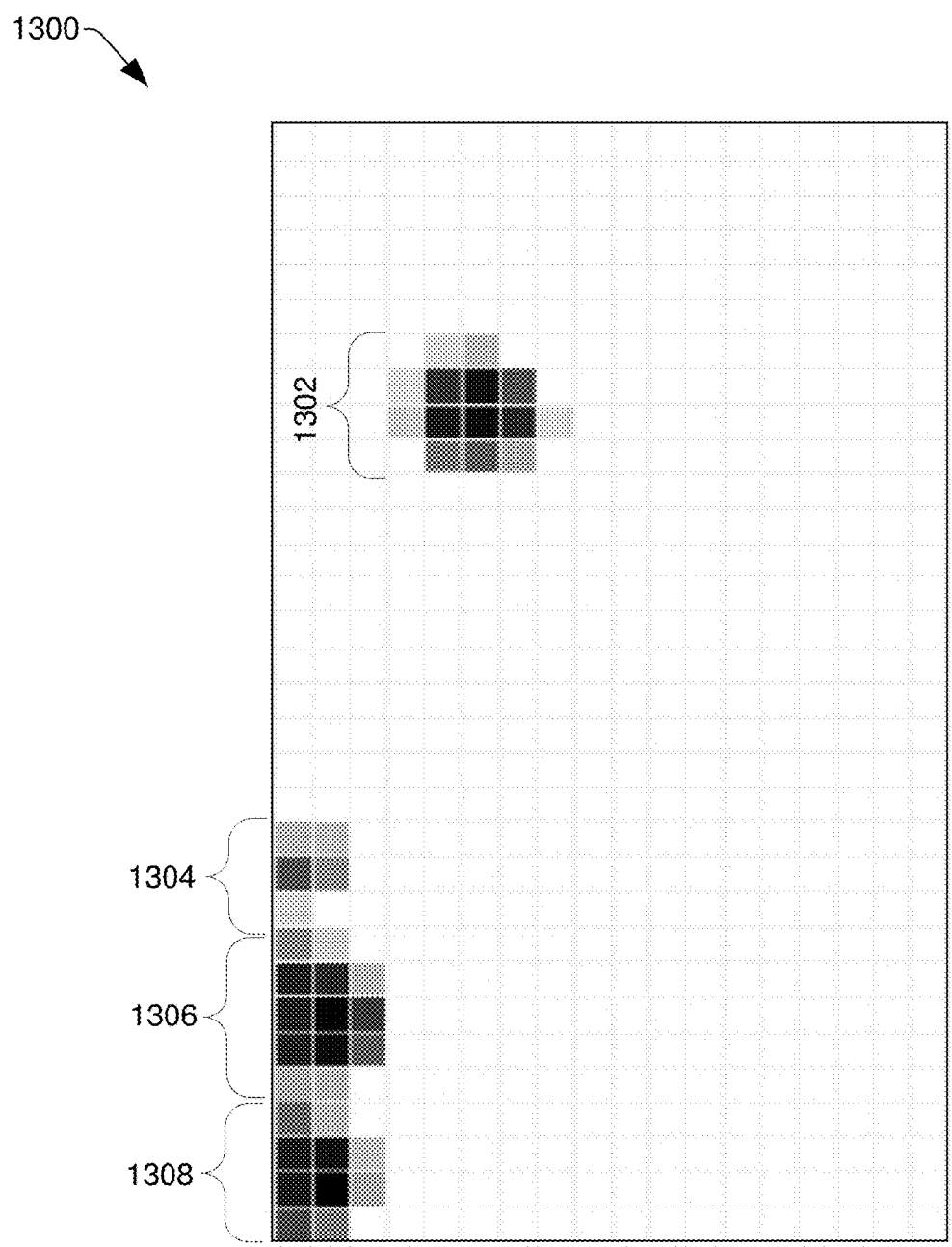
FIG. 13 illustrates a diagram of another example frame image that can be generated based at least in part on sensor data when certain surface-related sensors of the sensor array detect contact of fingers of a user with respective portions of the touch sensitive surface due to a grip of the user on the device and a desired touching of the touch sensitive surface using a finger, in accordance with various aspects and embodiments of the disclosed subject matter.

Referring briefly to FIG. 13 (along with FIGS. 1 and 2), FIG. 13 illustrates a diagram of another example frame image 1300 that can be generated based at least in part on sensor data when certain surface-related sensors 108 of the sensor array 202 detect contact (e.g., relative intensities of contact) of fingers of a user with respective portions of the touch sensitive surface 104 due to a grip of the user on the device 100 and a desired touching of the touch sensitive surface 104 using a finger, in accordance with various aspects and embodiments of the disclosed subject matter. In this example, the touch events can relate to an instance where the user is gripping the device 100 such that three of the user's fingers are wrapped around the casing of the device 100 and are partly touching or in sufficiently close proximity to the bottom left side portion of the touch sensitive surface 104, and another finger of the user is touching the touch sensitive surface 104 in another region of the touch sensitive surface 104.

The analysis of sensor data by the classification component 112, in connection with the touch events depicted in the frame image 1300 of FIG. 13, the classifications of the touch events for the one finger of the user touching a center portion of the touch sensitive surface 104 (e.g., as illustrated by the grayscale colored region 1302) and three of the other fingers of the user touching the bottom left side portion of the touch sensitive surface 104 (e.g., as illustrated by the grayscale colored regions 1304, 1306, and 1308), and the controlling of the operation of the touch sensitive device 100 by the operation management component 114 can be similar to that described herein with regard to the frame image 1200 of FIG. 12, except as follows. In the frame image 1300, the grayscale colored region 1302 can represent a different center portion of the touch sensitive surface 104 than the center portion of the touch event associated with the grayscale colored region 1202 of the frame image 1200 of FIG. 12 (e.g., which can relate to selection of a different control or button on the touch display screen than the control or button selection associated with the grayscale colored region 1202). Also, the grayscale colored regions 1304, 1306, and 1308 are located on the bottom left side of the frame image 1300, which correspondingly can represent three of the user's fingers being in contact with or proximity to the bottom left side of the touch sensitive surface 104, as compared to the grayscale colored regions 1204, 1206, and 1208 located on the bottom right side of the frame image 1200, which correspondingly can represent three of the user's fingers in contact with or proximity to the bottom right side of the touch sensitive surface 104.

Figure 14:
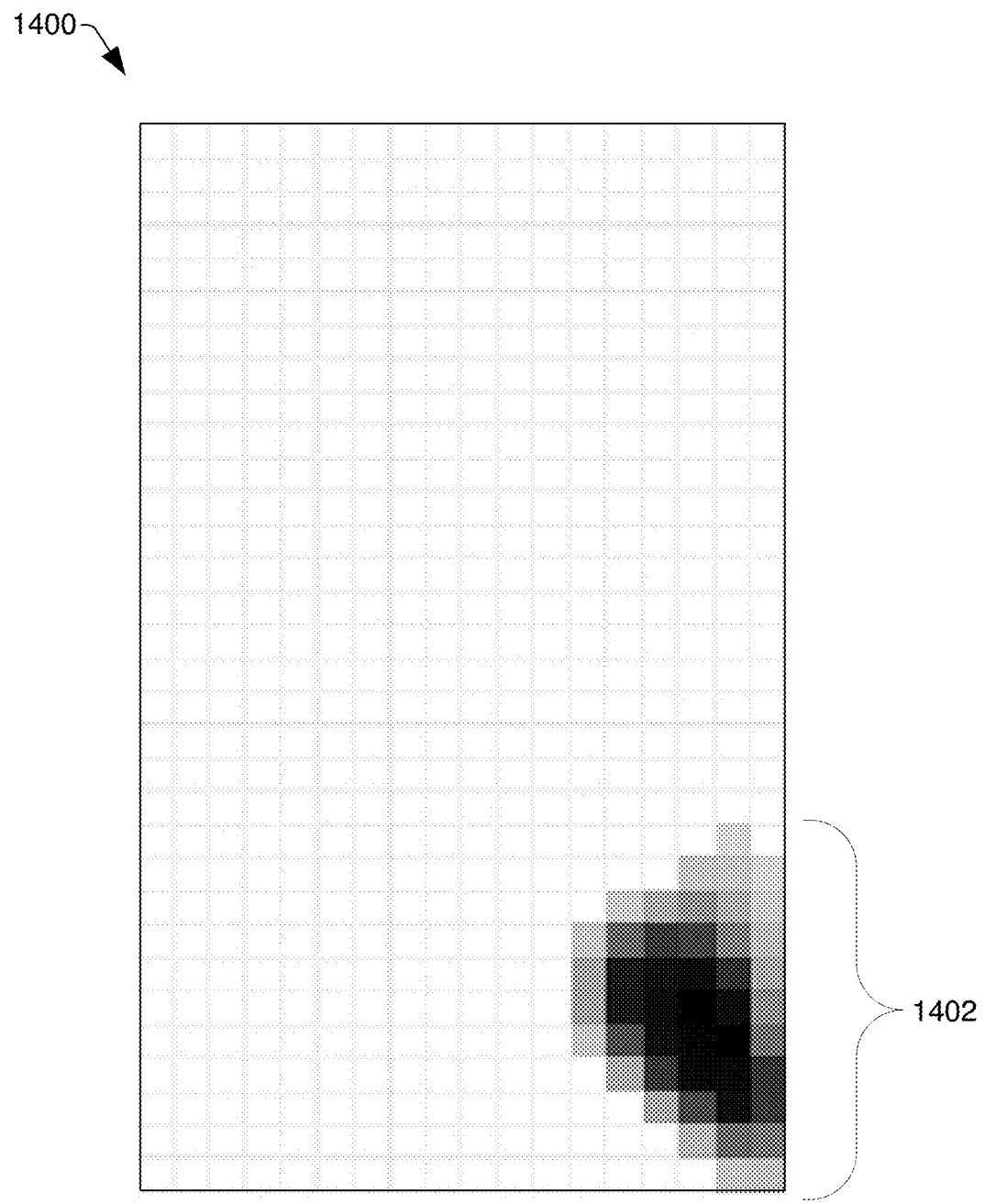
FIG. 14 depicts a diagram of an example frame image that can be generated based at least in part on sensor data when certain surface-related sensors of the sensor array detect contact of a palm of a user with a portion of the touch sensitive surface due to a grip of the user on the device, in accordance with various aspects and embodiments of the disclosed subject matter.

With regard to FIG. 14 (along with FIGS. 1 and 2), FIG. 14 depicts a diagram of an example frame image 1400 that can be generated based at least in part on sensor data when certain surface-related sensors 108 of the sensor array 202 detect contact (e.g., relative intensities of contact) of a palm of a user with a portion of the touch sensitive surface 104 due to a grip of the user on the device 100, in accordance with various aspects and embodiments of the disclosed subject matter. With regard to the frame image 1400, the touch event can relate to an instance where the user is gripping the device 100 such that the hand of the user is wrapped around the casing of the device 100 and the palm of the user is partly touching or in sufficiently close proximity to the bottom right portion of the touch sensitive surface 104. The respective surface-related sensors 108 (and/or other sensors) can respectively sense no contact, relative states of intensity of contact with the touch sensitive surface 104, and/or relative proximity of an object (e.g., finger(s) or palm of the user) to the touch sensitive surface 104 without touching the touch sensitive surface, and, accordingly, can generate sensor data based at least in part on the respective sensing of the respective sensors 108.

The classification component 112 can receive the sensor data from the surface-related sensors 108. The classification component 112 also can receive other sensor data (e.g., accelerometer data, gyroscope data, ultrasound data, and/or IMU data) from other sensors 110 (e.g., accelerometer, gyroscope, ultrasound, and/or IMU). Based at least in part on the results of analyzing the respective sensor data from respective surface-related sensors 108 and/or the other sensor data from the other sensors 110, the classification component 112 can generate the frame image 1400 comprising grayscale colored region 1402 that can present grayscale information (e.g., corresponding to respective higher-density portions of the frame image 1400) depicting respective intensities of contact of respective portions of the palm of the user with the respective portions of the touch sensitive surface 104 and/or respective proximities of respective portions of the palm of the user to the touch sensitive surface 104. For instance, the grayscale colored region 1402 can indicate that an object, which correspond to (e.g., be in the shape of) the palm of the user, is in contact with a bottom right portion of the touch sensitive surface 104 that can correspond to the location of the grayscale colored region 1402 depicted in the frame image 1400.

The classification component 112 can determine or identify that this touch event is a palm touch (e.g., actual physical touch or sufficiently close proximity to touching) of the user on the bottom right portion of the touch sensitive surface 104 and can further determine that such palm touch is an unintentional touch event, based at least in part on the results of analyzing the sensor data and/or other sensor data (e.g., raw sensor data and/or other raw sensor data) and/or analyzing the frame image 1400 generated from the sensor data and/or the other sensor data. Based at least in part on the classification of the touch associated with the grayscale colored region 1402 as an unintentional touch event and being a palm touch of the bottom right portion of the touch sensitive surface 104 that can correspond to the location of the grayscale colored region 1402, the operation management component 114 can control the operation of the touch sensitive device 100 to reject such palm touch of the user. For instance, if the user's palm is touching a button or control on the touch display screen of the touch sensitive surface 104, the operation management component 114 can control operation of the touch display screen and other components of the device 100 to prevent an operation associated with the button or control from being performed. Additionally or alternatively, the operation management component 114 can prevent the touch display screen, or at least the portion of the touch display screen associated with (e.g., corresponding to) the grayscale colored region 1402, from activating or turning on, if the touch display screen is currently in an inactive state or off state, or can switch all or the portion of the touch display screen to an inactive state or off state, if the touch display screen is currently in the active state or on state.

Figure 15:
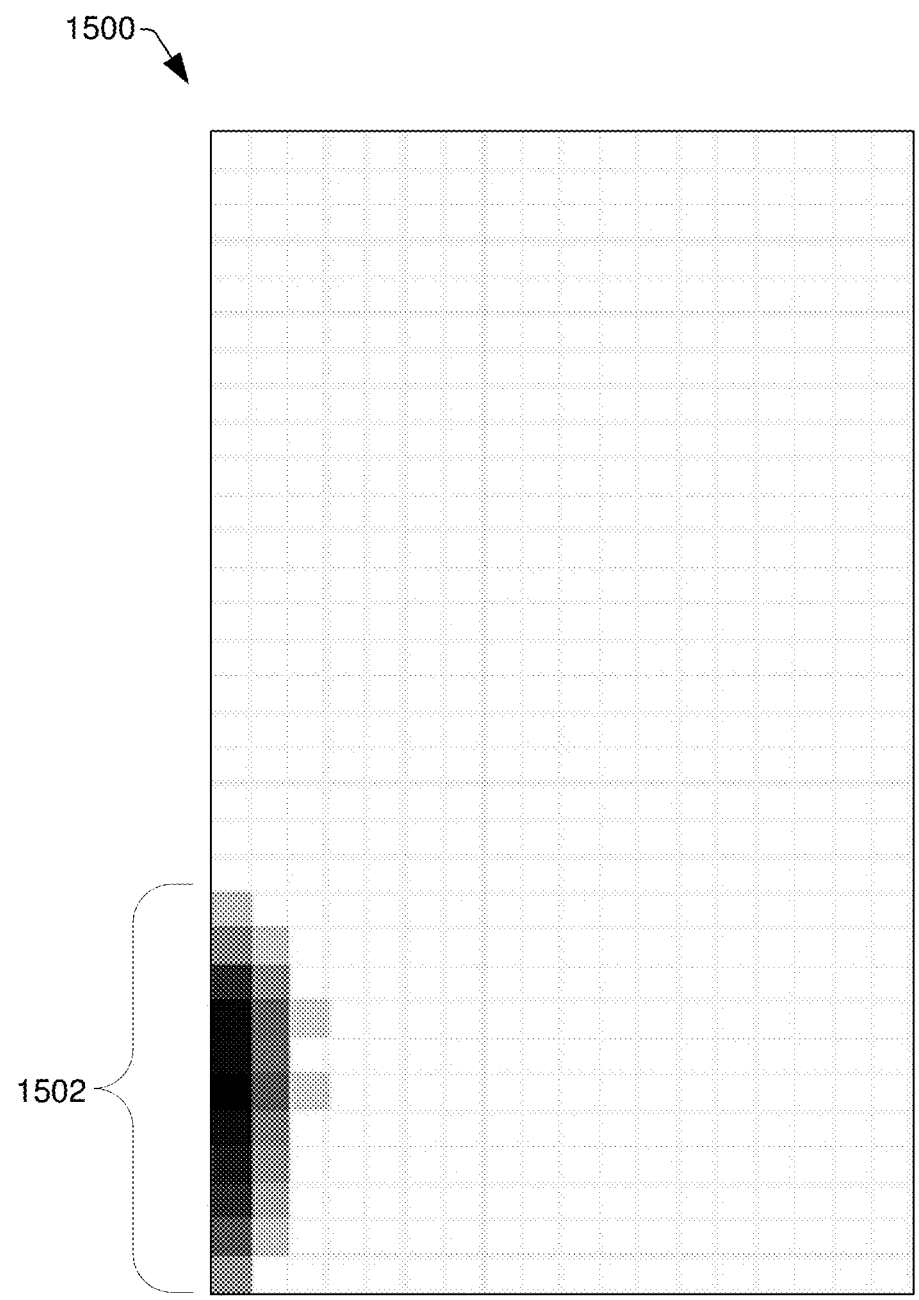
FIG. 15 illustrates a diagram of another example frame image that can be generated based at least in part on sensor data when certain surface-related sensors of the sensor array detect contact of a palm of a user with a particular portion of the touch sensitive surface due to a grip of the user on the touch sensitive device, in accordance with various aspects and embodiments of the disclosed subject matter.
Figure 16:
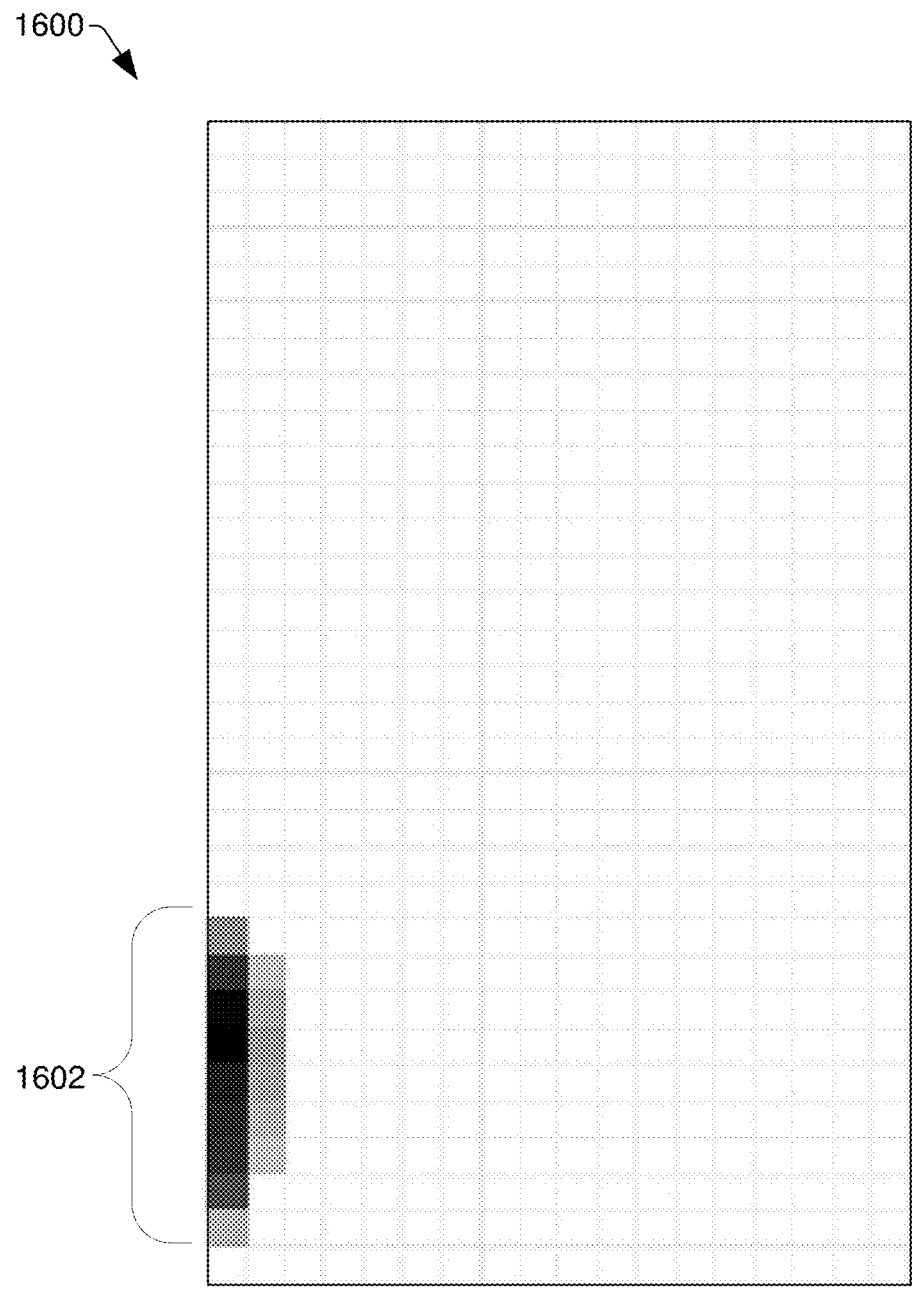
FIG. 16 illustrates a diagram of still another example frame image that can be generated based at least in part on sensor data when certain surface-related sensors of the sensor array detect contact of a palm of a user with a particular portion of the touch sensitive surface due to a grip of the user on the touch sensitive device, in accordance with various aspects and embodiments of the disclosed subject matter.

Referring briefly to FIGS. 15 and 16 (along with FIGS. 1 and 2), FIGS. 15 and 16 illustrate diagrams of respective example frame images 1500 and 1600 that can be generated based at least in part on sensor data when certain surface-related sensors 108 of the sensor array 202 detect contact (e.g., relative intensities of contact) of a palm of a user with a particular (e.g., lower left side) portion of the touch sensitive surface 104 due to a grip of the user on the touch sensitive device 100, in accordance with various aspects and embodiments of the disclosed subject matter. In the example frame image 1500 and example frame image 1600, the respective touch events can relate to instances where the user is gripping the device 100 such that hand of the user is wrapped around the casing of the device 100 and the user's palm is partly touching or is in sufficiently close proximity to the lower left side portion of the touch sensitive surface 104.

The respective analyses of the respective sensor data by the classification component 112, in connection with the respective touch events depicted in the frame image 1500 of FIG. 15 and the frame image 1600 of FIG. 16, the respective classifications of the respective touch events for the user's palm touching the lower left side portion of the touch sensitive surface 104 (e.g., as depicted by the grayscale colored region 1502 in FIG. 15, and the grayscale colored region 1602 in FIG. 16), and the controlling of the operation of the touch sensitive device 100 by the operation management component 114 can be similar to that described herein with regard to the frame image 1400 of FIG. 14, except that, in the frame image 1500 and the frame image 1600, the user's palm is touching the lower left side portion of the touch sensitive surface 104, and, in the frame image 1400, the user's palm is touching the lower right side portion of the touch sensitive surface 104. The difference between the frame image 1500 of FIG. 15 and the frame image 1600 of FIG. 16 is that there is a relatively small difference between the amount of area of the touch sensitive surface 104 with which the user's palm is in contact or in proximity to, as compared to the area (e.g., smaller area) of the touch sensitive surface 104 with which the user's palm is in contact or in proximity to, and the respective levels of intensity of the respective contacts of the user's palm with or the respective proximities of the user's palm to the touch sensitive surface 104 can be slightly different, as can be indicated (e.g., represented) by and observed from the frame image 1500 and the frame image 1600. As part of the respective analyses of the frame image 1500 and frame image 1600, the classification component 112 is able to recognize and identify the differences between the respective palm touches, but also is able to recognize and determine that the respective touch events indicated by the frame image 1500 and the frame image 1600 each represent respective unintentional palm touches on the touch sensitive surface 104 by the user, based at least in part on the training of the classification component 112.

Figure 17:
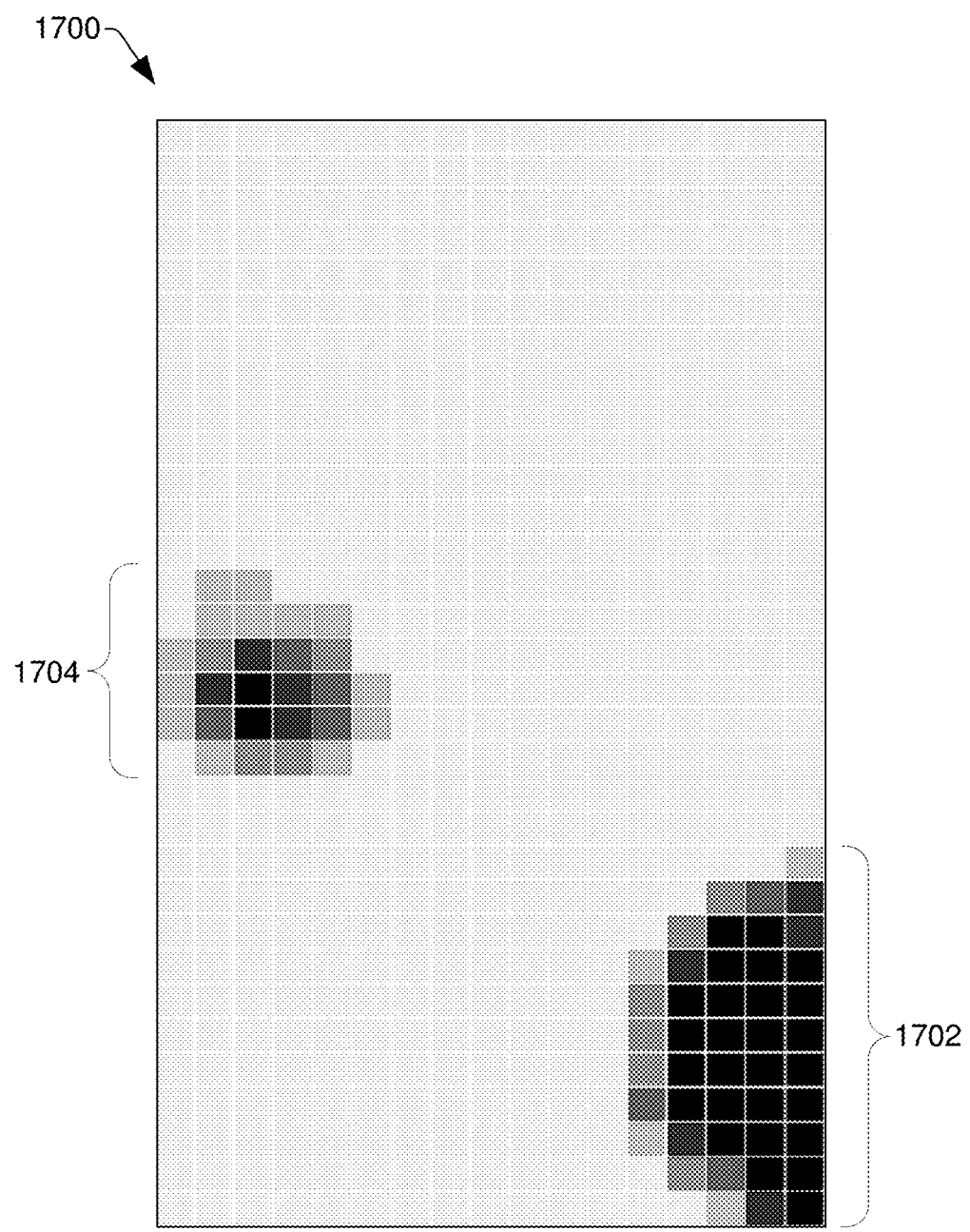
FIG. 17 presents a diagram of an example frame image that can be generated based at least in part on sensor data when certain surface-related sensors of the sensor array detect contact of a palm and a finger of a user with respective portions of the touch sensitive surface due to a grip of the user on the touch sensitive device, in accordance with various aspects and embodiments of the disclosed subject matter.

With regard to FIG. 17 (along with FIGS. 1 and 2), FIG. 17 presents a diagram of an example frame image 1700 that can be generated based at least in part on sensor data when certain surface-related sensors 108 of the sensor array 202 detect contact (e.g., relative intensities of contact) of a palm and a finger of a user with respective portions of the touch sensitive surface 104 due to a grip of the user on the touch sensitive device 100, in accordance with various aspects and embodiments of the disclosed subject matter. With regard to the frame image 1700, the touch event(s) can relate to an instance where the user is gripping the device 100 such that the hand of the user is wrapped around the casing of the device 100 and the palm of the user is partly touching or in sufficiently close proximity to the bottom right portion of the touch sensitive surface 104 and a finger of the user is partly touching or in sufficiently close proximity to the left side of the touch sensitive surface 104. The respective surface-related sensors 108 (and/or other sensors) can respectively sense no contact, relative states of intensity of contact with the touch sensitive surface 104, and/or relative proximity of an object (e.g., finger or palm of the user) to the touch sensitive surface 104 without touching the touch sensitive surface, and, accordingly, can generate sensor data based at least in part on the respective sensing of the respective sensors 108.

The classification component 112 can receive the sensor data from the surface-related sensors 108. The classification component 112 also can receive other sensor data (e.g., accelerometer data, gyroscope data, ultrasound data, and/or IMU data) from other sensors 110 (e.g., accelerometer, gyroscope, ultrasound, and/or IMU). Based at least in part on the results of analyzing the respective sensor data from respective surface-related sensors 108 and/or the other sensor data from the other sensors 110, the classification component 112 can generate the frame image 1700 comprising grayscale colored region 1702 that can present grayscale information (e.g., corresponding to respective higher-density portions of the frame image 1700) depicting respective intensities of contact of respective portions of the palm of the user with the respective portions of the touch sensitive surface 104 and/or respective proximities of respective portions of the palm of the user to the touch sensitive surface 104 on the bottom right side of the touch sensitive surface 104. For instance, the grayscale colored region 1702 can indicate that an object, which correspond to (e.g., be in the shape of) the palm of the user, is in contact with a bottom right portion of the touch sensitive surface 104 that can correspond to the location of the grayscale colored region 1702 depicted in the frame image 1700. The frame image 1700 also can comprise grayscale colored region 1704 that can present grayscale information illustrating respective intensities of contact of respective portions of a finger of the user with the respective portions of the touch sensitive surface 104 and/or respective proximities of respective portions of the finger of the user to the touch sensitive surface 104 on the left side of the touch sensitive surface 104.

The classification component 112 can determine or identify that the touch event associated with grayscale colored region 1702 is a palm touch (e.g., actual physical touch or sufficiently close proximity to touching) of the user on the bottom right portion of the touch sensitive surface 104 and can further determine that such palm touch is an unintentional touch event, based at least in part on the results of analyzing the sensor data and/or other sensor data (e.g., raw sensor data and/or other raw sensor data) and/or analyzing the frame image 1700 generated from the sensor data and/or the other sensor data. The classification component 112 also can determine or identify that the touch event associated with grayscale colored region 1704 is a finger touch (e.g., actual physical touch or sufficiently close proximity to touching) of the user on a left side portion of the touch sensitive surface 104 and can further determine that such finger touch is an unintentional touch event, based at least in part on the results of analyzing the sensor data and/or other sensor data, and/or analyzing the frame image 1700 generated from the sensor data and/or the other sensor data.

For instance, based at least in part on the training of the classification component 112, the classification component 112 can determine or identify that the touch events associated with the grayscale colored regions 1702 and 1704 of the frame image 1700 represent, correspond to, or correlate to an instance where the user is gripping the touch sensitive device 100 such that the hand of the user is wrapped around the casing of the device 100, with the user's palm being partly touching or in sufficiently close proximity to touching the bottom right portion of the touch sensitive surface 104 and the user's finger being partly touching or in sufficiently close proximity to touching the left side of the touch sensitive surface 104. The classification component 112 can recognize that relatively larger blob of grayscale colored region 1702 can correspond to the type of touch event that can occur from the palm coming into contact with or proximity to the bottom right side of the touch sensitive surface 104 in a common situation where the user is gripping the device 100 in the user's hand. The classification component 112 also can recognize that the grayscale colored region 1704 can represent or correspond to the type of touch event that can occur from a finger of the user coming into contact with or proximity to the left side of the touch sensitive surface 104 in a common situation where the user is gripping the device 100 in the user's hand, wherein the user's finger can be the user's thumb or can be one of the user's other fingers that wraps around the left side of the casing of the device 100 to come in contact with or proximity to the left side portion of the touch sensitive surface 104 that is associated with the grayscale colored region 1704.

Based at least in part on the classification of the respective touch events associated with the grayscale colored regions 1702 and 1704 as unintentional touch events relating to the palm and finger of the user with respect to the touch sensitive surface 104 that can correspond to the respective locations of the grayscale colored regions 1702 and 1704, the operation management component 114 can control the operation of the touch sensitive device 100 to reject such palm touch and finger touch of the user. For instance, if the user's palm or finger is touching a button or control on the touch display screen of the touch sensitive surface 104, the operation management component 114 can control operation of the touch display screen and other components of the device 100 to prevent an operation associated with the button or control from being performed. Additionally or alternatively, the operation management component 114 can prevent the touch display screen, or at least the portions of the touch display screen associated with (e.g., corresponding to) the grayscale colored regions 1702 and 1704, from activating or turning on, if the touch display screen is currently in an inactive state or off state, or can switch all or the portions of the touch display screen to an inactive state or off state, if the touch display screen is currently in the active state or on state.

Figure 18:
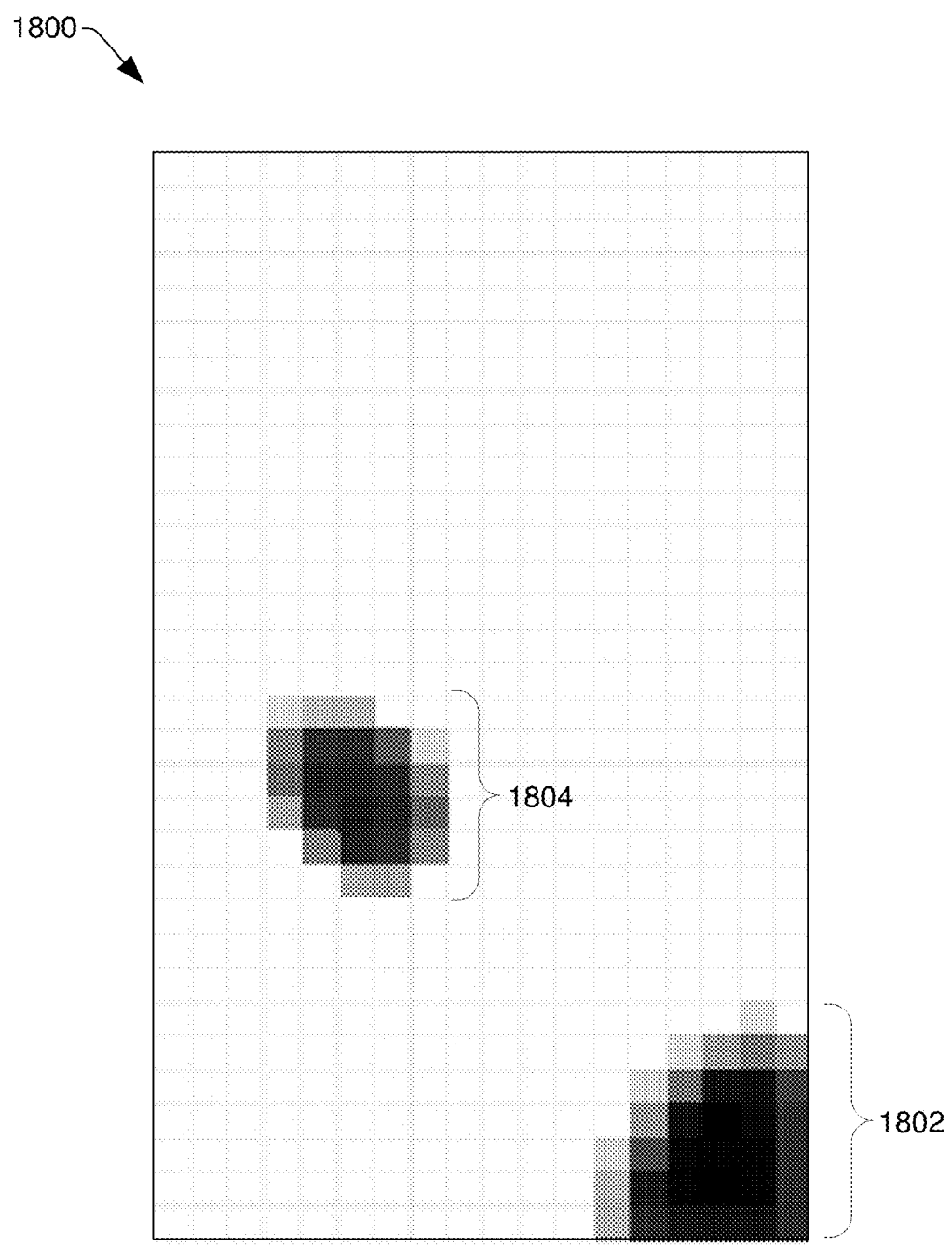
FIG. 18 depicts a diagram of an example frame images that can be generated based at least in part on sensor data when certain surface-related sensors of the sensor array detect contact of a palm and a thumb of a user with respective portions of the touch sensitive surface due to a grip of the user on the touch sensitive device, in accordance with various aspects and embodiments of the disclosed subject matter.
Figure 19:
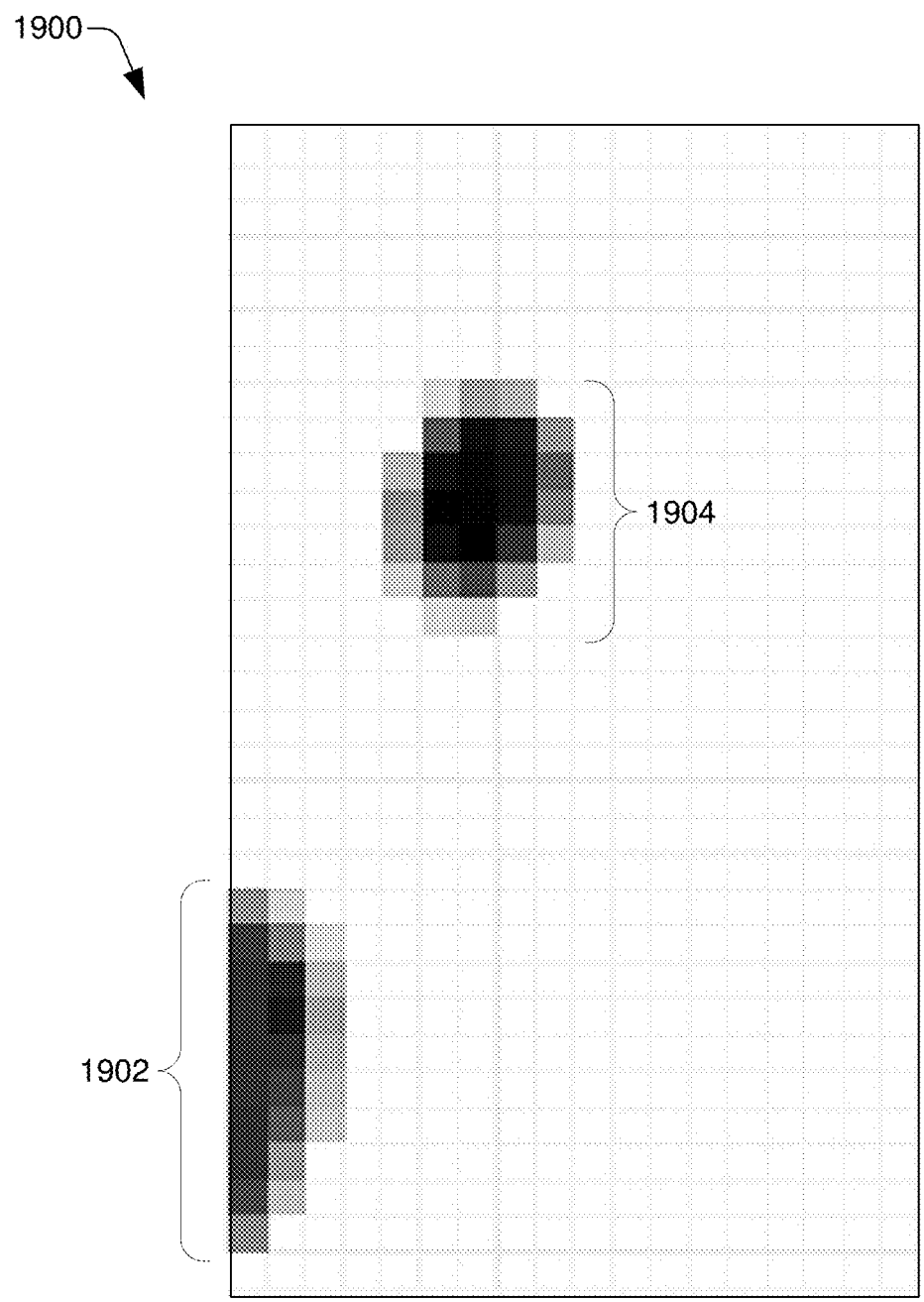
FIG. 19 depicts a diagram of another example frame images that can be generated based at least in part on sensor data when certain surface-related sensors of the sensor array detect contact of a palm and a thumb of a user with respective portions of the touch sensitive surface due to a grip of the user on the touch sensitive device, in accordance with various aspects and embodiments of the disclosed subject matter.
Figure 20:
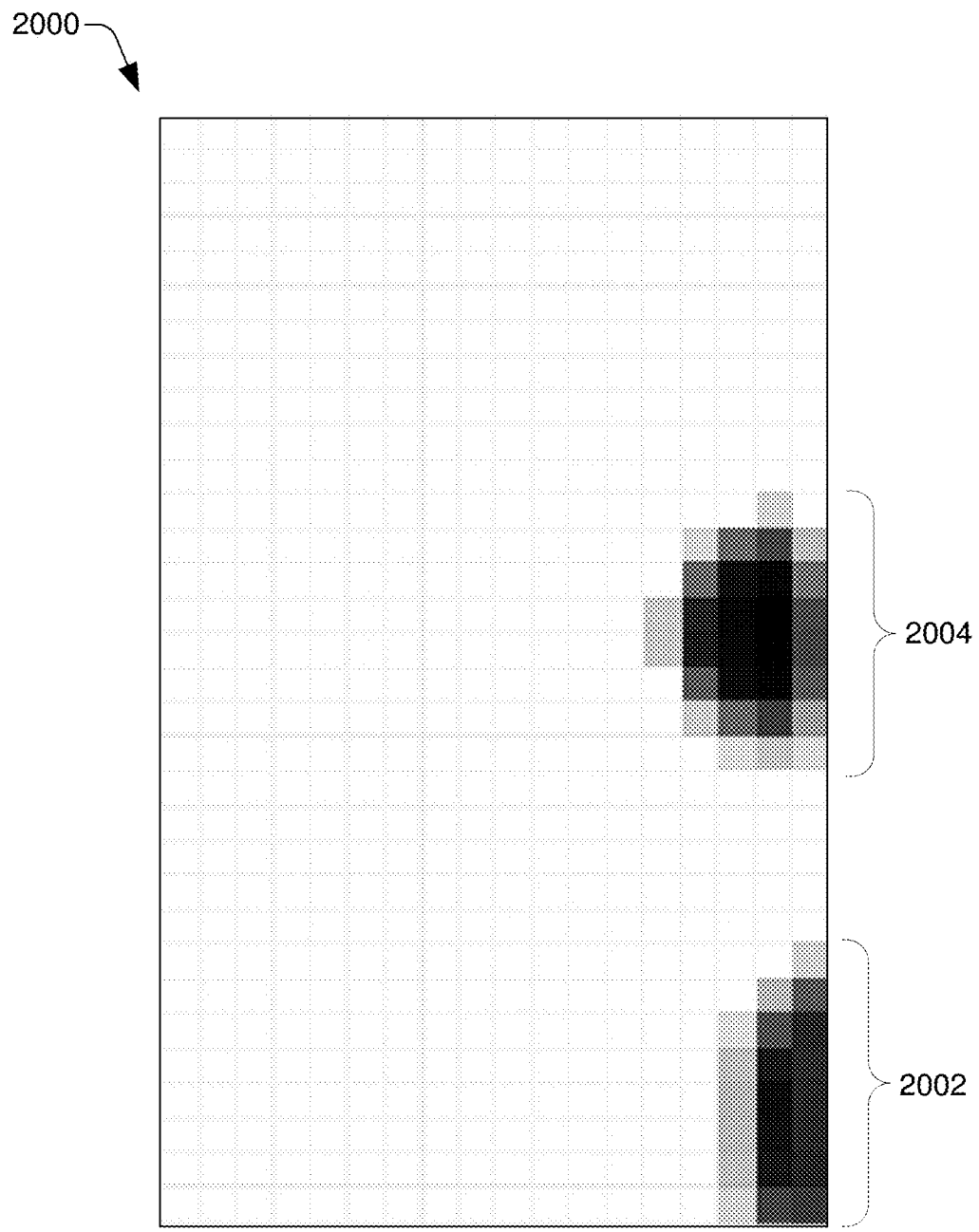
FIG. 20 depicts a diagram of still another example frame images that can be generated based at least in part on sensor data when certain surface-related sensors of the sensor array detect contact of a palm and a thumb of a user with respective portions of the touch sensitive surface due to a grip of the user on the touch sensitive device, in accordance with various aspects and embodiments of the disclosed subject matter.

Turning briefly to FIGS. 18, 19, and 20 (along with FIGS. 1 and 2), FIGS. 18, 19, and 20 depict diagrams of respective example frame images 1800, 1900, and 2000 that can be generated based at least in part on sensor data when certain surface-related sensors 108 of the sensor array 202 detect contact (e.g., relative intensities of contact) of a palm and a thumb of a user with respective portions of the touch sensitive surface 104 due to a grip of the user on the touch sensitive device 100, in accordance with various aspects and embodiments of the disclosed subject matter. In the example frame image 1800, example frame image 1900, and example frame image 2000, the respective touch events can relate to instances where the user is gripping the touch sensitive device 100 such that the hand of the user is gripping the casing of the device 100 and the user's palm is partly touching or is in sufficiently close proximity to touching a first portion (e.g., bottom right side portion, or bottom left side portion) of the touch sensitive surface 104 and the user's thumb is touching or is in sufficiently close proximity to touching a second portion (e.g., a center portion, or a side portion) of the touch sensitive surface 104.

The respective analyses of the respective sensor data by the classification component 112, in connection with the respective touch events depicted in the frame image 1800 of FIG. 18, the frame image 1900 of FIG. 19, and the frame image 2000 of FIG. 20, the respective classifications of the respective touch events for the user's palm touching the first portion of the touch sensitive surface 104 (e.g., as depicted by the grayscale colored region 1802 in FIG. 18, the grayscale colored region 1902 in FIG. 19, and the grayscale colored region 2002 in FIG. 20), the respective classifications of the respective touch events for the user's thumb touching the second portion of the touch sensitive surface 104 (e.g., as depicted by the grayscale colored region 1804 in FIG. 18, the grayscale colored region 1904 in FIG. 19, and the grayscale colored region 2004 in FIG. 20), and the controlling of the operation of the touch sensitive device 100 by the operation management component 114 can be similar to that described herein with regard to the frame image 1700 of FIG. 17, except for certain differences between the respective touch events of the respective frame images as follows. For instance, the differences between the frame image 1700 of FIG. 17 and the frame image 1800 of FIG. 18 is that there is a relatively small difference between the amount of area and the location of the area of the touch sensitive surface 104 with which the user's palm is in contact or in proximity to, as compared to the area (e.g., smaller and slightly differently located area) of the touch sensitive surface 104 with which the user's palm is in contact or in proximity to, there is a relatively small difference between the amount of area and the location of the area of the touch sensitive surface 104 with which the user's thumb is in contact or in proximity to, as compared to the area (e.g., smaller and slightly differently located area) of the touch sensitive surface 104 with which the user's palm is in contact or in proximity to, and the respective levels of intensity of the respective contacts of the user's palm and thumb with or the respective proximities of the user's palm and thumb to the touch sensitive surface 104 can be slightly different, as can be indicated (e.g., represented) by and observed from the frame image 1700 and the frame image 1800.

With regard to the frame image 1900 as compared to the frame image 1700, as depicted in the frame image 1900, the user's palm is touching the bottom left side portion and the user's thumb is touching a center portion of the touch sensitive surface 104, and, in the frame image 1700, the user's palm is touching the bottom right side portion and the user's thumb is touching a middle left-side portion of the touch sensitive surface 104. For instance, the frame image 1900 can represent a situation where the user is gripping the device 100 using the user's left hand, whereas the frame image 1700 can represent a situation where the user is gripping the device 100 using the user's right hand.

With regard to the frame image 2000 as compared to the frame image 1700, as depicted in the frame image 2000, the user's palm is touching the bottom right side portion of the touch sensitive surface 104, although is touching a relatively smaller portion of the touch sensitive surface 104 than the palm touch event depicted in the frame image 1700. Also, as depicted in the frame image 2000, the user's thumb is touching a middle right-side portion of the touch sensitive surface, whereas, as depicted in the frame image 1700, the user's thumb is touching a middle left-side portion of the touch sensitive surface 104. Further, in comparing the frame image 2000 to the frame image 1700, as can be observed, there can be relatively small differences between the respective levels of intensity of the respective touch events with the touch sensitive surface 104. While there are such differences between the touch events associated with the frame image 2000 and the touch events associated with the frame image 1700, based at least in part on the training of the classification component 112, the classification component 112 can have the capability of recognizing, identifying, or determining that the touch events associated with the frame image 2000 are unintentional touch events involving the palm and thumb of the user with respect to the touch sensitive surface 104 due to the user gripping the device 100 in the user's hand, and also recognizing, identifying, or determining that the touch events associated with the frame image 1700 are different, but similar (e.g., similar to frame image 2000) unintentional touch events involving the palm and thumb of the user with respect to the touch sensitive surface 104 due to the user gripping the device 100 in the user's hand.

That is, as part of the respective analyses of the frame image 1700, frame image 1800, frame image 1900, and frame image 2000, the classification component 112 is able to recognize and identify the differences between the respective palm touches and thumb touches, but also is able to recognize and determine that the respective touch events indicated by the frame image 1700, frame image 1800, frame image 1900, and frame image 2000 each represent respective unintentional palm and thumb touches on the touch sensitive surface 104 by the user, based at least in part on the training of the classification component 112.

It is to be appreciated and understood that the objects that can come into contact with the touch sensitive surface 104 is not limited to fingers or palms of the user. For example, mobile phones, PDAs, electronic tablets, and electronic gaming devices also can be held against an ear or face of a user at times so as to enable the user to better hear the sound produced by the device or to hear the sound produced by the device more confidentially, and/or to otherwise interact with the device. This can create a variety of different contacts with the touch sensitive surface 104.

In some embodiments, the classification component 112 can classify and discriminate (e.g., accurately classify and discriminate) between one or more contacts (e.g., touches or proximate touching) of one or more objects with the touch sensitive surface 104 based at least in part on the results of analyzing the pattern of contacts against or in proximity to the touch sensitive surface 104. For instance, the classification component 112 can analyze a frame image using pattern recognition tools and techniques to determine whether the two-dimensional frame image associated with the touch sensitive surface 104 has an appearance associated with a particular type of contact (e.g., a finger touch, a palm touch, . . . ). For example, palm touch contacts with the touch sensitive surface 104 can or may appear as relatively large irregular blobs, while fingers in contact with the touch sensitive surface 104 can tend to appear as relatively smaller ellipsoids. The classification component 112 can recognize and use the differences in shape and size of such different types of contact with the touch sensitive surface 104 to distinguish between and respectively identify palm touch contacts and finger touch contacts with, or proximity of a palm or finger(s) to, the touch sensitive surface 104 (e.g., through use of various classification techniques, such as machine learning), as more fully described herein.

In accordance with various embodiments, the classification component 112 can classify and discriminate (e.g., accurately classify and discriminate) between one or more contacts of (or proximity of) one or more objects with (or to) the touch sensitive surface 104, and can determine a classification of one or more touch events of the one or more objects with respect to the touch sensitive surface 104, based at least in part on the results of analyzing touch surface data (e.g., surface-related sensor data) associated with the touch sensitive surface 104 (e.g., the pattern of contacts against (or in proximity to) the touch sensitive surface 104), motion data relating to motion of the touch sensitive device 100, impact data or force data with respect to an amount of impact or force of an object(s) on the touch sensitive surface 104 (e.g., obtained from an accelerometer, force sensor, or other type of sensor), and/or other sensor data, in accordance with defined classification criteria, as more fully described herein. The classifications of touch events of objects that the classification component 112 can make can comprise, for example, a no touch state, an unintentional touch state (e.g., an unintentional palm touch state, an unintentional finger touch state, and/or an unintentional touch state relating to another body part or object), an intentional touch state (e.g., an intentional finger touch state, an intentional finger-hovering state, and/or an intentional object touch state), and/or one or more other types of classifications of touch events, as more fully described herein.

In some embodiments, the other sensors 110 of the sensor component 106 can comprise one or more motion-related sensors that can be employed to detect motion of the touch sensitive device 100 about or along one or more axes (e.g., x-axis, y-axis, and/or z-axis) and can generate sensor data (e.g., motion-related sensor data) that can correspond to the motion of the touch sensitive device 100 detected by the one or more motion-related sensors. For example, a multi-axis (e.g., two or three axis) motion-related sensor can generate first motion data relating to motion of the touch sensitive device along a first axis (e.g., x-axis), second motion data relating to motion of the touch sensitive device along a second axis (e.g., y-axis), and/or third motion data relating to motion of the touch sensitive device along a third axis (e.g., z-axis).

The one or more motion-related sensors can comprise, for example, one or more of an accelerometer(s), a gyroscope(s), an inertial measurement unit (IMU), and/or another type(s) of motion-related sensor. Respective motion-related sensors (e.g., accelerometer, gyroscope, IMU, and/or other type of motion-related sensor) can be single-axis motion-related sensors or multiple-axis (e.g., two-axis or three-axis) motion related sensors. The one or more motion-related sensors can monitor and sense motion of the touch sensitive device 100 at a desired sensing rate (e.g., a second or sub-second rate). For example, a motion-related sensor can monitor and sense motion of the touch sensitive device 100 along one or more axes every $1/30^{th}$ of a second, every $1/60^{th}$ of a second, every $1/100^{th}$ of a second, or at another desired sensing rate. In certain embodiments, the motion-related sensors can include one or more vibro-acoustic sensors that can detect and/or measure movement or vibrations of the touch sensitive device 100. The one or more vibro-acoustic sensors can generate motion data, comprising vibro-acoustic data, based at least in part on the detected or measured movement or vibrations of the touch sensitive device 100, and can provide such motion data to the classification component 112 for analysis.

In some embodiments, as motion data is generated by the motion-related sensors, that motion data can be stored in a buffer component 116 (e.g., buffer memory) for a desired amount of time. For instance, the buffer component 116 can store motion data (and/or touch surface data) that can cover a defined period of time (e.g., the last second, the last two seconds, the last three seconds, or another desired period of time). As an example, in response to determining that the touch sensitive device 100 is in an in-call state or an active state (e.g., the touch sensitive surface 104 is in an active state), the classification component 112 (or another component, such as a processor, of the touch sensitive device) can have the buffer component 116 store the motion data, the touch surface data (e.g., obtained from the surface-related sensors 108), or other desired data (e.g., orientation data, touch data, . . . ) to facilitate analysis of such data by the classification component 112.

With regard to employing touch surface data and motion data to classify contact or association with the touch sensitive surface 104, the classification component 112 can analyze touch surface data (e.g., surface-related sensor data) received from the surface-related sensors 108. In some embodiments, as part of the analysis, the classification component 112 can identify and extract features related to contact or association (e.g., hovering) of an object(s) with the touch sensitive surface 104 from the touch surface data. The features can comprise, for example, characteristics, shapes, dimensions, spectral centroid, spectral density, spherical harmonics, total average spectral energy, and/or log spectral band ratios related to the contact or association of the object(s) with the touch sensitive surface 104, with respect to the time domain or frequency domain, respectively. The classification component 112 can utilize the features (e.g., extracted features) to generate a frame image, comprising frame data, of the contact or association of the object(s) with the touch sensitive surface 104. In other embodiments, the classification component 112 can analyze the touch surface data without extracting features relating to contact or association (e.g., hovering) of the object(s) with the touch sensitive surface 104 from the touch surface data.

Based at least in part on the results of analyzing such touch surface data, the classification component 112 can determine at least an initial classification (e.g., initial contact classification) of the touch event(s) of an object(s) with the touch sensitive surface 104 in accordance with the defined classification criteria, as more fully described herein. For instance, based at least in part on the results of analyzing the touch surface data, the classification component 112 can determine that the touch surface data is indicative of a particular classification of a touch event(s) of an object(s) with the touch sensitive surface 104. The classification component 112 can perform such determination regarding such classification of the touch event(s) based at least in part on the results of analyzing the raw touch surface data (without extracting features from the touch surface data) or based at least in part on the results of analyzing the features extracted from the touch surface data.

The classification component 112 also can analyze other sensor data, such as motion data (e.g., motion-related sensor data) received from the motion-related sensors, impact or force data received from certain other sensors 110 (e.g., accelerometer, gyroscope, or force sensor), and/or another type of sensor data. In connection with performing the analysis, the classification component 112 can retrieve the motion data, impact or force data, or other sensor data that is stored in the buffer component 116, wherein such motion data, impact or force data, or other sensor data can cover a defined period of time. In some embodiments, as part of the analysis, the classification component 112 can identify and extract features related to contact or association (e.g., hovering) of an object(s) with the touch sensitive surface 104 from the motion data, impact or force data, or other sensor data. The classification component 112 can utilize the features (e.g., extracted features) to generate a frame image, comprising frame data, of the contact or association of the object(s) with the touch sensitive surface 104. In certain embodiments, the classification component 112 can perform an integrated analysis of the touch surface data and the other sensor data (e.g., motion data, impact or force data, and/or other type of sensor data), wherein the classification component 112 can generate a frame image, comprising frame data, of the contact or association of the object(s) with the touch sensitive surface 104 based at least in part on the features extracted from the touch surface data and the other sensor data as part of the analysis. In other embodiments, the classification component 112 can analyze the other sensor data (and the touch surface data) without extracting features relating to contact or association (e.g., hovering) of the object(s) with the touch sensitive surface 104 from the other sensor data (or the touch surface data).

The classification component 112 can determine a classification of the touch event(s) of the object(s) with the touch sensitive surface 104 based at least in part on the results of analyzing the motion data, impact or force data, and/or other type of sensor data, in accordance with the defined classification criteria, as more fully described herein. For example, based at least in part on the results of analyzing the motion data, impact or force data, and/or other type of sensor data, the classification component 112 can determine that the motion data, impact or force data, and/or other type of sensor data is indicative of a particular classification of a touch event(s) of an object(s) with the touch sensitive surface 104 (or, in some instances, may be indicative of a different classification of a touch event(s) of an object(s) with the touch sensitive surface 104 from a touch event classification determined based on the touch surface data).

In some implementations, the analysis of the other sensor data (e.g., motion data, impact or force data, and/or other type of sensor data) by the classification component 112 can be used by the classification component 112 to facilitate verifying or confirming the initial contact classification derived from the analysis of the touch surface data (e.g., surface-related sensor data). For example, if the initial contact classification based on the touch surface data is that there is contact by an object(s) with the touch sensitive surface 104, and such contact or association is an intentional finger touch of the touch sensitive surface 104 by the user, and if the analysis of the other sensor data indicates that there is an intentional finger touch of the touch sensitive surface 104 by the user, the classification component 112 can determine that the other sensor data analysis confirms the initial touch event classification, and can determine that the touch event classification associated with the touch event of the object with the touch sensitive surface 104 is an intentional finger touch of the touch sensitive surface 104. If, however, the initial contact classification based on the touch surface data is that there is contact with the touch sensitive surface 104, and such contact is an unintentional touch of a palm and finger of the user with the touch sensitive surface 104, and if the analysis of the other sensor data indicates that a finger of the user is in contact with the touch sensitive surface 104 and such contact is an intentional touch of the finger of the user with the touch sensitive surface 104, the classification component 112 can determine that the other sensor data analysis does not confirm the initial touch event classification determined using the touch surface data, and can determine that no touch event classification can be determined based on such sensor data, and/or can determine that other types of sensor data are to be analyzed, and/or can determine that additional touch surface data and/or other sensor data are to be collected and analyzed, to facilitate determining a classification of the touch event(s) of an object(s) with with the touch sensitive surface 104.

In other implementations, if the initial contact classification attempt based on the touch surface data was inconclusive or ambiguous, the analysis of the other sensor data (e.g., motion data, impact or force data, and/or other type of sensor data) by the classification component 112 can be used by the classification component 112 to facilitate determining a classification of a touch event(s) of an object(s) with the touch sensitive surface 104, in accordance with the defined classification criteria. In still other implementations, the classification component 112 can determine a classification of touch event(s) of an object(s) with respect to the touch sensitive surface 104 based at least in part on the results of analyzing one or more types of other sensor data (e.g., motion data), without having to analyze touch surface data or other types of sensor data, in accordance with the defined classification criteria.

In some embodiments, the classification component 112 can comprise a classification engine (e.g., trained classification engine) that can identify and/or distinguish between different types of touch events (e.g., contact or association (e.g., hovering)) of objects with the touch sensitive surface 104 based at least in part on the results of analyzing touch surface data and/or the other sensor data (e.g., motion data, impact or force data, and/or other type of sensor data) associated with the touch sensitive device 100. The classification engine of the classification component 112 can be trained by applying positive examples of touch surface data relating to intentional finger(s) contacts (e.g., single-point finger contacts, multi-point finger contacts) or associations (e.g., hovering finger(s)) with the touch sensitive surface 104 and positive examples of touch surface data relating to unintentional contacts or associations (e.g., unintentional finger contacts or associations, unintentional palm contacts or associations, . . . ) of objects with the touch sensitive surface 104 to the classification engine to train the classification engine to identify and distinguish between various different types of touch events (e.g., contacts or associations) with the touch sensitive surface 104. The positive examples of touch surface data can comprise, for example, positive examples of patterns of contact or association relating to intentional finger(s) contacts or associations with the touch sensitive surface 104 and positive examples of patterns of contact or association relating to unintentional contacts or associations (e.g., unintentional finger or palm contacts or associations,) with the touch sensitive surface 104.

The classification engine of the classification component 112 also can be trained by applying positive examples of other sensor data (e.g., accelerometer data, gyroscope data, ultrasonic sensor data, motion data, impact or force data, orientation data, and/or other type of sensor data) relating to intentional finger(s) contacts (e.g., single-point finger contacts, multi-point finger contacts) or associations (e.g., hovering) with the touch sensitive surface 104 and positive examples of other sensor data relating to unintentional contacts or associations of objects (e.g., unintentional finger contacts or associations, unintentional palm contacts or associations, . . . ) with the touch sensitive surface 104 to the classification engine to train the classification engine to identify and distinguish between various different types of touch events associated with the touch sensitive surface 104. The positive examples of such other sensor data can comprise, for example, positive examples of patterns of such other sensor data relating to intentional finger(s) contacts or associations with the touch sensitive surface 104 and positive examples of patterns of such other sensor data relating to unintentional contacts or associations with the touch sensitive surface 104.

The classification engine can be updated and refined (e.g., automatically or dynamically update and refined) over time to enhance classifications of contacts or associations of objects with the touch sensitive surface 104. For example, the classification component 112 can receive updates relating to contact classification to apply to the classification engine to refine and enhance classifications of contacts or associations of objects with the touch sensitive surface 104 by the classification engine. In some embodiments, during operation of the touch sensitive device 100, the classification component 112 can train, update, refine, and/or enhance (e.g., automatically or dynamically train, update, refine, and/or enhance) the classification engine to refine and further improve classifications of contacts or associations of objects (e.g., touch events of objects) with the touch sensitive surface 104 by the classification engine.

Figure 21:
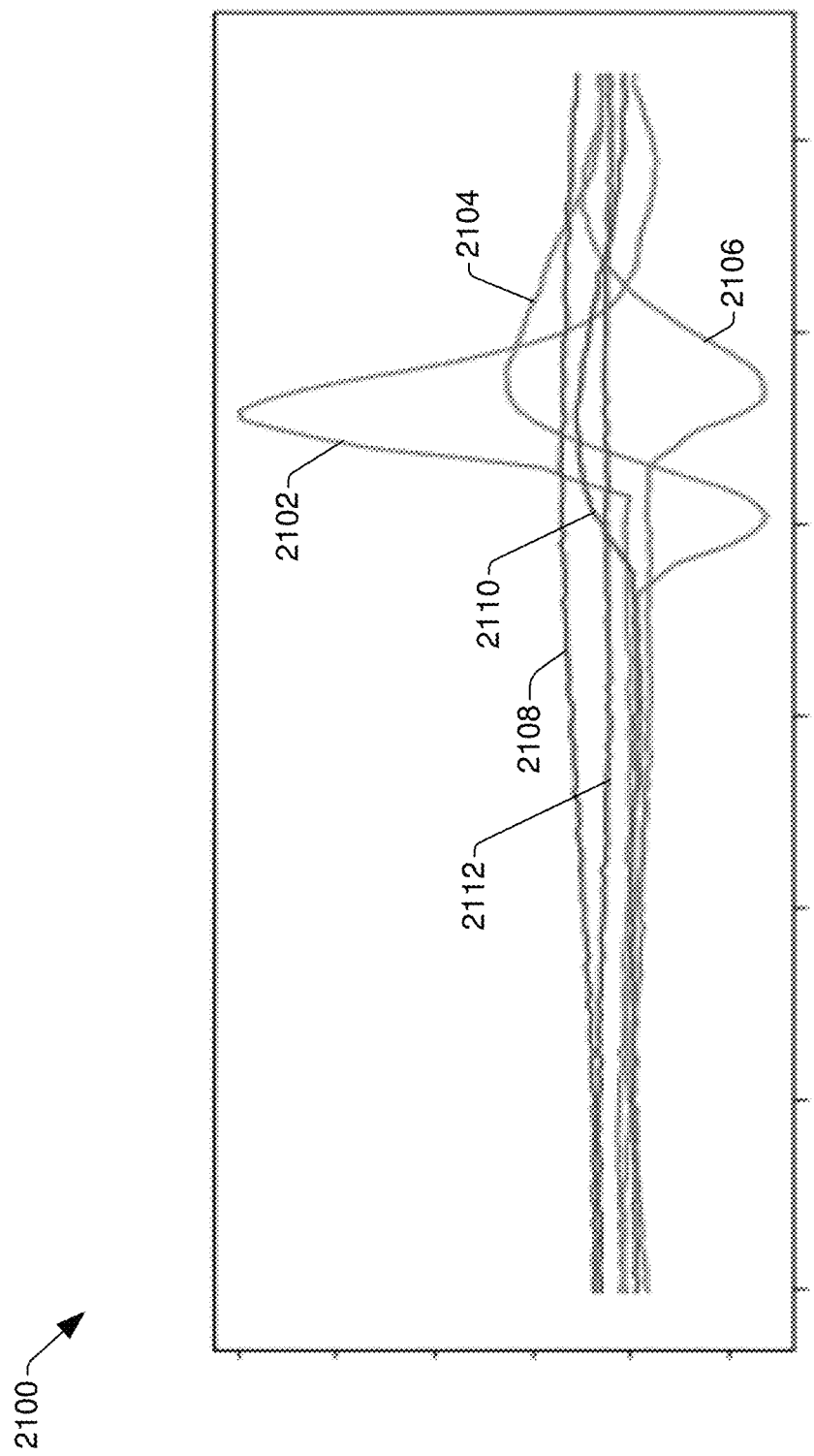
FIG. 21 illustrates a diagram of an example graph that can represent motion and/or impact data (e.g., accelerometer data, gyroscope data) relating to a touch event involving the user touching the touch sensitive surface when a certain sensor(s) of the sensor component detects certain motion of the touch sensitive device and/or impact on the touch sensitive surface of the device, in accordance with various aspects and embodiments of the disclosed subject matter.

Turning briefly to FIG. 21 (along with FIG. 1), FIG. 21 illustrates a diagram of an example graph 2100 that can represent motion and/or impact data (e.g., accelerometer data and/or gyroscope data) relating to a touch event involving the user touching the touch sensitive surface 104 when a certain sensor(s) (e.g., sensor(s) 110, such as an accelerometer and/or gyroscope) of the sensor component 106 detects certain motion of the touch sensitive device 100 and/or impact on the touch sensitive surface 104 of the device 100, in accordance with various aspects and embodiments of the disclosed subject matter. The motion and/or impact data presented in the example graph 2100 can comprise respective accelerometer data and gyroscope data along six respective axes associated with the touch sensitive device 100 for a defined period of time (e.g., 2.5 seconds or other desired amount of time that can be less than or greater than 2.5 seconds), as such respective accelerometer data and gyroscope data was obtained by a six-axis sensor (e.g., three-axis accelerometer and three-axis gyroscope) and stored in the buffer component 116. For instance, the motion data can comprise first accelerometer data 2102 along a first axis, second accelerometer data 2104 along a second axis, and third accelerometer data 2106 along a third axis; and the motion data also can comprise first gyroscope data 2108 along a first axis, second gyroscope data 2110 along a second axis, and third gyroscope data 2112 along a third axis, of the gyroscope.

The classification component 112, employing a classification engine, can analyze the motion and/or impact data (e.g., motion and/or impact data presented in example graph 2100). Based at least in part on the results of the analysis of the motion and/or impact data, the classification component 112 can determine that a touch event with regard to the touch sensitive surface 104 occurred, or at least determine that the sensor data analysis results indicate that a touch event with regard to the touch sensitive surface 104 occurred, for example, as indicated by the portion of the motion and/or impact data at reference numeral 2114. Also, based at least in part on the analysis results, the classification component 112 can determine whether the touch event (if any) is intentional or unintentional.

As disclosed herein, the classification component 112 can utilize one or more axes of motion and/or impact data to facilitate determining whether a touch event(s) of an object(s) with respect to the touch sensitive surface 104 has occurred and determining a classification(s) of a touch event(s) relating to a touch of an object(s) with or a proximity of an object(s) to the touch sensitive surface 104. The number of axes of motion and/or impact data utilized by the classification component 112 can be determined based at least in part on a number of factors, in accordance with the defined classification criteria. The factors can comprise, for example, the type(s) and/or number of sensors 110 employed by the touch sensitive device 100, the amount or resource and/or time available to the classification component 112, a classification at the time the analysis of motion and/or impact data (and/or other data (e.g., touch surface data)) is being performed, a confidence level of a classification of a touch event made by the classification component 112 based on the touch surface data (and/or other sensor data (besides motion data)), and/or one or more other factors.

For example, if a touch sensitive device employs a single-axis accelerometer and no other type of motion-related sensor, only one axis of motion and/or impact data can be available for analysis by the classification component 112; if a touch sensitive device employs a two-axis accelerometer and no other type of motion-related sensor, only up to two axes of motion and/or impact data can be available for analysis by the classification component 112; and if a touch sensitive device employs a three-axis accelerometer and no other type of motion-related sensor, only up to three axes of motion and/or impact data can be available for analysis by the classification component 112. As another example, if a touch sensitive device employs a three-axis accelerometer and a three-axis gyroscope, up to six axes of motion and/or impact data can be available for analysis by the classification component 112, whereas if only a three-axis accelerometer is used and no three-axis gyroscope is employed (or alternatively if only a three-axis gyroscope is used and no three-axis accelerometer is employed), only up to three axes of motion and/or impact data can be available for analysis by the classification component 112.

With regard to resources and time available to the classification component 112 for classification of a touch event(s), when analyzing data, such as touch surface data and motion and/or impact data associated with the touch sensitive device 100, there may be some instances where the amount of available resources (e.g., processing resources) and/or time is relatively lower. In such instances, even if the classification component 112 has motion and/or impact data associated with a higher number (e.g., six, five, or four, . . . ) of axes available for analysis, given the relatively lower amount of resources or time available at that particular time, when desirable (e.g., when in accordance with the applicable defined classification criteria), the classification component 112 can utilize and analyze motion and/or impact data associated with a lower number (e.g., one, two, three, . . . ) of axes (or axis) in determining a classification of a touch event(s) of an object(s) with respect to the touch sensitive surface 104. In instances when there are sufficient resources and time available, the classification component 112 can use and analyze all or a desired portion motion and/or impact data associated with all or a desired number of available axes to determine a classification of a touch event(s) of an object(s) with respect to the touch sensitive surface 104, in accordance with the defined classification criteria.

With regard to confidence level as a factor, in some implementations, the classification component 112 can perform an analysis (or a relatively quicker preliminary analysis) on touch surface data from surface-related sensors 108 to determine an initial classification (or preliminary contact classification) of a touch event(s) for an object(s) with respect to the touch sensitive surface 104, wherein, as part of the analysis, the classification component 112 also can determine a confidence level in the accuracy of the initial (or preliminary) classification. Based at least in part on the confidence level in the accuracy of the initial (or preliminary) classification, the classification component 112 can determine the amount of motion and/or impact data (e.g., the number of axes of motion data) to analyze to determine (e.g., make a final determination of) a classification of a touch event(s) for an object(s) with respect to the touch sensitive surface 104, in accordance with the defined classification criteria (e.g., criteria relating to confidence levels in accuracy of classifications and/or resources and time).

For example, if the classification component 112 determines that the confidence level in the accuracy of the initial (or preliminary) classification of a touch event(s) is relatively high (e.g., satisfies (e.g., meets or exceeds) a defined threshold confidence level in accuracy), the classification component 112 can determine that a relatively lower amount of motion and/or impact data (e.g., a lower number of axes of motion and/or impact data) is to be analyzed to determine, verify, or confirm a classification of the touch event(s) for the object(s) with respect to the touch sensitive surface 104, in accordance with the defined classification criteria. In this way, the classification component 112 can determine the classification of the touch event(s) for the object(s) with respect to the touch sensitive surface 104 with a desirably (e.g., sufficiently or suitably) high level of confidence in the accuracy of such classification without undesirably (e.g., unnecessarily) utilizing the additional resources and time to analyze all or a larger portion of the available motion and/or impact data (e.g., all or a larger number of axes of motion data) in connection with determining such classification.

If, however, the classification component 112 determines that the confidence level in the accuracy of the initial (or preliminary) classification is relatively low (e.g., does not satisfy (e.g., does not meet or exceed) the defined threshold confidence level in accuracy), the classification component 112 can determine that a relatively higher amount of motion and/or impact data (e.g., all or a relatively higher number of axes of motion data) is to be analyzed to determine, verify, or confirm a classification of the touch event(s) for the object(s) with respect to the touch sensitive surface 104, in accordance with the defined classification criteria. In this way, the classification component 112 can analyze all or at least a relatively higher amount of the available motion and/or impact data to attempt to determine or verify a classification of the touch event(s) for the object(s) with respect to the touch sensitive surface 104 to a higher level of confidence in the accuracy of the classification than the accuracy confidence level achieved through analysis of the touch surface data alone.

It is to be appreciated and understood that typically, or at least it is more likely that, the performance and determination of a classification of a touch event(s) for an object(s) with respect to the touch sensitive surface 104 by the classification component 112 can be desirably enhanced (e.g., increasingly improved and/or more accurate) by using motion and/or impact data associated with a higher number of axes than by using motion and/or impact data associated with a lower number of axes or not using motion and/or impact data at all.

In accordance with various other embodiments, additionally or alternatively, the classification component 112 can utilize other information (e.g., supplemental information) to facilitate classifying and discriminating between one or more touch events of one or more objects with the touch sensitive surface 104, as more fully described herein. For example, the classification component 112 (or another component of the touch sensitive device 100) can monitor and analyze vibro-acoustic data relating to movement or vibrations associated with the touch sensitive device 100, wherein the vibro-acoustic data can provide information that can facilitate classifying and distinguishing (e.g., disambiguating) between the types of touch events that objects can have with the touch sensitive surface 104 of the touch sensitive device 100. For example, one or more sensors of the sensor component 106 can sense vibrations of the device 100 or associated with the device 100, and can generate vibro-acoustic data based at least in part on such sensing. The classification component 112 can use (e.g., analyze) the vibro-acoustic data to facilitate identifying when the touch sensitive surface 104 has been brought into contact with fingertips of a user, finger knuckles of the user, fingernails of the user, a palm of the user, another body part of the user, a stylus, and/or a wide variety of other types of things.

Additionally or alternatively, the classification component 112 can utilize orientation data relating to the orientation of the touch sensitive device 100 to facilitate determining a classification of a touch event(s) for an object(s) with respect to the touch sensitive surface 104. For instance, the sensor component 106 can comprise one or more sensors (e.g., sensors 110, such as an accelerometer, a gyroscope, and/or an IMU) that can sense, measure, determine, and/or facilitate determining an orientation of the touch sensitive device 100 with respect to the environment. The one or more sensors can provide sensor data (e.g., orientation data) relating to the orientation of the touch sensitive device 100 to the classification component 112. Certain orientations of the touch sensitive device 100 and corresponding orientation data can be generally or at least often consistent with and/or can indicate that an object(s) associated with (e.g., in contact with or hovering in proximity to) the touch sensitive surface 104 is a finger(s) of a user when the user is intentionally touching the touch sensitive surface 104. Other orientations of the touch sensitive device 100 and corresponding orientation data can be generally or at least often consistent with and/or can indicate that an object(s) associated with the touch sensitive surface 104 is a palm and/or finger(s) of the user when the user is unintentionally touching the touch sensitive surface 104 (e.g., by gripping the device 100 in the user's hand). The classification component 112 can utilize the orientation data to facilitate identifying and distinguishing between different types of contact or other association (e.g., hover) with the touch sensitive surface 104.

The classification component 112 can analyze the orientation data and other sensor data, such as touch surface data and/or motion data (and/or other sensor data). Based at least in part on the results of analyzing the orientation data, touch surface data, and/or motion data (and/or other sensor data), the classification component 112 can determine a classification of the touch event(s) of the object(s) with respect to the touch sensitive surface 104, in accordance with the defined classification criteria.

Additionally or alternatively, visible light sensors and/or infrared sensors also can be included in devices (e.g., digital display devices) to detect when the finger, palm, head, or other part of a user is positioned in close proximity to the touch sensitive surface (e.g., touch screen surface) of such device. The classification component 112 can analyze sensor data produced by the visible light sensors and/or infrared sensors to facilitate discriminating between an intentional finger touch, an unintentional finger touch, a palm touch (e.g., unintentional palm touch), or other touch event between a body part of the user (or another object, such as a stylus) and the touch sensitive surface 104 of such device 100. It is to be appreciated and understood that the classification component 112 can accurately classify and discriminate between one or more contacts or associations (e.g., hover) of one or more objects with the touch sensitive surface 104 (e.g., accurately classify and discriminate between multi-point contacts) of the touch sensitive device 100 without the touch sensitive device 100 using or relying on using, for example, visible light sensors and/or infrared sensors.

The contact classification of a touch event(s) for an object(s) with respect to the touch sensitive surface 104 can be utilized to facilitate making decisions regarding the controlling of various functions of the touch sensitive surface 104 or other components of the touch sensitive device 100. The operation management component 114 can be employed to facilitate controlling functions of the touch sensitive surface 104 and/or other components of the touch sensitive device 100.

The operation management component 114 can receive, from the classification component 112, information regarding the classification a touch event(s) of an object(s), if any, with respect to the touch sensitive surface 104. The operation management component 114 can analyze the information regarding the classification of the touch event(s) of the object(s) with respect to the touch sensitive surface 104.

Based at least in part on the results of analyzing the information relating to the classification of the touch event(s) of the object(s) with respect to the touch sensitive surface 104, the operation management component 114 can control functions associated with the touch sensitive surface 104 and/or other components of the touch sensitive device 100, in accordance with the defined classification criteria. The functions can comprise, for example, enabling a touch sensitive function of the touch sensitive surface 104 (e.g., of a display screen) of the touch sensitive device 100, disabling the touch sensitive function of the touch sensitive surface 104 (e.g., of the display screen), switching the display screen (e.g., touch display screen) of the touch sensitive device 100 on (e.g., to an on state), and/or switching the display screen off (e.g., to an off state).

For example, in response to determining that the classification of a touch event is that the object is a finger that is intentionally in contact with or hovering in proximity to the touch sensitive surface 104, the operation management component 114 can determine that touch functions associated with the touch sensitive surface 104 are to be enabled to allow the user to manipulate controls (e.g., buttons on touch display screen, keys of a touch screen keyboard or keypad on the touch display screen, . . . ) presented on the touch sensitive surface 104 and/or can switch (or maintain) the display screen of the touch sensitive surface 104 in an on state. As another example, in response to determining that the classification of the touch event is that the object(s) is a the user's palm unintentionally in contact with or hovering in proximity to the touch sensitive surface 104, the operation management component 114 can determine that touch functions associated with the touch sensitive surface 104 are to be disabled to prevent the user from manipulating (e.g., inadvertently manipulating controls (e.g., buttons, keys, . . . ) presented on the touch sensitive surface 104 and/or can switch (or maintain) the display screen of the touch sensitive surface 104 in an off state (e.g., to reduce power consumption and to prevent inadvertent manipulation of controls on the touch sensitive surface 104).

Figure 22:
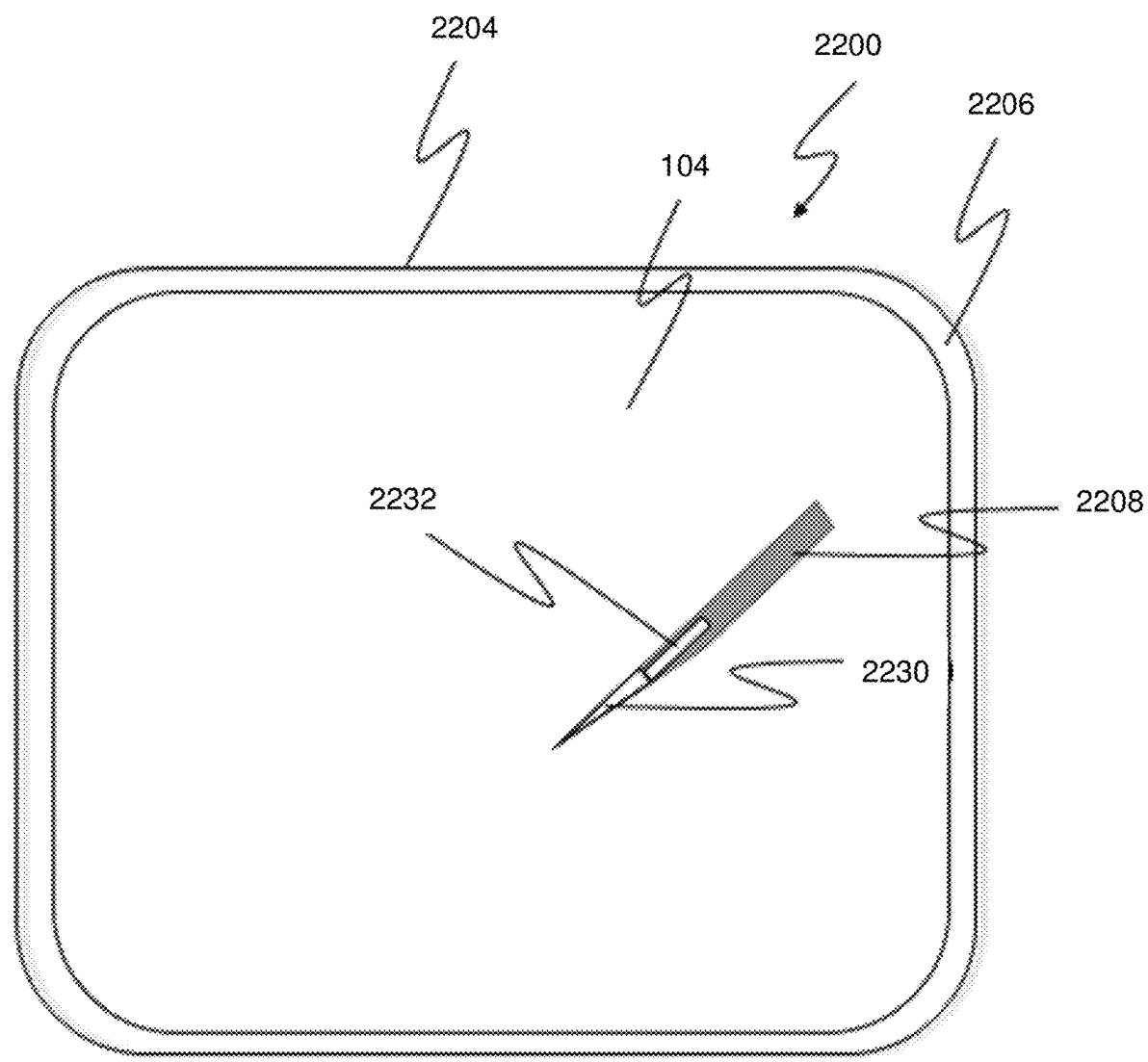
FIG. 22 depicts a diagram of a top view of an example exterior view of a touch sensitive device, in accordance with various aspects and embodiments of the disclosed subject matter.
Figure 23:
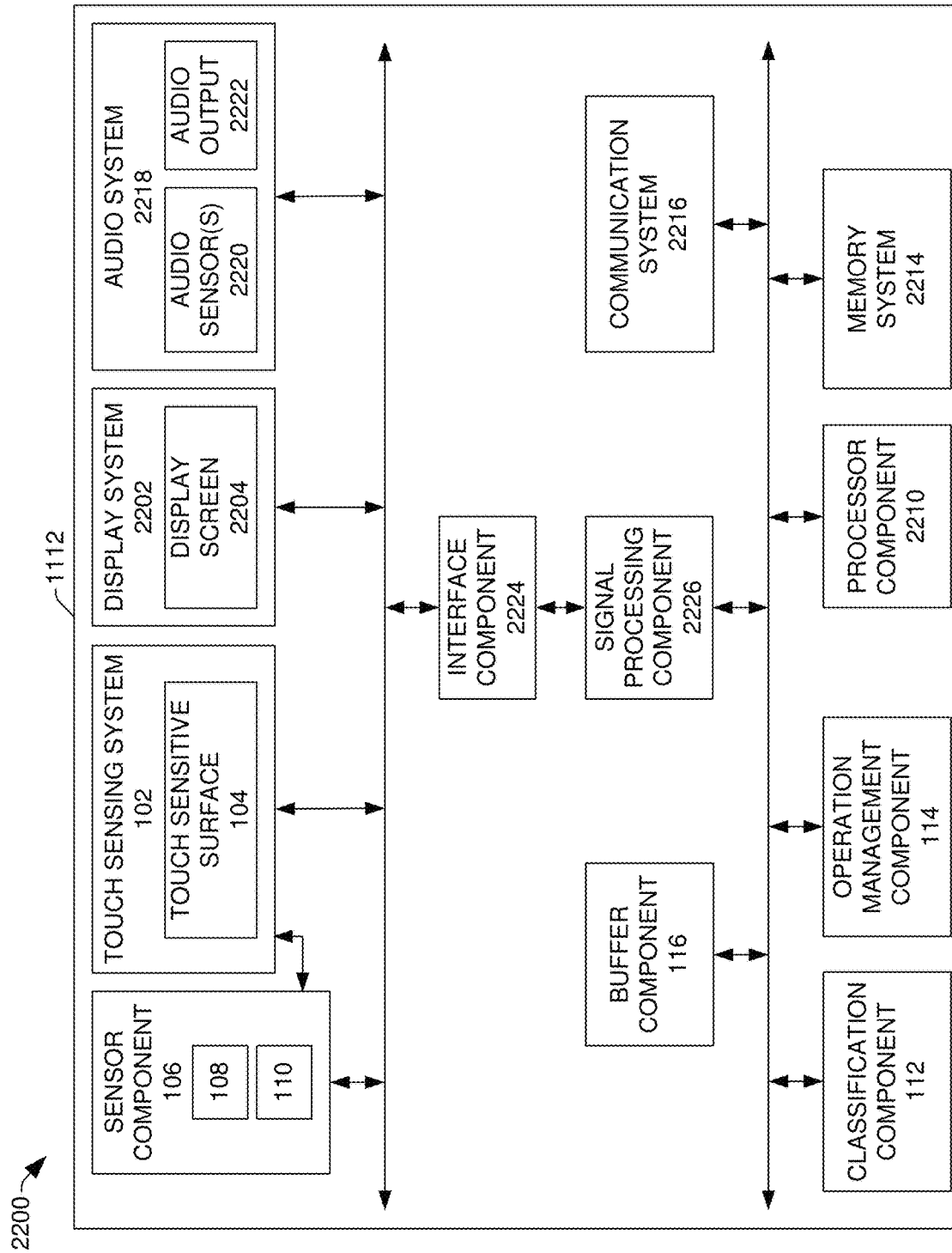
FIG. 23 illustrates a block diagram of an example touch sensitive device, in accordance with various aspects and embodiments of the disclosed subject matter.

FIG. 22 depicts a diagram of a top view of an example exterior view of a touch sensitive device 2200, and FIG. 23 illustrates a block diagram of the example touch sensitive device 2200, in accordance with various aspects and embodiments of the disclosed subject matter. The touch sensitive device 2200 can comprise the touch sensing system 102 and the touch sensitive surface 104, which can be associated with the touch sensing system 102. The touch sensitive device 2200 also can include the sensor component 106, which can comprise various sensors, including the surface-related sensors 108 and the other sensors 110. The touch sensitive device 2200 further can comprise the classification component 112 and the operation management component 114. The touch sensitive device 2200 also can include the buffer component 116, which can store (e.g., temporarily store) touch surface data, motion data, impact or force data, orientation data, pattern data, and/or other data, as more fully described herein.

The touch sensitive device 2200 can comprise a display system 2202 that can include a display screen 2204 (e.g., touch display screen) that can present visual information, such as visual images, over a presentation area 2206 (e.g., a two-dimensional or three-dimensional presentation area). The touch sensing system 102 can include and/or provide the touch sensitive surface 104, which, at least in part, can be coextensive or can correspond to, or at least can be substantially coextensive or can substantially correspond to, the presentation area 2206.

The touch sensitive surface 104 can be adapted to detect (e.g., via the surface-related sensors 108) when an object(s) (e.g., a fingertip(s), a palm, an ear, a face, a stylus), such as an object 2208, is positioned in contact with or in proximity to, the touch sensitive surface 104, wherein the surface-related sensors 108 can generate respective signals (e.g., sensor data) from which the classification component 112 can determine or facilitate determining a classification of the relationship of the object(s) (e.g., object 2208) with respect to the touch sensitive surface 104 (e.g., can determine which portion(s) of the touch sensitive surface 104 is in contact or in proximity to the object(s) 2208).

The touch sensitive device 2200 can take various forms including but not limited to any type of digital equipment comprising a touch sensing system 102 and a processor 2210, such as a micro-processor, micro-controller, or any other type of programmable control device, or a preprogrammed or dedicated processing or control system. In accordance with various embodiments, the touch sensitive device 2200 can be or can comprise, for example, a mobile phone (e.g., a cellular phone and/or smart phone), a computer, a display table, a personal digital assistant (PDA), an electronic tablet or notebook (e.g., a touch sensitive graphic tablet or notebook), a web pad, an electronic gaming device, an electronic workstation, a television, an Internet protocol (IP) television, a set-top box, a device (e.g., touch sensitive device) in or integrated with a vehicle, a touch pad, a track pad, or other type of device. In this regard, it will be appreciated and understood that, while the components of the touch sensitive device 2200 are illustrated in FIGS. 22 and 23 as being within a single housing 2212, this can be optional, and, in accordance with various embodiments, one or more of the various components of touch sensitive device 2200 can be located in separately housed components of the touch sensitive device 2200.

The touch sensitive surface 104 of the touch sensing system 102 can sense when an object(s) 2208 touches or is in proximity to (e.g., close enough proximity to) the touch sensitive surface 104. For instance, the touch sensitive surface can comprise or be associated with an array of sensors (e.g., an array of surface-related sensors 108) that can sense when an object is in contact with or proximity to the touch sensitive surface 104. The sensors of the touch sensing system 102 can generate signals (e.g., sensor data, such as touch surface data) from which it can be determined (e.g., by the classification component 112) what portion of the touch sensitive surface 104 is in contact with or proximity to the object(s) 2208. The classification component 112, for example, in conjunction with the processor 2210, can receive the signals from the touch sensing system 102 and can analyze the signals to detect strokes or other contact made by an object(s) 2208 against the touch sensitive surface 104 or detect an object(s) 2208 in proximity to the touch sensitive surface 104.

In some embodiments, the touch sensitive device 2200 further can comprise a memory system 2214. The memory system 2214 can be capable of storing and providing programming and other forms of instructions to the processor 2210 and/or other components (e.g., classification component 112, operation management component 114, . . . ) and that can be used for other purposes. The memory system 2214 can include read only memory (ROM), random access memory (RAM) (e.g., random access semiconductor memory), and/or other types of memory or computer readable media that can be permanently installed or separably mounted (e.g., connected or interfaced) to the touch sensitive device 2200. Additionally, the touch sensitive device 2200 also can access a memory system 2214 that can be separate from the touch sensitive device 2200 by way of an optional communication system 2216 (comm system).

With further regard to the processor 2210, the processor 2210 can operate in conjunction with other components (e.g., touch sensing system 102, touch sensitive surface 104, sensor component 106, classification component 112, operation management component 114, . . . ) of the touch sensitive device 2200 to facilitate performing the various functions of the touch sensitive device 2200. The processor 2210 can employ one or more processors, microprocessors, or controllers that can process data, such as information relating to user data, applications, messages, message or data formatting, data conversions, touch surface data, motion data, impact or force data, vibro-acoustic data, orientation data, touch data, other types of data, touch event classifications, contact states, events or responsive actions, resources, and/or other information, to facilitate operation of the touch sensitive device 2200, as more fully disclosed herein, and control data flow between the touch sensitive device 2200 and other components or devices of or associated with the touch sensitive device 2200.

The memory system 2214 can comprise a data store that can store data structures (e.g., user data, metadata), code structure(s) (e.g., modules, objects, hashes, classes, procedures) or instructions, information relating to user data, applications, messages, message or data formatting, data conversions, touch surface data, motion data, impact or force data, vibro-acoustic data, orientation data, touch data, other types of data, touch event classifications, contact states, events or responsive actions, resources, and/or other information, to facilitate controlling operations associated with the touch sensitive device 2200. In some implementations, the processor 2210 can be functionally coupled (e.g., through a memory bus) to the memory system 2214, including the data store, in order to store and retrieve information desired to operate and/or confer functionality, at least in part, to the touch sensing system 102, touch sensitive surface 104, sensor component 106, classification component 112, operation management component 114, etc., and/or substantially any other operational aspects of the touch sensitive device 2200.

The touch sensitive device 2200 also can comprise one or more other components (e.g., one or more other optional components) such as, for example, an audio system 2218 that can comprise an audio sensor(s) 2220, such as a microphone(s) and or a connection to a microphone(s), and an audio output 2222, such as a speaker(s) or a connection to a speaker(s). The touch sensitive device 2200 also can include, as illustrated, an interface component 2224 (e.g., interface unit), a signal processing component 2226 (e.g., signal processing unit), and a database component 2228.

With further regard to the sensors of the sensor component 106, the sensors can take any of a variety of forms and can comprise generally any known device for sensing conditions inside or outside of the touch sensitive device 2200. The sensors of the sensor component 106 can, without limitation, comprise or take the form of acoustic sensors, accelerometers, gyroscopes, light sensors, range finders, thermometers, Hall effect sensors, switches (e.g., 2-way, 4-way switch, 6-way switch, 8-way switch), mouse and trackball systems, a joystick system, a voice recognition system, a video-based gesture recognition system or other such systems, radio frequency identification (RFID) and near field communication sensors, bar code sensors, position sensors, and/or other sensors that can be used to detect conditions that can be useful in governing operation or performing functions of image or presence sensing, and can convert this sensed information into a form that can be used by the classification component 112, the operation management component 114, and the processor 2210 in controlling (e.g., governing) operation of the touch sensitive device 2200. The sensors also can comprise biometric sensors that can be adapted to detect characteristics of a user or entity for security and affective imaging purposes.

Alternatively or additionally, sensors of the sensor component 106 can include accelerometers, vibration sensors, ultrasonic sensors, piezoelectric devices, and/or other sensing circuits or systems that can sense vibrations or sounds that can be indicative of contact between an object 2208 and the touch sensitive surface 104.

The sensors of the sensor component 106 also can comprise pressure sensors that can sense an amount of pressure applied by an object 2208 against the touch sensitive surface 104. In some embodiments, the touch sensitive surface 104 can be of a type that can sense not only which portion of the touch sensitive surface 104 has been contacted by an object 2208, but also can sense an amount of pressure applied against the touch sensitive surface 104. One or more of various sensors and sensing technologies can be employed that can sense different levels of pressure against the touch sensitive surface 104.

In still other embodiments, the sensors of the sensor component 106 can include one or more sensors 2230 (e.g., a force sensor) that can optionally be incorporated in or on object 2208 (e.g., stylus) and that can sense conditions indicative of an amount of force applied between the object 2208 and the touch sensitive surface 104. In such embodiments, a force sensor 2230 can take the form of, for example and without limitation, a piezoelectric sensor, a stress sensor, a strain sensor, a compression sensor, a deflection sensor, or a resiliently biased sensing system that can sense force (e.g., sense an amount of force) based at least in part on an extent of deflection movement of a contact surface against the force of the resilient member and that can generate a signal (e.g., sensor data, such as force data) that can be indicative of the amount of force applied by or through an indicator against the touch sensitive surface 104.

Such a force sensor 2230 can be directly connected to the interface component 2224 by way of a wired connection or a wireless connection, such as by an optional wireless communication module 2232 that can be capable of communication with the communication system 2216.

In certain embodiments, force sensing can be achieved by providing an object 2208, such as a stylus as illustrated in FIG. 22, that can have a rounded flexible tip such as a rubber or metallic mesh tip that can be arranged in a resilient manner to flatten when pressed against the touch sensitive surface 104 thereby increasing the amount of surface area of the tip of the object 2208 in contact with the touch sensitive surface 104. In such embodiments, the size of the area of the tip of the object 2208 in contact with the touch sensitive surface 104 can be an effective proxy for the amount of force applied by a user against the touch sensitive surface 104, and, in this regard, a touch sensitive surface 104 that is capable of sensing area of the tip of the object 2208 that is in contact with the touch sensitive surface 104 can be used for this purpose by the disclosed subject matter. The disclosed subject matter (e.g., the touch sensitive surface 104) can achieve similar results, with proper calibration, using a fingertip of the user or another object 2208.

The communication system 2216 can take the form of any optical, radio frequency, or other circuit or system that can convert data into a form that can be conveyed to an external device by way of an optical signal, radio frequency signal, or other form of wired or wireless signal. The communication system 2216 can be used for a variety of purposes including, but not limited to, sending and receiving instruction sets and exchanging data with remote sensors or memory systems.

With further regard to the interface component 2224, the interface component 2224 can receive signals (e.g., sensor data, audio signals, and/or other data), for example, from the touch sensing system 102, the audio system 2218, and/or other sensors of the sensor component 106, or any components thereof. The interface component 2224 can process these signals for use by the classification component 112, the processor 2210, the signal processing component 2226 (e.g., taking the form of a signal processor or signal processing circuit), and/or another component(s) of the touch sensitive device 2200.

The interface component 2224 can, for example, be connected to outputs (e.g., output ports) from the touch sensing system 102, the audio system 2218, and/or sensors of the sensor component 106. If signals from an output are in analog form, the interface component 2224 can include analog to digital converters that can convert such analog signals into digital signals that can be used by the classification component 112, the processor 2210, the signal processing component 2226, and/or another component(s) of the touch sensitive device 2200. The interface component 2224 also can include amplifiers, filters, including, but not limited to, noise filters, band pass/band reject filters or couplings, breakers, fusible links, and/or other systems that can protect other components of the touch sensitive device 2200 from potential damage.

In some embodiments, the touch sensitive device 2200 can utilize multiple sources of vibro-acoustic signals with one or more sensors (e.g., one or more sensors for in-air acoustics, and one or more sensors for mechanical vibrations, also referred to as structural acoustics). The touch sensitive device 2200 can utilize one or more types of audio sensors 2220 or other types of sensors of the sensor component 106, wherein such audio sensors or other types of sensors can include, but are not limited to, for example: piezoelectric bender elements; piezoelectric film; accelerometers (e.g., linear variable differential transformer (LVDT), potentiometric, variable reluctance, piezoelectric, piezoresistive, capacitive, servo (force balance), MEMS); displacement sensors; velocity sensors; vibration sensors; gyroscopes; proximity sensors; electric microphones; hydrophones; condenser microphones; electret condenser microphones; dynamic microphones; ribbon microphones; carbon microphones; piezoelectric microphones; fiber optic microphones; laser microphones; liquid microphones; and/or MEMS microphones.

Many touchscreen computing devices can include microphones and accelerometers (e.g., for voice and input sensing). Such microphones and accelerometers can be utilized by the device (e.g., touch sensitive device 2200) without having to employ additional sensors or can work in concert with other sensors (e.g., specialized sensors performing particular or specified functions).

To this end, the interface component 2224 can receive signals (e.g., sensor data) from the audio sensor 2220 or another sensor of the sensor component 106 that can sense vibrations, and can prepare the signals for use by the signal processing component 2226 or another component of the touch sensitive device 2200. For example, the interface component 2224 can convert such signals from analog form into corresponding digital signals, and can provide the digital signals, which can be a digital signal representative of conditions sensed by audio sensor 2220 and the other sensor of the sensor component 106, to the signal processing component 2226 or the other component.

The interface component 2224 also can receive signals (e.g., control signals or instructions) from the processor 2210, the signal processing component 2226, the classification component 112, and/or the operation management component 114, and can use these signals to control operation of the touch sensitive surface 104, the display system 2202, including the display screen 2204, the audio system 2218, and/or the communication system 2216. In this regard, the interface component 2224 can include display drivers, audio output systems, including amplifiers, and the like. It will be appreciated and understood that some or all of the functions ascribed to the interface component 2224 can be performed by hardware or programs that can be integrated within the touch sensing system 102, the display system 2202, the audio system 2218, the sensors of the sensor component 106, the classification component 112, the operation management component 114, or the communication system 2216.

The signal processing component 2226 can receive signals from the interface component 2224, which can be in digital form, and can prepare the signals for further processing. The signal processing component 2226 can perform sampling, quantization, and/or encoding processes, and, as desired, also can be used in converting analog signals into a digital signal (e.g., if a received signal is in analog form).

The signal processing component 2226 can transmit the digital signals (e.g., the signal-processed digital signals) to the processor 2210, the classification component 112, and/or another component of the touch sensitive device 2200.

As more fully disclosed herein, the classification component 112, operation management component 114, and/or the processor 2210 (e.g., operating in conjunction with the classification component 112 or operation management component 114) can determine a touch event classification or contact state for an object(s) with respect to the touch sensitive surface 104 based at least in part on touch surface data associated with the touch sensitive surface 104, motion data relating to motion of the touch sensitive device 2200, and/or other data (e.g., impact or force data, orientation data, touch data, . . . ). In some embodiments, the operation management component 114 can determine that a touch event with respect to the touch sensitive surface 104 and/or touch sensitive device 2200 has occurred based at least in part on the classification of a touch event(s) of the object(s), and the operation management component 114 and/or the processor 2210 can use this touch event determination to control operation of the touch sensitive device 2200 (e.g., the touch sensitive surface 104 and/or display screen 2204 of the touch sensitive device 2200). For example, the operation management component 114 can control operation of the touch sensitive surface 104 (e.g., enable or disable a touch function(s) of the touch sensitive surface 104) and/or the display screen 2204 (e.g., turn the display screen 2204 to an on state or an off state) based at least in part on the determined touch event (e.g., intentional touch event, or unintentional touch event), in accordance with the defined classification criteria, as more fully described herein. In certain embodiments, the database component 2228 also can be provided, wherein program software and other data can be stored in the database component 2228 (and/or a data store of the memory system 2214).

In accordance with various embodiments and aspects of the disclosed subject matter, at least some of functions of the interface component 2224, the signal processing component 2226, the classification component 112, the operation management component 114, the database component 2228, and/or another component(s) of the touch sensitive device 2200 can be or can comprise program modules to control or communicate with other hardware components or components for executing software, which can be included, for example, in the touch sensitive device 2200, wherein such other components can include, for example, and without limitation, the processor 2210, the memory system 2214, the interface component 2224, and/or the signal processing component 2226. The program modules can be included in the touch sensitive device 2200 in the form of operating systems, application program modules, or other program modules, wherein they can be physically stored in a variety of storage devices (e.g., data stores). Further, the program modules also can be stored in a remote storage device that can communicate with the touch sensitive device 2200 by way of the communication system 2216. Meanwhile, such program modules can include, but are not limited to, routines subroutines, programs, objects, components, data structures, and the like, for performing specific tasks or executing specific abstract data types as described herein, in accordance with the disclosed subject matter. Such program modules also can be expressed in terms of configurations of hardware adapted to perform the functions associated with such modules.

The classification component 112 can analyze the signals (e.g., digital signals) transmitted from the signal processing component 2226 or other component (e.g., a sensor(s)). Based at least in part on the results of the analysis, the classification component 112 can determine whether an object(s) 2208 has been brought into contact with, or in proximity to, the touch sensitive surface 104, and can classify the type of touch event(s) (e.g., intentional touch event, unintentional touch event) and/or the type of object(s) 2208 (e.g., finger, palm, other body part, stylus) brought into contact with, or in proximity to, the touch sensitive surface 104, in accordance with the defined classification criteria.

In general, when the classification component 112 characterizes such an object, the classification component 112 can receive a signal having frame information in the form of x,y coordinate values with each of the x,y coordinate values representing which portions of the touch sensitive surface 104 are in contact with or sufficient proximity to the object 2208. The touch sensitive surface 104 (e.g., sensors of or associated with the touch sensitive surface 104) can obtain such x,y coordinate values by sampling the touch sensitive surface 104 at a specified (e.g., predetermined) rate, such as, for example, 100 times per second, 60 times per second, 30 times per send, or at another desired sampling or sensing rate. In one such embodiment, the positions of the touch sensitive surface 104, if any, that are in contact with, or in proximity to, the object 2208 can be sensed (e.g., by respective sensors associated with the respective positions) at a desired sampling or sensing rate, and frame data can be generated (e.g., by the classification component 112, respective sensors, and/or another component), wherein the frame data can represent an x-coordinate value and a y-coordinate map indicative of the positions of contact or hovering between the object 2208 and the touch sensitive surface 104. In some embodiments, the frame data also can comprise respective intensity values that can be determined (e.g., by the classification component 112, respective sensors, and/or another component) for and assigned to respective x-y coordinate values.

The object 2208 can comprise any object that can come in contact with or be in proximity to the touch sensitive surface 104 and that can be detected by the touch sensitive surface 104 (e.g., sensors of or associated with the touch sensitive surface 104). Although listed in singular form as "object" 2208, it will be appreciated that for the purposes of this disclosure an "object" can comprise any combination of items that can be brought into contact with or in proximity to the touch sensitive surface 104 during a frame, wherein the items of the object 2208 can include, but not limited to, one or more fingers of a user, combinations of different parts of the fingers, a palm of the user, indicators including styluses or pens (e.g., utilized by the user), different parts of a body of the user, such as a head, ear, cheek bone, mouth, face, skin, beard or hair, hats, headgear, and/or head wrappings, or combinations thereof.

In certain embodiments, an object 2208 can take the form of an electronic pen, stylus, or other tool with or without electric circuits therein, which may or may not belong to the touch sensitive device 2200, except when an object 2208 is a body part of the user, such as the user's finger, palm, etc. An object 2208 can be made of various materials, such as, for example, metal, wood, plastic, rubber, and/or glass. An object 2208 also can comprise body parts of a user, such as fingers, hands, arms, head, ear, and/or neck of the user. When an object 2208 is the user's finger, each of the specific parts of the finger can be or become the object 2208, in accordance with the disclosed subject matter, because fingers usually can be constituted by various parts such as finger tips, finger nails, knuckles, and finger joints.

The classification component 112 can analyze and use the x,y coordinate data (e.g., frame data), which can represent respective portions of the touch sensitive surface 104 in contact with or proximity to an object 2208 and/or any intensity data from the frame data. Based at least in part on the results of analyzing the frame data (e.g., the x,y coordinate data and/or the intensity data), the classification component 112 can classify the nature of the contact(s) or hovering sensed by the touch sensitive surface 104 (e.g., the classification component 112 can determine the touch event classification and contact state with respect to the object 2208 and the touch sensitive surface 104).

In some embodiments, the classification component 112 can determine the classification of a touch event for an object with respect to the touch sensitive surface 104 based at least in part on touch intensity of the contact (e.g., touch) of the object with the touch sensitive surface 104. The classification component 112 (or another component of the touch sensitive device 2200) can determine (e.g., compute) touch intensity of a contact of an object with the touch sensitive surface 104 in a variety of manners.

For example, the classification component 112 (or another component of the touch sensitive device 2200) can determine a touch intensity of a contact of an object with the touch sensitive surface 104 based at least in part on one or more defined threshold values relating to touch intensity. For instance, if the classification component 112 determines that the touch intensity of the contact is above a defined threshold value, the classification component 112 can determine that the touch (e.g., contact) has a high intensity. If, however, the classification component 112 determines that the touch intensity of the contact is below the defined threshold value, the classification component 112 can determine that the touch (e.g., contact) has a low intensity.

In some embodiments, the classification component 112 can employ more than one defined threshold value, wherein, for example, the classification component 112 can determine whether the touch intensity of a touching of an object with the touch sensitive surface 104 is above a first defined threshold value relating to a high touch intensity, is below a second defined threshold value relating to a low touch intensity, or is between (or at one of) the first defined threshold value and the second defined threshold value. The classification component 112 can determine that a touch intensity above the first defined threshold value is a high intensity, a touch intensity below the second defined threshold value is a low intensity, and a touch intensity between (or at one of) the first defined threshold value and the second defined threshold value is a medium intensity.

Alternatively, the classification component 112 can determine a touch intensity of a contact of an object with the touch sensitive surface 104 as a continuous numerical value, for example, between 0.0 and 100.0. In such case, the classification component 112 can determine the number of types of the touch intensities of contact according to a number of criteria (e.g., defined classification criteria relating to touch intensity) to distinguish the magnitude of the amplitude intensity of a contact of an object with the touch sensitive surface 104.

Since the touch intensity potentially can change significantly (e.g., radically) depending on the object 2208 that has applied the touch to the touch sensitive surface 104, it can be advantageous for the classification component 112 to determine, and the classification component 112 can determine, an object type criteria in order to facilitate distinguishing the magnitude of the amplitude of the digital sound/vibration signal with respect to the individual types of objects (e.g., 2208) and facilitate determining a classification of a touch event of an object with respect to the touch sensitive surface 104. The classification component 112 can make such determination of the object type criteria in any of a variety of ways. For example, such discrimination can be performed (e.g., by the classification component 112) at least in part by using vibro-acoustic data. For instance, the classification component 112 can classify touch events with respect to a touch sensitive surface 104 configured to generate a touch event when an object (e.g., finger) touches the touch sensitive surface, wherein the touch event entails a mechanical vibration generated upon contact with the touch sensitive surface, a touch detector configured to detect the onset of a touch, and a touch event classifier (e.g., of the classification component 112) configured to classify the touch event to identify the object used for the touch event. The classification component 112 can employ such techniques to facilitate determining the object type criteria for an object and facilitate determining a classification of a touch event of an object with respect to the touch sensitive surface 104.

Additionally, such a determination of the object type criteria also can be performed (e.g., by the classification component 112) at least in part using certain techniques relating to vibro-acoustic data. For example, the classification component 112 can employ techniques for interaction between a user and an electronic device having a touch sensitive surface. Employing these techniques, a touch event trigger can be received that can indicate an occurrence of a physical touch event on the touch-sensitive surface. Touch data produced by sensors in connection with the touch event can be accessed and vibro-acoustic data for a vibro-acoustic signal produced by the physical touch event can be accessed for a time window that begins at a time that is prior to receipt of the touch event trigger, and a touch type for the touch event can be determined by the classification component 112 based on the touch data and the vibro-acoustic data. The classification component 112 can employ such techniques to facilitate determining the object type criteria for an object and facilitate determining a classification of a touch event for an object with respect to the touch sensitive surface 104.

In some embodiments, such a determination of the object type criteria can be performed (e.g., by the classification component 112) at least in part using techniques involving sound/vibration signals associated with the touch sensitive device 100. For instance, the classification component 112 can employ techniques for sensing touch inputs to digital equipment in which a sound/vibration signal that is generated by a touch of the touch sensitive surface 104 can be sensed, and the sensed sound/vibration signal can be digitally processed. Here, the classification component 112 can determine the type of touch means as well as a touch intensity of such touch based at least in part on features derived from time and frequency domain representations of the processed sound/vibration signal. The classification component 112 can employ such techniques to facilitate determining the object type criteria for an object and facilitate determining a classification of a touch event of an object with respect to the touch sensitive surface 104.

In certain embodiments, the classification component 112 can determine touch intensity of contact of an object with the touch sensitive surface 104 based at least in part on vibro-acoustic differences between contact made by the object with the touch sensitive surface 104 when different parts of an input tool contact the touch sensitive surface 104. For example, the touch sensitive device can employ an input tool for interacting with a touch sensitive surface (e.g., touch display screen), wherein the input tool can comprise: a body (e.g., a stylus body) that can have one or more vibro-acoustically distinct regions, wherein each vibro-acoustically region can produce a discrete vibro-acoustic signal when it touches a surface of the touch sensitive surface, and the vibro-acoustic signal can be used to detect what region of the input tool was used. Such vibro-acoustic signals also can be used (e.g., by the classification component 112) to discriminate between different types of finger contacts, such as contact with the knuckle, fingernail, and/or fingertip.

Finger touch type determinations (e.g., by the classification component 112) with respect to the touch sensitive surface 104 can, for example, result in execution (e.g., by the classification component 112, operation management component 114, and/or processor 2210) of a first action for a first finger touch type and/or a second action for a second finger touch type. For example, the classification component 112 can classify one particular finger touch event of the touch sensitive surface 104 as an intentional finger touch event. In response, the operation management component 114 can control operation of the touch sensitive device 2200 to allow an operation relating to the finger touch to be processed, as more fully described herein. In another instance, the classification component 112 can classify another finger touch event of the touch sensitive surface 104 as an unintentional finger touch event. In response, the operation management component 114 can control operation of the touch sensitive device 2200 to reject the finger touch and prevent processing of an operation relating to the finger touch, as more fully described herein.

The classification component 112 also can perform touch intensity analysis with regard to an object in contact with or in proximity to the touch sensitive surface 104 based at least in part on capacitive data obtained from one or more sensors of or associated with the touch sensitive surface 104. For example, the classification component 112 can utilize techniques for using capacitive images for classification of touch events. The classification component 112 can generate or access a capacitive image that can comprise capacitive image data that can correspond to respective capacitances at respective locations on the touch sensitive surface 104, wherein the respective capacitances can vary in response to a physical touch by an object on the touch sensitive surface 104. The classification component 112 can analyze or otherwise process the capacitive image data and can determine a touch type (e.g., a touch event classification) for the physical touch of the object with (or proximity of the object to) the touch sensitive surface 104 based at least in part on the analyzed or processed capacitive image data. It also can be useful to, where possible or appropriate to do so, have the classification component 112 maintain heuristic data regarding such objects.

In some embodiments, sensors (e.g., surface-related sensors 108) of the sensor component 106 and/or the classification component 112 can generate or determine touch intensity data relating to the intensity of the touching of an object 2208 with the touch sensitive surface 104 based at least in part the touch intensity between the object 2208 and the touch sensitive surface 104, which in turn can be determined, for example, based at least in part on the capacitance, resistance, or shear force measurements obtained (e.g. by the sensors of the sensor component 106) in connection with the contact of the object 2208 with the touch sensitive surface 104. Additionally or alternatively, sensors (e.g., surface-related sensors 108) of the sensor component 106 and/or the classification component 112 can generate or determine touch intensity data based at least in part sensed variations in an amount of force applied against the touch sensitive surface 104, which can be sensed (e.g., by the sensors) in the various ways described herein and/or any other techniques for sensing force applied against a surface.

In some implementations, the classification component 112 can transmit object characterization information (e.g., to the operation management component 114, processor 2210, or another component), wherein the object characterization information can relate to characteristics of the object 2208, including the relationship (e.g., contact or hovering) between the object 2208 and the touch sensitive surface 104. Furthermore, the classification component 112 can transmit touch intensity data that can characterize an amount of force or other touch intensity information that can characterize the intensity of a touch applied by or through an object 2208 during contact with the touch sensitive surface 104. In some embodiments, this can be done by providing touch intensity data that can correspond to each element of touch intensity data or by sampling, mathematically processing, or otherwise processing force to characterize the amount of force applied during the period in which frame data is obtained.

In certain embodiments, the analysis of frame data performed on a frame image, or portion thereof (e.g., in each subdivision of a frame image, as part of a subdivision analysis of the frame data), by the classification component 112 in connection with determining a contact classification for an object 2208 with the touch sensitive surface 104 can take a variety of forms including:

- average (e.g., determining an average amount of force applied by an object 2208 to the touch sensitive surface 104 during the time period, based at least in part on the results of analyzing the frame data);
- standard deviation (e.g., determining a standard deviation associated with the amounts of force applied by an object 2208 to the touch sensitive surface 104 during the time period, based at least in part on the results of analyzing the frame data);
- standard deviation (normalized by overall amplitude) (e.g., determining a standard deviation that can be normalized by overall amplitude, based at least in part on the results of analyzing the frame data);
- variance (e.g., determining a variance of the amounts of force applied by an object 2208 to the touch sensitive surface 104 during the time period, based at least in part on the results of analyzing the frame data);
- skewness kurtosis sum (e.g., determining a skewness kurtosis sum relating to an amount of force or touch intensity applied by an object 2208 to the touch sensitive surface 104 during the time period, based at least in part on the results of analyzing the frame data);
- absolute sum (e.g., determining an absolute sum of an amount of force or touch intensity applied by an object 2208 to the touch sensitive surface 104 during the time period, based at least in part on the results of analyzing the frame data);
- root mean square (RMS) (e.g., determining an RMS value relating to an amount of force or touch intensity applied by an object 2208 to the touch sensitive surface 104 during the time period, based at least in part on the results of analyzing the frame data);
- crest factor (e.g., determining a crest factor with respect to an amount of force or touch intensity applied by an object 2208 to the touch sensitive surface 104 during the time period, based at least in part on the results of analyzing the frame data);
- dispersion entropy power sum (e.g., determining a dispersion entropy power sum with respect to an amount of force or touch intensity applied by an object 2208 to the touch sensitive surface 104 during the time period, based at least in part on the results of analyzing the frame data);
- centroid (center of mass) (e.g., determining a centroid with respect to an amount of force or touch intensity applied by an object 2208 to the touch sensitive surface 104 during the time period, based at least in part on the results of analyzing the frame data);
- coefficient of variation zero-crossings (e.g., determining a coefficient of variation zero-crossings with respect to an amount of force or touch intensity applied by an object 2208 to the touch sensitive surface 104 during the time period, based at least in part on the results of analyzing the frame data); and/or
- template match scores for a set of known exemplar signals (e.g., determining template match scores for a set of known exemplar signals in connection with an amount of force or touch intensity applied by an object 2208 to the touch sensitive surface 104 during the time period, based at least in part on the results of analyzing the frame data) using the following methods:
- convolution,
- inverse filter matching technique,
- sum-squared difference (SSD), and/or
- elastic matching.

In some embodiments, the touch sensing system 102, alone or in combination with other components (e.g., sensors, classification component 112, processor 2210, . . . ) of the touch sensitive device 2200, can generate additional data that can be of use in determining classifications of touch events for objects with respect to the touch sensitive surface 104, wherein such additional data can include but is not limited to:

- a location of touch contact of the object 2208 with the touch sensitive surface 104 (two-dimensional (2D), or three-dimensional (3D) in the case of curved glass or other non-planar geometry),
- a size of touch contact of the object 2208 with the touch sensitive surface 104 (some touch technologies of the disclosed subject matter can provide an ellipse of the touch contact with major and minor axes),
- a rotation of the touch contact of the object 2208 with the touch sensitive surface 104,
- a shape of touch of the touch contact of the object 2208 with the touch sensitive surface 104 (some touch technologies of the disclosed subject matter can provide the actual shape of the touch, and not just a circle or ellipse),
- a surface area (e.g., in squared mm or pixels) of the touch contact of the object 2208 with the touch sensitive surface 104, a pressure of the touch of the object 2208 with the touch sensitive surface 104 (which can be available on and determined using the touch sensing system 102),
- a shear of touch (which can be available on and determined using the touch sensing system 102) ("shear stress" (which also can be called "tangential force") can arise from a force vector perpendicular to the surface normal of a touchscreen (e.g., parallel to the touch sensitive surface); this can be similar to normal stress—what is commonly called pressure—which can arise from a force vector parallel to the surface normal."),
- a number of touch contacts of the object 2208 with the touch sensitive surface 104, a capacitance of a touch of the object 2208 with the touch sensitive surface 104 (if using a capacitive touch screen), a swept frequency capacitance of touch of the object 2208 with the touch sensitive surface 104 (if using a swept frequency capacitive touch screen), and/or a swept frequency impedance of touch of the object 2208 with the touch sensitive surface 104 (if using a swept frequency capacitive touch screen).

In some embodiments, the classification component 112 can determine or define a pattern of bounding areas in the frame data (e.g., as part of a subdivision analysis) by transforming the bounding areas into a frequency domain representation (e.g., using a Fast Fourier Transform (FFT) or a similar function). For example, with respect to frame data relating to contact or association (e.g., hovering) of an object 2208 with the touch sensitive surface 104, the classification component 112 and/or another component (e.g., processor 2210) can extract features, such as the following features, from the frequency domain representation of the bounding areas:

spectral centroid,
spectral density,
spherical harmonics,
total average spectral energy, and/or
log spectral band ratios.

To facilitate determining classification of touch events or contact states with respect to a contact or association of an object 2208 with the touch sensitive surface 104, the classification component 112 can use any number of approaches, including, but not limited to, basic heuristics, decision trees, a Support Vector Machine, Random Forest, naïve Bayes, elastic matching, dynamic time warping, template matching, k-means clustering, K-nearest neighbors algorithm, neural networks, Multilayer perceptron, logistic regression (e.g., multinomial logistic regression), gaussian mixture models, and/or AdaBoost.

In some embodiments, the classification component 112 can combine results obtained from performing several different classifying techniques through, for example, a voting scheme or through analysis of a pattern from which it can be determined what portions of the touch sensitive surface 104 were in contact with, or in proximity to, an object 2208 during a time period.

Once the classification component 112 has determined a classification for an object 2208 in contact with or in sufficient proximity to the touch sensitive surface 104 of the touch sensitive device 2200, an event may be determined (e.g., by the operation management component 114) based at least in part on the classification (e.g., touch event classification). In order to reduce the chance or risk of false positive mode changes (e.g., due to adjusting hand grip on the touch sensitive device, due to inconsistent intentional finger touching on the touch sensitive surface, . . . ), a number of strategies can be followed, with two exemplary strategies being described herein.

In such embodiments, the classification component 112 or the operation management component 114 can use frame data from more than one time period or instance to assist in the classification of a touch event. For instance, a touch event classification (e.g., a frame contact classification) can be compared with previous touch event classification determinations to determine a current touch event classification and/or contact state for an object 2208 with respect to the touch sensitive surface 104. The classification component 112 or the operation management component 114 can compare a touch event classification with previous touch event classifications to determine a current touch event classification and/or current contact state of the object 2208 with respect to the touch sensitive surface 104.

For example, the touch sensitive surface 104 (e.g., sensors of or associated with the touch sensitive surface 104) can capture the touch image and/or frame data at a particular frame rate (e.g., 30 frames per second or another desired frame rate). The classification component 112 or operation management component 114 can individually analyze the respective frame data captured during these respective frames and determine respective classifications (e.g., "intentional finger touch," unintentional palm touch," or "no contact") of the respective frames based at least in part on the respective frame data. Although any contact or association (e.g., hover) in any given frame data potentially may have a lower classification confidence level, a more robust (e.g., a more confident) classification result typically can be achieved by using a small voting window. For example, if the last 10 touch screen frames had the following classification result—intentional finger touch, intentional finger touch, no contact, intentional finger touch, palm touch, intentional finger touch, intentional finger touch, palm touch, intentional finger touch, no contact"—the result can be given an "intentional finger touch" classification (e.g., 6 out of the last 10 classification results). It is to be appreciated and understood that, in accordance with the defined classification criteria, a different number of classifications of a set of classifications can be employed for the voting window, instead of a bare majority (e.g., 6) out of 10 classifications. For instance, more or less than 10 classifications can be utilized in the set of classifications used for the voting window, or a lower or higher percentage (e.g., lower than 60% (6 out of 10) or higher than 60%), as specified or indicated by the defined classification criteria.

There also can be predetermined patterns classification changes over time for a contact (e.g., touch event) that can be identified (e.g., by the classification component 112 or operation management component 114) and used for touch event classification purposes (e.g., by the classification component 112 or operation management component 114). For example, it can be expected that there will be a certain rate of "no contact" determinations during an unintentional finger touch event on the touch sensitive surface 104 (e.g., a user can inadvertently touch (e.g., slightly touch) the touch display screen with a finger while gripping the device 2200 in the user's hand, change (e.g., slightly change) the grip while holding the device resulting in no contact with the touch display screen, and again have the finger inadvertently touch the touch display screen when the grip is changed again (e.g., inadvertently without thinking about it)). For instance, if it is expected that a certain number (e.g., three, or four, or . . . ) out of ten classifications (e.g., ten most recent classifications) of contacts or associations (e.g., hover) during a period where there is an unintentional finger touch against the touch sensitive surface 104 (e.g., touch display screen) will show no contacts or if it is expected that at least one out of five frames will show no contact with the touch sensitive surface 104, the reliability of an unintentional finger touch classification in the above example can be enhanced by the presence of the "no contact" determinations.

The touch event classification determination made by the classification component 112 can be termed a current contact state. Based at least in part on the current contact state associated with the touch sensitive surface 104, the operation management component 114 can determine an event. For instance, the operation management component 114 can utilize the current contact state relating to contact (or no contact) or association (e.g., hovering) of an object 2208 with respect to the touch sensitive surface 104 (and/or associated display screen 2204) to determine an event, based at least in part on the current contact state associated with the touch sensitive surface 104, wherein the current contact state can comprise an intentional touch event, an unintentional touch event, or a no touch event, for example. The event can be an action (e.g., a response action) that can be performed by the operation management component 114, the processor 2210, the touch sensitive surface 104, the touch sensing system 102, the display screen 2204, the display system 2202, or another component of the touch sensitive device 2200, as appropriate, in accordance with the defined classification criteria. The event can comprise, for example, enabling a touch function(s) of the touch sensitive surface 104 (or associated display screen 2204), disabling a touch function(s) of the touch sensitive surface 104 (or associated display screen 2204), turning the display screen 2204, or a portion of the display screen 2204, on (e.g., to an on state), or turning the display screen 2204, or a portion of the display screen 2204, off (e.g., to an off state).

In certain embodiments, the classification component 112 (and/or the operation management component 114) can determine and produce a classification confidence in a touch event classification determined by the classification component 112 (and/or the operation management component 114). To yield more robust behavior, the mode (e.g., function mode of touch functions of the touch sensitive surface 104, display mode or power mode of the display screen 2204) of the touch sensitive device 2200 can switch (e.g., will only switch) in response to the classification component 112 or the operation management component 114 determining that a touch event classification(s) has a sufficiently high confidence level that satisfies a defined threshold confidence (e.g., high confidence threshold) level relating to confidence in the touch event classification. If it is determined (e.g., by the classification component 112 or the operation management component 114) that the touch event classification(s) being produced has a relatively low confidence level that does not satisfy (e.g., is below) the defined threshold (e.g., high confidence threshold) classification level and/or is below a specified low confidence threshold level, the operation management component 114 can maintain the touch sensitive device 2200 in its current mode (e.g., can maintain the touch sensitive surface 104 and/or display screen 2204 in their respective current modes).

In certain embodiments, to facilitate avoiding "flickering" between two or more modes of the touch sensitive device 2200 (e.g., rapidly and undesirably switching between operation modes of the touch sensitive surface 104 and/or the display screen 2204), the operation management component 114 can utilize a hysteresis function that can facilitate controlling switching between operation modes of the touch sensitive surface 104 and/or the display screen 2204, in accordance with the defined classification criteria.

It is to be appreciated and understood from this disclosed subject matter that using the techniques described herein, touch sensitive devices can be provided with improved ability to interpret patterns of contact or association (e.g., hovering) of an object with respect to a touch sensitive surface. It also is to be appreciated and understood that the ordering of and the number of method acts or operations can be changed within the spirit and scope of the disclosed subject matter.

Figure 24:
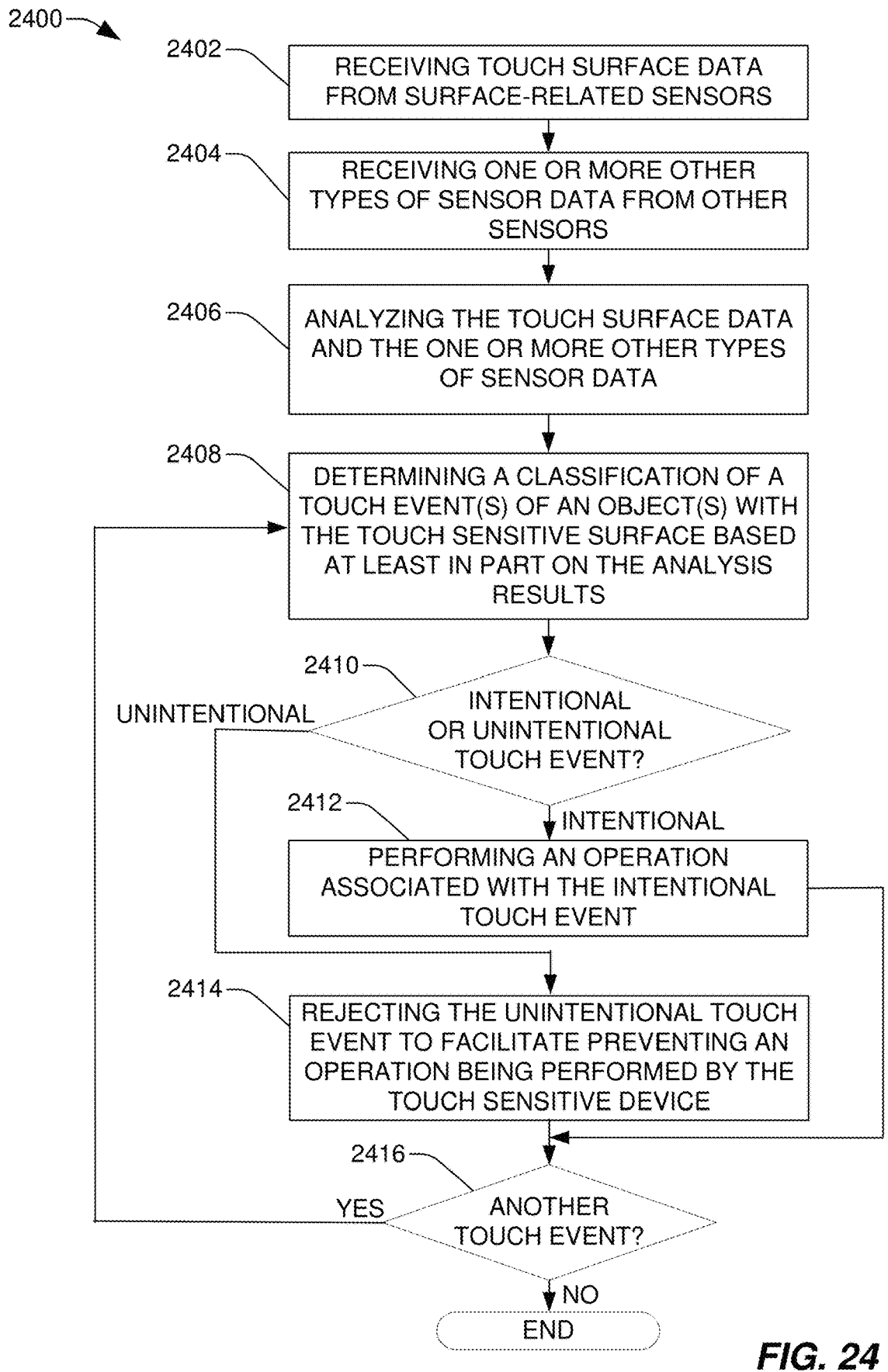
FIG. 24 illustrates a flow diagram of an example method for classifying touch events of objects with or in proximity to a touch sensitive surface of a touch sensitive device, in accordance with various aspects and embodiments of the disclosed subject matter.

FIG. 24 illustrates a flow diagram of an example method 2400 for classifying touch events of objects with or in proximity to a touch sensitive surface of a touch sensitive device, in accordance with various aspects and embodiments of the disclosed subject matter. The method 2400 can be performed, for example, by a classification component and/or an operation management component of a touch sensitive device.

At reference numeral 2402, touch surface data can be received from surface-related sensors. The classification component can receive the touch surface data (e.g., surface-related sensor data) from the surface-related sensors, which can be associated with the touch sensitive surface of the touch sensitive device. In some embodiments, the classification component can receive the touch surface data from the surface-related sensors, in response to (e.g., asynchronously in response to) a touch event occurring and/or being detected (e.g., being detected by the surface-related sensors) on the touch sensitive surface. In other embodiments, the touch sensing system and/or the sensor component can scan the surface-related sensors to measure or detect changes on the touch sensitive surface due to, for example, touching of the touch sensitive surface by an object(s), wherein touch surface data can be generated, based at least in part on the measured or detected changes on the touch sensitive surface, and can be received by the classification component.

At reference numeral 2404, one or more other types of sensor data can be received from other sensors. The classification component can receive the one or more other types of sensor data from the other sensors (e.g., accelerometer, gyroscope, ultrasound sensor, IMU, . . . ) of the sensor component. The one or more other types of sensor data can comprise one or more of motion data relating to motion of the touch sensitive device, impact or force data relating to impact or force of an object on the touch sensitive surface, vibro-acoustic data associated with a touch event relating to an object with respect to the touch sensitive surface or the device, orientation data relating to orientation of the device, and/or another type(s) of sensor data, such as disclosed herein.

In certain embodiments, the classification component can receive the one or more other types of sensor data from the other sensors, in response to (e.g., asynchronously in response to) a touch event occurring and/or being detected (e.g., being detected by the surface-related sensors) on the touch sensitive surface and/or an indication of the occurrence and/or detection of a touch event by the other sensors. In other embodiments, the sensor component can scan the other sensors to measure or detect changes in conditions associated with the other sensors due to, for example, touching of the touch sensitive surface by an object(s), wherein the one or more other types of sensor data can be generated, based at least in part on the measured or detected changes in the conditions, and can be received by the classification component.

At reference numeral 2406, the touch surface data and the one or more other types of sensor data can be analyzed. The classification component can monitor and analyze the touch surface data and the other sensor data to facilitate detecting touch events relating to contact of an object (e.g., finger(s), palm, and/or other object) with, or sufficiently close proximity of the object to, the touch sensitive surface of the touch sensitive device. The classification component can analyze the touch surface data and the one or more other types of sensor data, and can generate analysis results based at least in part on performing such data analysis. As more fully described herein, in accordance with various embodiments, as part of the analysis, the classification component can analyze the raw touch surface data and other raw sensor data, can extract respective features from such raw sensor data, can perform pattern recognition analysis based on patterns determined by analyzing such raw sensor data, and/or can perform other desired analysis of such raw sensor data or other data that can be derived from such raw sensor data.

At reference numeral 2408, a classification of a touch event(s) of an object(s) with the touch sensitive surface can be determined based at least in part on the analysis results. The classification component determining the touch event(s) of an object(s) with the touch sensitive surface based at least in part on the analysis results. The touch event(s) can comprise one or more touch events of one or more objects (e.g., one or more fingers of the user, and/or a palm of the user, and/or another object) with the touch sensitive surface.

At reference numeral 2410, for a touch event (of the one or more touch events), a determination can be made regarding whether the touch event is an intentional touch event or an unintentional touch event based at least in part on the classification of the touch event. With regard to a touch event of the one or more touch events, the classification component or the operation management component can determine whether the touch event is an intentional touch event or an unintentional touch event based at least in part on the classification of the touch event.

In response to determining that the touch event is an intentional touch event, at reference numeral 2412, an operation associated with the intentional touch event can be performed. In response to determining the touch event being determined to be an intentional touch event, the operation management component can perform or facilitate performance of the operation associated with the intentional touch event.

If, at reference numeral 2410, it is determined that the touch event is an unintentional touch event, at reference numeral 2414, the touch event can be rejected to facilitate preventing an operation being performed by the touch sensitive device. In response to determining that the touch event is an unintentional touch event, the operation management component can reject the touch event to facilitate preventing an undesired (e.g., inadvertent or unintended) operation being performed by the touch sensitive device.

At this point, the method 2400 can proceed to reference numeral 2416, wherein a determination can be made regarding whether there is another touch event of the one or more touch events. In response to determining that there is another touch event of the one or more touch events, the method 2400 can proceed to reference numeral 2408 to classify such touch event, and the method 2400 can proceed from that point. If, however, at reference numeral 2416, it is determined that there is not another touch event to process, the method 2400 can end.

Figure 25:
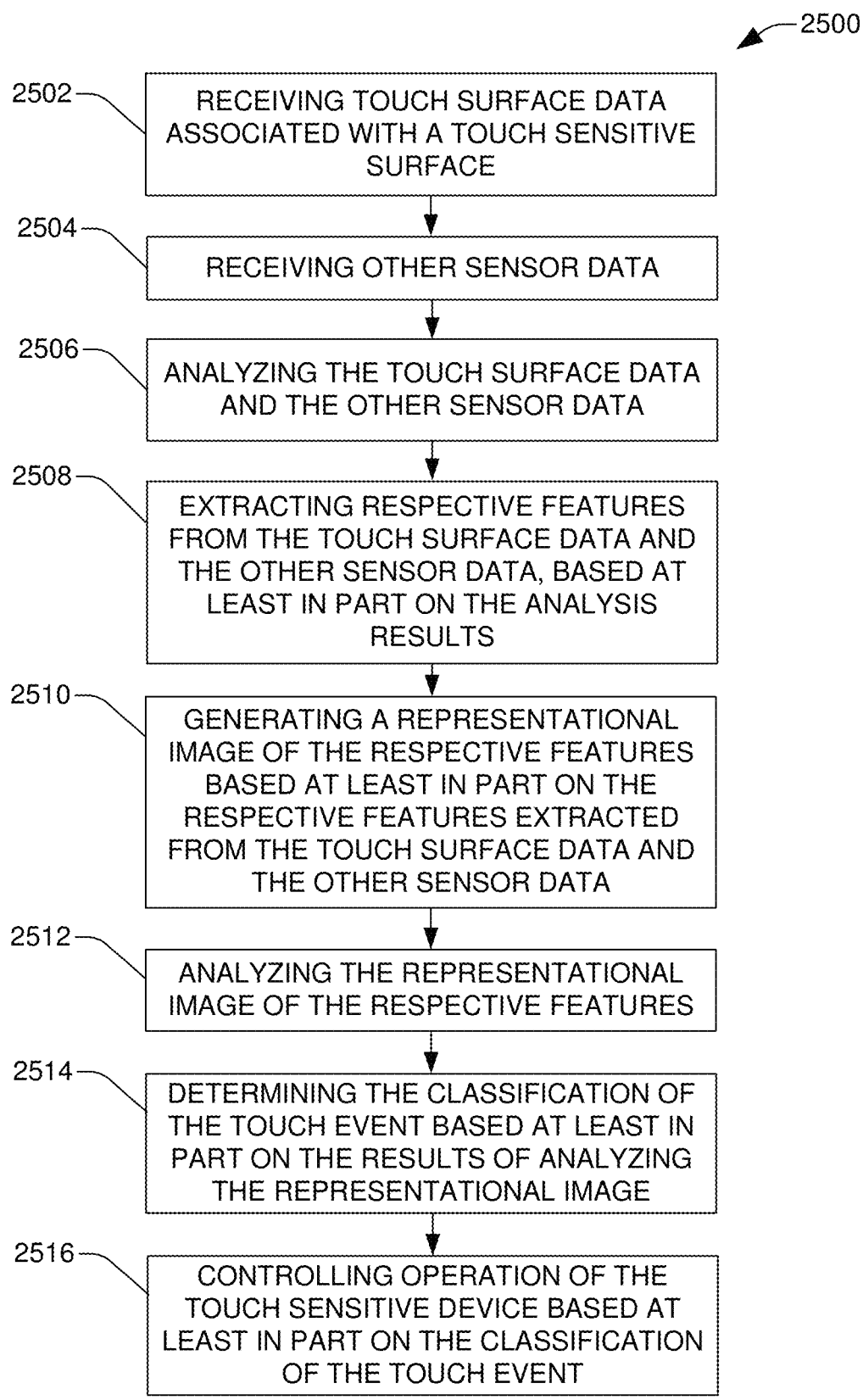
FIG. 25 depicts a flow diagram of an example method for extracting respective features from respective types of sensor data to facilitate classifying touch events of objects with respect to a touch sensitive surface of a touch sensitive device, in accordance with various aspects and embodiments of the disclosed subject matter.

FIG. 25 depicts a flow diagram of an example method 2500 for extracting respective features from respective types of sensor data to facilitate classifying touch events of objects with respect to a touch sensitive surface of a touch sensitive device, in accordance with various aspects and embodiments of the disclosed subject matter. The method 2500 can be performed, for example, by a classification component and/or an operation management component of a touch sensitive device.

At reference numeral 2502, touch surface data associated with the touch sensitive surface can be received. The classification component can receive the touch surface data (e.g., touch surface-related sensor data) from one or more surface-related sensors of the sensor component, wherein the one or more surface-related sensors can be associated with the touch sensitive surface. In some embodiments, the touch surface data can comprise capacitive data obtained from capacitive sensors of the sensor component.

In certain embodiments, the classification component can receive the touch surface data from the surface-related sensors, in response to (e.g., asynchronously in response to) a touch event occurring and/or being detected (e.g., being detected by the surface-related sensors) on the touch sensitive surface. In other embodiments, the touch sensing system and/or the sensor component can scan the surface-related sensors to measure or detect changes on the touch sensitive surface due to, for example, touching of the touch surface by an object(s), wherein touch surface data can be generated, based at least in part on the measured or detected changes on the touch sensitive surface, and can be received by the classification component.

At reference numeral 2504, other sensor data can be received from other sensors. The classification component can receive one or more other types of sensor data from one or more other types of sensors (e.g., accelerometer, gyroscope, ultrasound sensor, IMU, . . . ) of the sensor component. The one or more other types of sensor data can comprise motion data, impact or force data, vibro-acoustic data, orientation data, and/or another type(s) of sensor data, such as described more fully herein.

In some embodiments, the classification component can receive the other sensor data from the other sensors, in response to (e.g., asynchronously in response to) a touch event occurring and/or being detected (e.g., being detected by the surface-related sensors) on the touch sensitive surface and/or an indication of the occurrence and/or detection of a touch event by the other sensors. In other embodiments, the sensor component can scan the other sensors to measure or detect changes in conditions associated with the other sensors due to, for example, touching of the touch sensitive surface by an object(s), wherein the other sensor data can be generated, based at least in part on the measured or detected changes in the conditions, and can be received by the classification component.

At reference numeral 2506, the touch surface data and the other sensor data can be analyzed. The classification component can analyze the touch surface data and the other sensor data to facilitate determining a classification of a touch event with respect to an object (e.g., one or more object items) that can be in contact with or associated with (e.g., hovering in proximity to) the touch sensitive surface of the touch sensitive device, and can generate analysis results based at least in part on such data analysis.

At reference numeral 2508, respective features can be extracted from the touch surface data and the other sensor data, based at least in part on the analysis results. The classification component can extract features from the touch surface data based at least in part on the analysis results. The classification component can extract features from the other sensor data based at least in part on the analysis results. The features can comprise, for example, characteristics, shapes, dimensions, spectral centroid, spectral density, spherical harmonics, total average spectral energy, log spectral band ratios, and/or other features related to the contact or association (e.g., hovering or close proximity) of the object(s) with the touch sensitive surface, with respect to the time domain or frequency domain, respectively.

At reference numeral 2510, a representational image of the respective features can be generated based at least in part on the respective features extracted from the touch surface data and the other sensor data. In some embodiments, the classification component can generate the representational image (e.g., frame image) of (e.g., corresponding to) the respective features based at least in part on (e.g., from) the respective features extracted from the touch surface data and the other sensor data. The representational image can be or comprise a pattern relating to (e.g., representing or corresponding to) the touch event of the object with the touch sensitive surface.

At reference numeral 2512, the representational image of the respective features can be analyzed. The classification component can analyze the representational image to facilitate classifying the touch event associated with the object with respect to the touch sensitive surface, in accordance with the defined classification criteria. In some embodiments, the classification component can evaluate or compare the characteristics (e.g., features) of the representational image to respective known characteristics that respectively can indicate whether a touch event is intentional or unintentional and/or whether the touch event is a finger, palm, or other object, and/or can provide one or more other indications that can facilitate classifying the touch event associated with the object with respect to the touch sensitive surface. In certain embodiments, as more fully described herein, the classification component (e.g., classification engine of the classification component) can be trained to recognize and identify, and distinguish between, different characteristics of a representational image.

At reference numeral 2514, the classification of the touch event can be determined based at least in part on the results of analyzing the representational image. The classification component can determine the classification of the touch event associated with the object with respect to the touch sensitive surface based at least in part on the results of analyzing the representational image, in accordance with the defined classification criteria. The touch event can be classified, for example, as an intentional touch event (e.g., an intentional finger touch) or an unintentional touch event (e.g., unintentional finger touch, unintentional palm touch, and/or other unintentional touch by an object).

At reference numeral 2516, operation of the touch sensitive device can be controlled (e.g., to process an operation relating to an intentional touch event, to reject an unintentional touch event) based at least in part on the classification of the touch event. The operation management component can control operation of the touch sensitive device based at least in part on the classification of the touch event. For instance, in response to the touch event classification being an intentional touch, the operation management component can control operation of the touch sensitive device to process the touch event, including processing an operation relating to the touch (e.g., intentional finger or object touch) of the touch sensitive surface. In connection with processing the touch event, the operation management component can enable a touch function(s) of the touch sensitive surface and/or turn the display screen (e.g., touch display screen) to an on state, for example.

In response to the touch event classification being an unintentional touch, the operation management component can control operation of the touch sensitive device to reject the touch event, including preventing an operation relating to the touch (e.g., unintentional finger, palm, or object touch) of an object with respect to the touch sensitive surface. In connection with rejecting the touch event, the operation management component can disable a touch function(s) of the touch sensitive surface and/or turn the display screen to an off state, for example.

Figure 26:
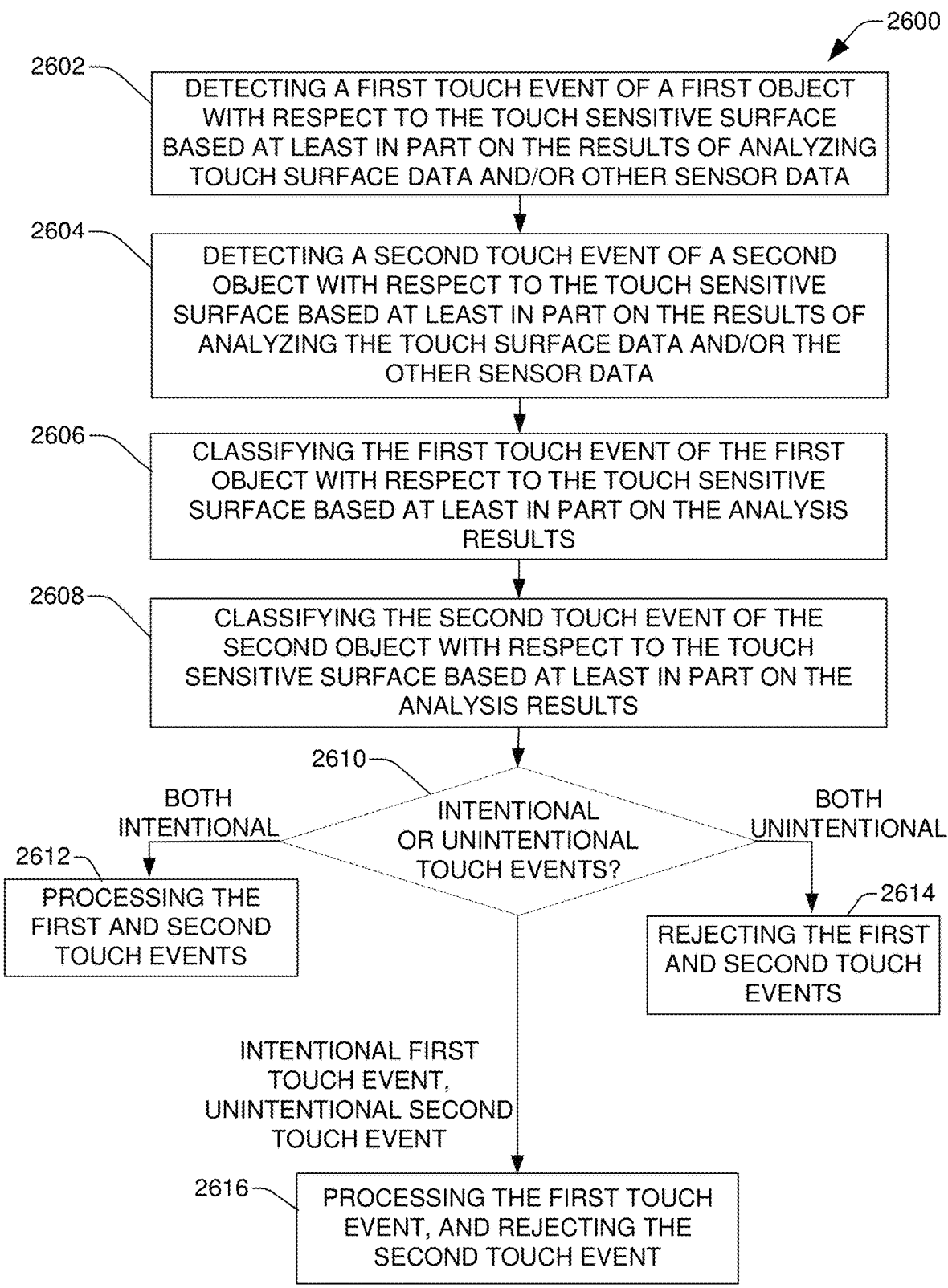
FIG. 26 illustrates a flow diagram of an example method for classifying multiple touch events of multiple objects with or in proximity to a touch sensitive surface of a touch sensitive device, in accordance with various aspects and embodiments of the disclosed subject matter.

FIG. 26 illustrates a flow diagram of an example method 2600 for classifying multiple touch events of multiple objects with or in proximity to a touch sensitive surface of a touch sensitive device, in accordance with various aspects and embodiments of the disclosed subject matter. The method 2600 can be performed, for example, by a classification component and/or an operation management component of a touch sensitive device.

At reference numeral 2602, a first touch event of a first object with respect to the touch sensitive surface can be detected based at least in part on the results of analyzing touch surface data and/or other sensor data. At reference numeral 2604, a second touch event of a second object with respect to the touch sensitive surface can be detected based at least in part on the results of analyzing the touch surface data and/or the other sensor data. The classification component can detect the first touch event and the second touch event based at least in part on the results of analyzing the touch surface data associated with the touch sensitive surface and/or the other sensor data obtained from other sensors (e.g., accelerometer, gyroscope, ultrasound sensor, and/or IMU, . . . ) of the touch sensitive device.

At reference numeral 2606, the first touch event of the first object with respect to the touch sensitive surface can be classified based at least in part on the analysis results. At reference numeral 2608, the second touch event of the second object with respect to the touch sensitive surface can be classified based at least in part on the analysis results. The classification component can respectively classify the first touch event and the second touch event based at least in part on the analysis results, in accordance with the defined classification criteria, as more fully described herein.

At reference numeral 2610, it can be determined whether the multiple touch events are classified as both being intentional touch events, as both being unintentional touch events, or as the first touch event being an intentional touch event and the second touch event being an unintentional touch event. The classification component or operation management component can evaluate or analyze the first touch event classification of the first touch event and the second touch event classification of the second touch event to determine whether the first touch event and the second touch event are both classified as intentional touch events, whether they are both classified as unintentional touch events, or whether the first touch event is classified as an intentional touch event and the second touch event is classified as an unintentional touch event.

At reference numeral 2612, in response to determining that the first touch event and the second touch event are both classified as intentional touch events, the first and second touch events can be processed, including processing one or more operations relating to the first and second touch events of the first and second objects with respect to the touch sensitive surface. For instance, in response to determining or identifying that the first and second touch events are both classified as intentional touch events, the operation management component can control operation of the touch sensitive device to process the first and second touch events, including processing one or more operations relating to the first and second touch events of first and second objects (e.g., intentional finger or object touches) with respect to the touch sensitive surface. In connection with processing the first and second touch events, the operation management component can enable one or more touch functions of the touch sensitive surface and/or can turn the display screen (e.g., touch display screen) to an on state. For example, the first and second touch events can be touch events that occur simultaneously or substantially simultaneously with respect to the touch sensitive surface, wherein the first and second touch events can relate to a multi-gesture function to zoom in, zoom out, or rotate an image displayed on the display screen, scroll through information presented on the display screen, change the information (e.g., page or image) displayed to next information (e.g., next page or next image), and/or another multi-gesture function(s) available on of the touch sensitive device.

At reference numeral 2614, in response to determining that the first touch event and the second touch event are both classified as unintentional touch events (at reference numeral 2610), the first and second touch events can be rejected, including preventing one or more operations relating to the first and second touch events from being performed. The operation management component can control operation of the touch sensitive device to reject both the first and the second touch events, including preventing performance of an operation(s) relating to the first and second touch event (e.g., unintentional finger, palm, and/or object touch) of the first and second objects with respect to the touch sensitive surface. For instance, in connection with rejecting the first and second touch events, the operation management component can disable a touch function(s) of the touch sensitive surface and/or turn the display screen to an off state, for example.

At reference numeral 2616, in response to determining that the first touch event is classified as an intentional touch event and the second touch event is classified as an unintentional touch event (at reference numeral 2610), the first touch event can be processed, including processing one or more operations relating to the first touch event of the first object with respect to the touch sensitive surface, and the second touch event can be rejected, including preventing one or more operations relating to the second touch event from being performed. For example, in response to determining or identifying that the first touch event is classified as an intentional touch event, the operation management component can control operation of the touch sensitive device to process the first touch event, including processing one or more operations relating to the first touch event of the first object (e.g., intentional finger or object touch) with respect to the touch sensitive surface of the touch sensitive device. Further, in response to determining or identifying that the second touch event is classified as an unintentional touch event, the operation management component can control operation of the touch sensitive device to reject the second touch event, including preventing performance of an operation(s) relating to the second touch event (e.g., unintentional finger, palm, and/or object touch) of the second object with respect to the touch sensitive surface.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

With regard to the methods and/or flow diagrams described herein, for simplicity of explanation, the methods have been depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed herein and throughout this specification are capable of being stored on an article of manufacture to facilitate transporting and transferring such methods to computers. The term article of manufacture, as used herein, is intended to encompass a computer program accessible from any computer-readable device or storage media.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the disclosed methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," "unit," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
analyzing, by a system comprising a processor, characteristics of touch surface data associated with a touch sensitive surface that is associated with a device and accelerometer data associated with the device;
determining, by the system, an amount of impact of the object on the touch sensitive surface based at least in part on at least one result of the analyzing of the touch surface data or the accelerometer data;
comparing, by the system, the amount of impact to statistical distributions relating to impacts of objects on the touch sensitive surface, wherein a first portion of the statistical distributions relates to an intentional touch event, wherein a second portion of the statistical distributions relates to an unintentional touch event;
based at least in part on at least one result of the analyzing and a comparison result of the comparing, determining, by the system, a classification of a touch event for an object with respect to the touch sensitive surface, wherein the classification of the touch event is the unintentional touch event or the intentional touch event; and determining, by the system, whether to reject the touch event or process the touch event based at least in part on the classification, wherein it is determined that the touch event is to be rejected in response to the classification being determined to be the unintentional touch event, and wherein it is determined that the touch event is to be processed in response to the classification being determined to be the intentional touch event.

2. The method of claim 1, wherein the object is a finger of a user of the device, a palm of the user, or another object, wherein the unintentional touch event comprises an unintentional finger touch of a finger of the user on the touch sensitive surface, an unintentional palm touch of the palm of the user on the touch sensitive surface, or an unintentional touch of the other object on the touch sensitive surface; and wherein the intentional touch event comprises an intentional finger touch of the finger of the user on the touch sensitive surface, or an intentional touch of the other object on the touch sensitive surface.

3. The method of claim 1, further comprising:

determining, by the system, that the touch event is to be rejected based at least in part on the classification being determined to be the unintentional touch event, wherein the at least one result of the analyzing indicates that the characteristics of the touch surface data and the accelerometer data are indicative of a palm or a finger of a hand of a user of the device unintentionally interacting with the touch sensitive surface due to the user holding the device in the hand of the user.

4. The method of claim 1, further comprising:

comparing, by the system, the characteristics of the touch surface data and the accelerometer data to first characteristics relating to unintentional touch events associated with the touch sensitive surface and second characteristics relating to intentional touch events associated with the touch sensitive surface, wherein the determining the classification of the touch event comprises determining the classification of the touch event based at least in part on a result of the comparing the touch surface data and the accelerometer data to the first characteristics and the second characteristics.

5. The method of claim 1, wherein the analyzing comprises analyzing characteristics of sensor data comprising the touch surface data, the accelerometer data, and at least one other type of sensor data comprising at least one of gyroscope data associated with the device, ultrasonic data associated with the device, vibro-acoustic data associated with the device, inertial measurement unit data associated with the device, acceleration data indicating an acceleration of the device, velocity data indicating a velocity of the device, angular rate data indicating an angular rate of the device, position data indicating a position or a change in position of the device, or orientation data indicating an orientation or a change in orientation of the device.

6. The method of claim 5, further comprising receiving, by the system, the sensor data from at least one set of sensors associated with the touch sensitive surface, an accelerometer, a gyroscope, an ultrasonic sensor, or an inertial measurement unit.

7. The method of claim 1, wherein the object is a first object, wherein the touch event is a first touch event of the first object with respect to the touch sensitive surface, wherein the classification is a first classification of the first touch event as the intentional touch event, and wherein the method further comprises:

based at least in part on at least one result of the analyzing, determining, by the system, a second classification of a second touch event for a second object with respect to the touch sensitive surface is the unintentional touch event, wherein the first touch event and the second touch event occur substantially simultaneously;

in response to determining that the first touch event is the intentional touch event, processing, by the system, the first touch event to initiate performance of a first operation associated with the device and relating to the first touch event; and in response to determining that the second touch event is the unintentional touch event, rejecting, by the system, the second touch event to prevent performance of a second operation associated with the device.

8. The method of claim 1, further comprising:

extracting, by the system, first descriptive features relating to the touch event from the touch surface data based at least in part on at least one result of the analyzing; and extracting, by the system, second descriptive features relating to the touch event from the accelerometer data based at least in part on at least one result of the analyzing, wherein the determining the classification of the touch event further comprises determining the classification of the touch event based at least in part on the first descriptive features and the second descriptive features.

9. The method of claim 1, further comprising controlling, by the system, a function associated with the touch sensitive surface based at least in part on the classification of the touch event, wherein the function comprises enabling a touch sensitive function of the touch sensitive surface of a display screen of the device, disabling the touch sensitive function of the touch sensitive surface, switching the display screen to an on state, or switching the display screen to an off state.

10. The method of claim 1, further comprising:

generating, by the system, frame data representative of an image indicating one or more respective locations of contact of one or more respective portions of the object with the touch sensitive surface based at least in part on at least one of the touch surface data or the accelerometer data, wherein the analyzing the characteristics comprises analyzing the image to facilitate the determining of the classification of the touch event.

11. The method of claim 1, wherein the touch screen data comprises capacitive data that indicates whether the object is in contact with the touch sensitive surface, is not in contact with the touch sensitive surface, is hovering within a defined distance of the touch sensitive surface resulting in a change in a capacitance value associated with the touch sensitive surface, or is not hovering within the defined distance of the touch sensitive surface.

12. A system, comprising:

a memory; and a processor, operatively coupled to the memory, wherein the memory and processor are operable to perform a method comprising:

analyzing touch surface information associated with a touch sensitive surface that is associated with a device and accelerometer information associated with the device and received from an accelerometer;

determining, by the system, an amount of impact of the object on the touch sensitive surface based at least in part on at least one result of the analyzing of the touch surface data or the accelerometer data;

comparing, by the system, the amount of impact to statistical distributions relating to impacts of objects on the touch sensitive surface, wherein a first portion of the statistical distributions relates to an intentional touch event, wherein a second portion of the statistical distributions relates to an unintentional touch event;

determining a classification of a touch event for an object with respect to the touch sensitive surface, based at least in part on at least one result of the analysis and a comparison result of the comparing, wherein the classification of the touch event is the unintentional touch event or the intentional touch event; and based at least in part on the classification, rejecting the touch event in response to the classification being determined to be the unintentional touch event, or processing the touch event in response to the classification being determined to be the intentional touch event.

13. The system of claim 12, wherein the object is a finger of a user of the device, a palm of the user, or another object, wherein the unintentional touch event comprises an unintentional finger touch of a finger of the user on the touch sensitive surface, an unintentional palm touch of the palm of the user on the touch sensitive surface, or an unintentional touch of the other object on the touch sensitive surface; and wherein the intentional touch event comprises an intentional finger touch of the finger of the user on the touch sensitive surface, or an intentional touch of the other object on the touch sensitive surface.

14. The system of claim 12, wherein the memory and processor are further operable to determine that the touch event is to be classified as being the unintentional touch event that is to be rejected based at least in part on the at least one result of the analyzing indicating that characteristics of the touch surface information and the accelerometer information are indicative of a palm or a finger of a hand of a user of the device unintentionally touching or being in proximity to the touch sensitive surface due to the user gripping the device in the hand of the user.

15. The system of claim 12, wherein the memory and processor are further operable to evaluate characteristics of the touch surface information and the accelerometer information in relation to first characteristics associated with unintentional touch events with respect to the touch sensitive surface and second characteristics associated with intentional touch events with respect to the touch sensitive surface, and is further configured to determine the classification of the touch event based at least in part on a result of the evaluation of the characteristics.

16. The system of claim 12, wherein the memory and processor are further operable to analyze sensor information comprising the touch surface information, the accelerometer information, and at least one other type of sensor information comprising at least one of gyroscope information associated with the device, ultrasonic information associated with the device, vibro-acoustic information associated with the device, inertial measurement unit information associated with the device, acceleration information indicating an acceleration of the device, velocity information indicating a velocity of the device, angular rate information indicating an angular rate of the device, position information indicating a position or a change in position of the device, or orientation information indicating an orientation or a change in orientation of the device.

17. The system of claim 16, wherein the memory and processor are further operable to receive the sensor information from at least one of a set of sensors associated with the touch sensitive surface, the accelerometer, a gyroscope, an ultrasonic sensor, or an inertial measurement unit.

18. The system of claim 12, wherein the memory and processor are further operable to control at least one display function associated with the touch sensitive surface, based at least in part on the classification of the touch event, to enable a touch sensitive function of the touch sensitive surface of a display screen of the device in response to a first determination that the touch event is the intentional touch event, disable the touch sensitive function of the touch sensitive surface in response to a second determination that the touch event is the unintentional touch event, transition the display screen from an off state to an on state in response to the first determination that the touch event is the intentional touch event, or transition the display screen from the on state to the off state in response to the second determination that the touch event is the unintentional touch event.

19. The system of claim 12, wherein the object is a first object, wherein the touch event is a first touch event of the first object with respect to the touch sensitive surface, wherein the classification is a first classification of the first touch event as the intentional touch event, and wherein the memory and processor are further operable to:

based at least in part on the at least one result of the analysis, determine a second classification of a second touch event for a second object with respect to the touch sensitive surface is the unintentional touch event, wherein a first time period of the first touch event and a second time period of the second touch event at least partially overlap;

in response to determining that the first touch event is the intentional touch event, process the first touch event to initiate performance of a first operation associated with the device and relating to the first touch event; and in response to determining that the second touch event is the unintentional touch event, reject the second touch event to prevent performance of a second operation associated with the device.

20. The system of claim 12, wherein the memory and processor are further operable to:

extract first descriptive features relating to the touch event from the touch surface information based at least in part on at least one result of the analysis;

extract second descriptive features relating to the touch event from the accelerometer information based at least in part on at least one result of the analysis; and determine the classification of the touch event based at least in part on the results of an analysis of the first descriptive features and the second descriptive features.

21. The system of claim 12, wherein the memory and processor are further operable to be trained to distinguish between a first type of touch event with respect to the touch sensitive surface and at least one other type of touch event with respect to the touch sensitive surface based at least in part on example training classification samples comprising first positive example training classification samples relating to the first type of touch event and at least one other example positive training classification samples relating to the at least one other type of touch event, wherein the first type of touch event relates to the intentional touch event for the object with respect to the touch sensitive surface, and wherein the at least one other type of touch event comprises a second type of touch event that relates to the unintentional touch event for the object with respect to the touch sensitive surface.

22. The system of claim 12, further comprising a buffer for storing at least a portion of at least one of the touch surface information or the accelerometer information, to facilitate analysis of at least the portion of at least one of the touch surface information or the accelerometer information.

23. The system of claim 12, wherein the touch surface information comprises capacitive information that indicates whether the object is in contact with the touch sensitive surface, is not in contact with the touch sensitive surface, is hovering in proximity to the touch sensitive surface resulting in a change in an amount of capacitance associated with the touch sensitive surface, or is not hovering in proximity to the touch sensitive surface.

24. A non-transitory machine-readable medium, comprising executable instructions that, when executed by a processor, facilitate performance of operations, comprising:
   analyzing features of touch surface data associated with a touch sensitive surface that is associated with a device and accelerometer data associated with the device;
   determining, by the system, an amount of impact of the object on the touch sensitive surface based at least in part on at least one result of the analyzing of the touch surface data or the accelerometer data;
   comparing, by the system, the amount of impact to statistical distributions relating to impacts of objects on the touch sensitive surface, wherein a first portion of the statistical distributions relates to an intentional touch event, wherein a second portion of the statistical distributions relates to an unintentional touch event;
   based at least in part on at least one result of the analyzing and a comparison result of the comparing, determining a classification of a touch event of an object with respect to the touch sensitive surface, wherein the classification of the touch event is the unintentional touch event or the intentional touch event; and
   determining whether to reject the touch event or process the touch event based at least in part on the classification, wherein it is determined that the touch event is to be rejected in response to the classification being determined to be the unintentional touch event, and wherein it is determined that the touch event is to be processed in response to the classification being determined to be the intentional touch event.

25. The non-transitory machine-readable medium of claim 24, wherein the object is a finger of a user of the device, a palm of the user, or another object, wherein the unintentional touch event comprises an unintentional finger touch of a finger of the user on the touch sensitive surface, an unintentional palm touch of the palm of the user on the touch sensitive surface, or an unintentional touch of the other object on the touch sensitive surface; and
   wherein the intentional touch event comprises an intentional finger touch of the finger of the user on the touch sensitive surface, or an intentional touch of the other object on the touch sensitive surface.

* * * * *